(12) United States Patent
Sant'Anselmo

(10) Patent No.: US 9,922,332 B2
(45) Date of Patent: Mar. 20, 2018

(54) DIGITAL SIGNATORY AND TIME STAMPING NOTARY SERVICE FOR DOCUMENTS AND OBJECTS

(76) Inventor: Robert Sant'Anselmo, Chatsworth, CA (US)

( * ) Notice: Subject to any disclaimer, the term of this patent is extended or adjusted under 35 U.S.C. 154(b) by 53 days.

(21) Appl. No.: 12/964,155

(22) Filed: Dec. 9, 2010

(65) Prior Publication Data

US 2011/0213700 A1 Sep. 1, 2011

Related U.S. Application Data

(60) Provisional application No. 61/267,861, filed on Dec. 9, 2009.

(51) Int. Cl.
| | | |
|---|---|---|
| *G06Q 40/00* | (2012.01) | |
| *G06Q 30/02* | (2012.01) | |
| *G06Q 10/10* | (2012.01) | |
| *G06Q 20/10* | (2012.01) | |

(52) U.S. Cl.
CPC ............. *G06Q 30/02* (2013.01); *G06Q 10/10* (2013.01); *G06Q 20/10* (2013.01)

(58) Field of Classification Search
CPC ........ G06Q 10/00; G06Q 20/00; G06Q 50/18; G06Q 20/40145; G06T 1/0042; G07D 7/20; G06F 21/10; G06F 12/14; H04L 63/0861; H04L 2209/56
USPC ....... 705/39, 51, 12; 235/380, 494; 382/103; 348/E5.006; 713/186
See application file for complete search history.

(56) References Cited

U.S. PATENT DOCUMENTS

| | | | | |
|---|---|---|---|---|
| 5,136,643 | A * | 8/1992 | Fischer | 713/178 |
| 5,490,217 | A * | 2/1996 | Wang et al. | 380/51 |
| 6,185,683 | B1 * | 2/2001 | Ginter | G06F 21/10 |
| | | | | 348/E5.006 |
| 6,188,766 | B1 * | 2/2001 | Kocher | 380/246 |
| 6,393,456 | B1 * | 5/2002 | Ambler et al. | 709/200 |
| 6,643,663 | B1 * | 11/2003 | Dabney et al. | |
| 7,194,618 | B1 * | 3/2007 | Suominen | G06F 21/64 |
| | | | | 713/155 |
| 7,797,430 | B2 * | 9/2010 | Ichieda | 709/227 |
| 7,798,416 | B2 * | 9/2010 | Roskind | 235/492 |
| 7,904,450 | B2 * | 3/2011 | Wilson | 707/723 |

(Continued)

*Primary Examiner* — Kirsten Apple
*Assistant Examiner* — Michael W Anderson
(74) *Attorney, Agent, or Firm* — Staas & Halsey LLP

(57) ABSTRACT

A integrated electronic networked notary system includes sub-systems of computers to execute biometric analysis, target object information input and analysis, marking and time stamping with an trusted third-party provider to enable an electronic notary process. The system provides for authentication of both the signatories as well as the target objects. The user has the option to either unilaterally self-notarize or to collaborate with others for the purpose of electronically notarizing the target object. For high-value target objects, a selectable display menu can be changed into the semi-automatic mode, whereby, a legal notary person may be present to interface and/or assist the user(s) in their notarization and time stamping process. A machine-readable notary symbol generator generates a machine-readable notary symbol by encoding an identifier representing a container of notary information including an official current time corresponding to a notarization event, identification information of the target object, and GPS notarization authorization information.

16 Claims, 67 Drawing Sheets

Basic Notary System
(Illustrating two input/output embodiments: Manual Data User and Automatic Data Systems)

(56) References Cited

U.S. PATENT DOCUMENTS

| | | | |
|---|---|---|---|
| 7,995,196 B1* | 8/2011 | Fraser | 356/71 |
| 8,006,094 B2* | 8/2011 | Savitzky et al. | 713/178 |
| 8,065,527 B2* | 11/2011 | Veluchamy et al. | 713/176 |
| 8,190,904 B2* | 5/2012 | Hatter et al. | 713/178 |
| 8,924,729 B1* | 12/2014 | Oakes, III | H04L 9/3247 |
| | | | 713/176 |
| 2002/0023220 A1* | 2/2002 | Kaplan | |
| 2003/0028778 A1* | 2/2003 | Couillard | 713/178 |
| 2004/0221162 A1* | 11/2004 | Kongtcheu | 713/178 |
| 2006/0041550 A1* | 2/2006 | Bennett et al. | G06F 17/30 |
| 2006/0178902 A1* | 8/2006 | Vicars | G06F 21/64 |
| | | | 705/51 |
| 2007/0272738 A1* | 11/2007 | Berkun | G06Q 10/00 |
| | | | 235/380 |
| 2008/0028220 A1* | 1/2008 | Wyssen | G07D 7/20 |
| | | | 713/176 |
| 2008/0260267 A1* | 10/2008 | Goldberg | G06T 1/0042 |
| | | | 382/232 |
| 2008/0262954 A1* | 10/2008 | Nally | G06Q 10/00 |
| 2008/0320600 A1* | 12/2008 | Pandiscia | H04L 9/3231 |
| | | | 726/27 |
| 2009/0154759 A1* | 6/2009 | Koskinen et al. | 382/100 |

* cited by examiner

FIGURE 1 Basic Notary System
(Illustrating two input/output embodiments: Manual Data User and Automatic Data Systems)

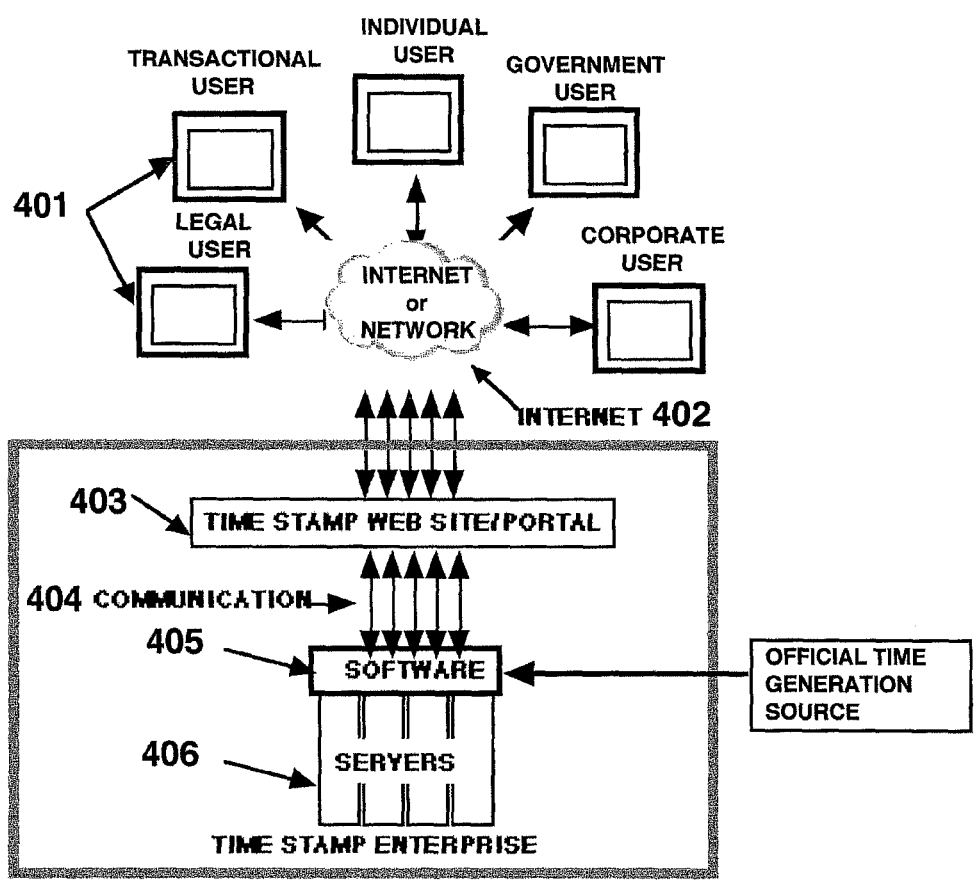
Figure 4: Basic System Communication Configuration

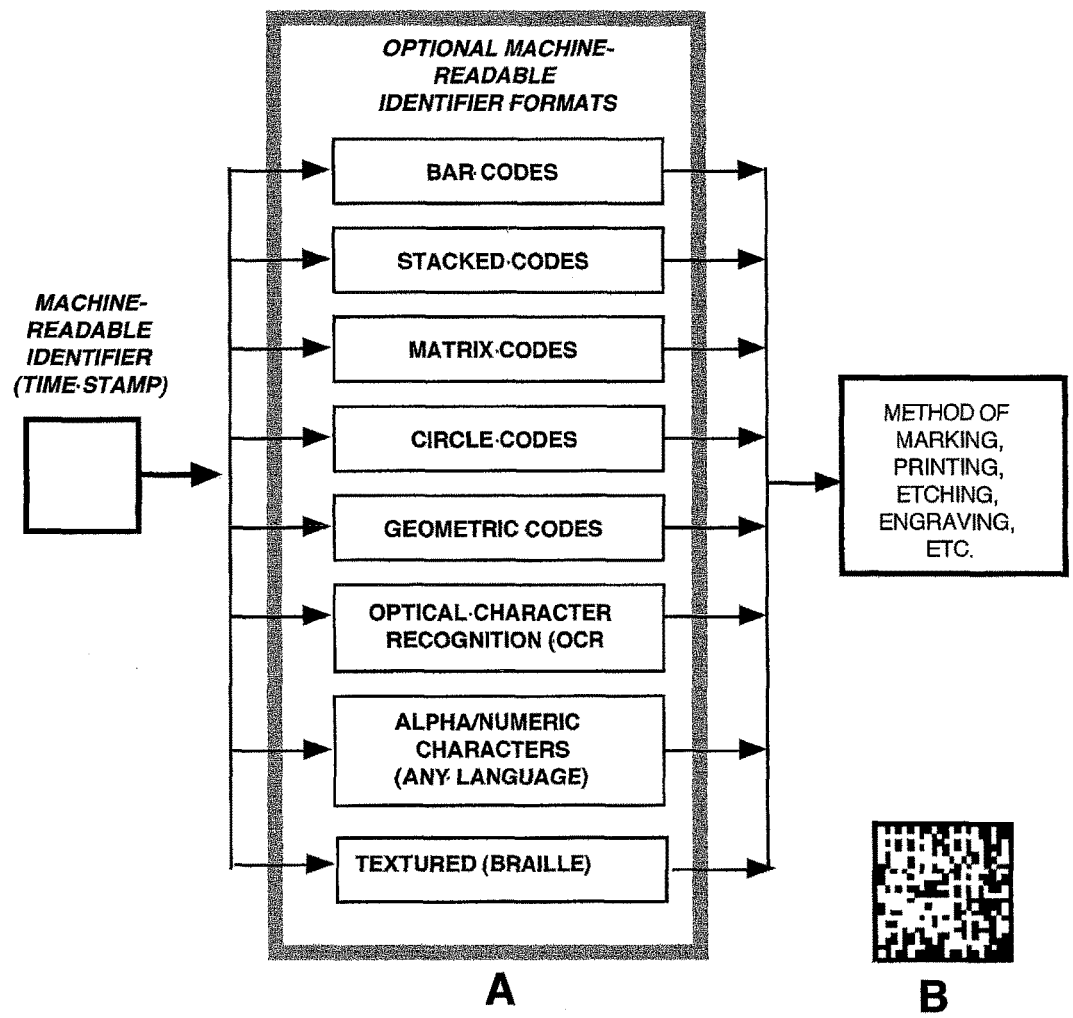
Figure 5  Machine Readable Formats and the Preferred High Data Density Matrix Formatted Symbol

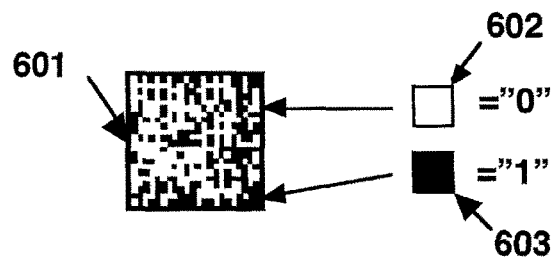
Figure 6  Machine Readable Formats and the Preferred High Data Density Matrix Formatted Symbol
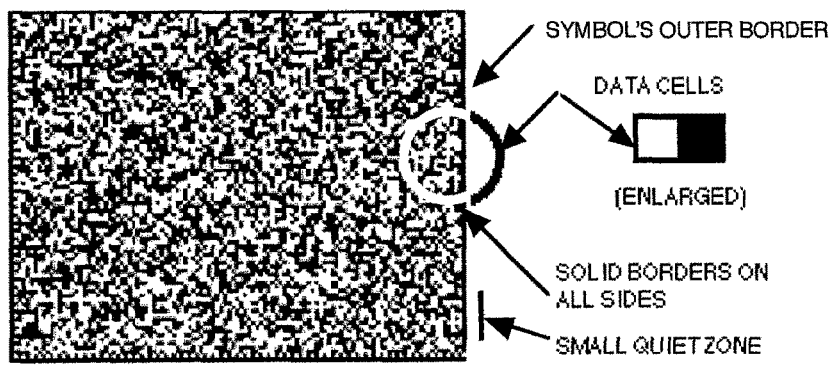
Figure 6A  A High –Data Density Source: Veritec, Inc

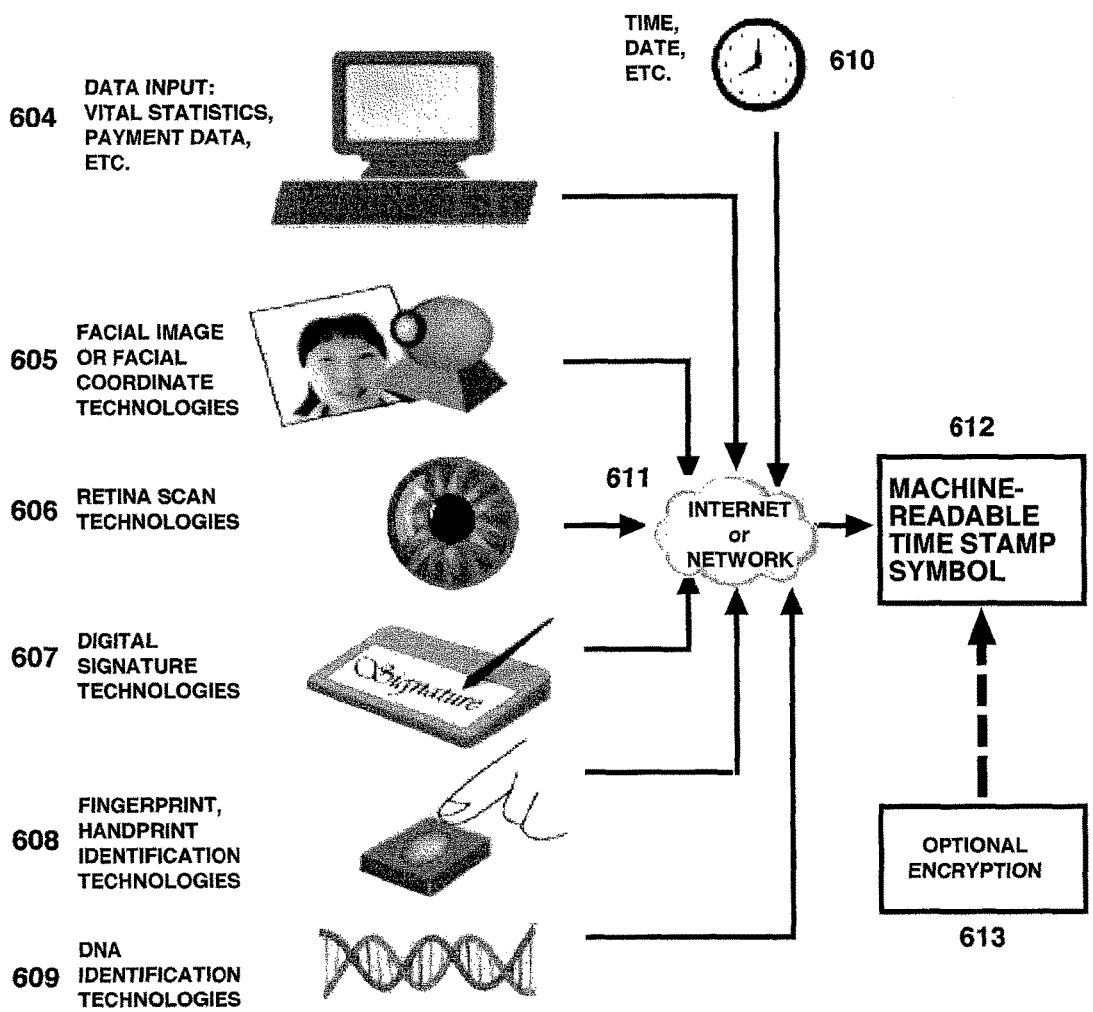
Figure 6B Embedded Biometric Data

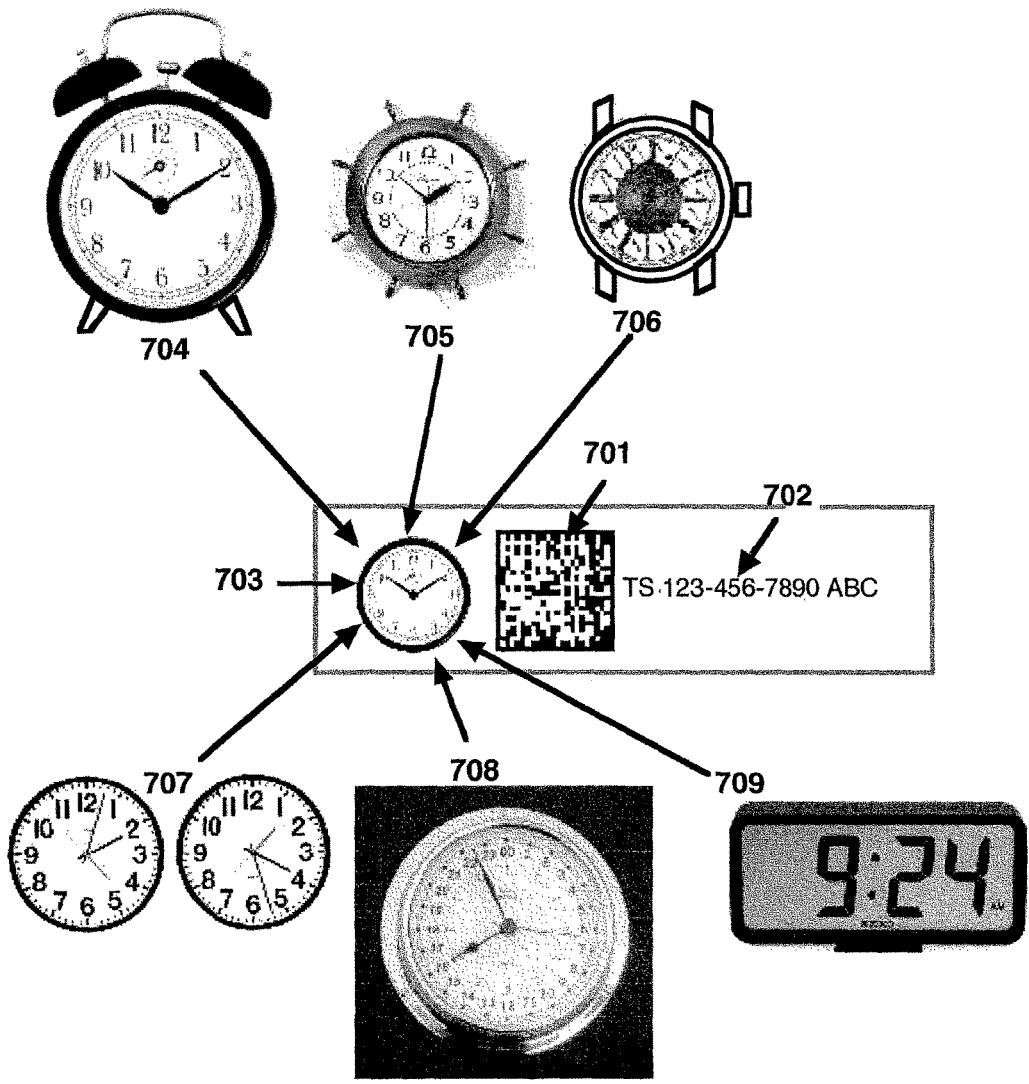
FIGURE 7 The Same Machine-Readable Symbol with a Human Readable Code that is a Key to a Specific Customer's/User's Data File with optional Clock Icon(s).

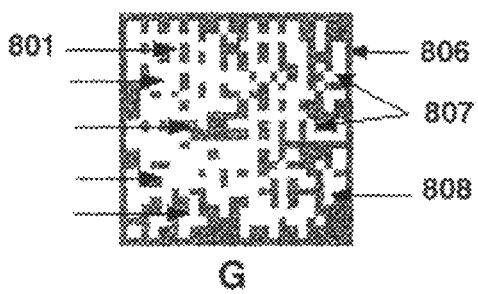
FIGURE 8 Examples of the Various Types of Information Contained within the Time Stamp Identifier Symbol

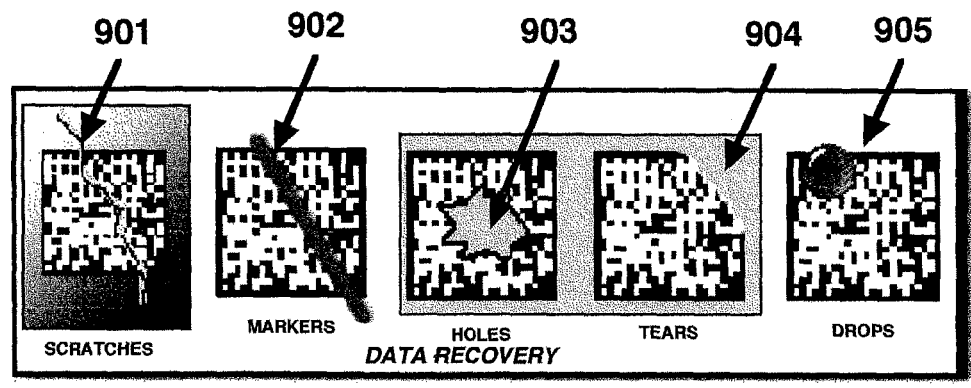
Figure 9  Data Recovery from Damaged Symbols
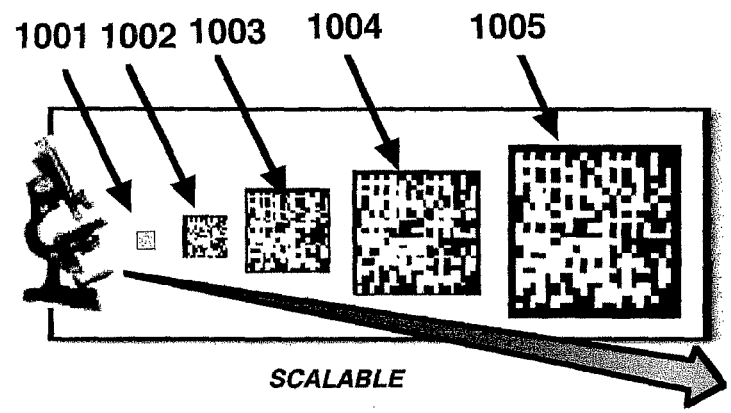
Figure 10:  Adjustable Size (Scalable)
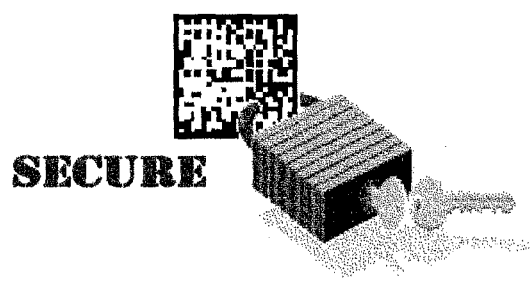
Figure 11  Data Security

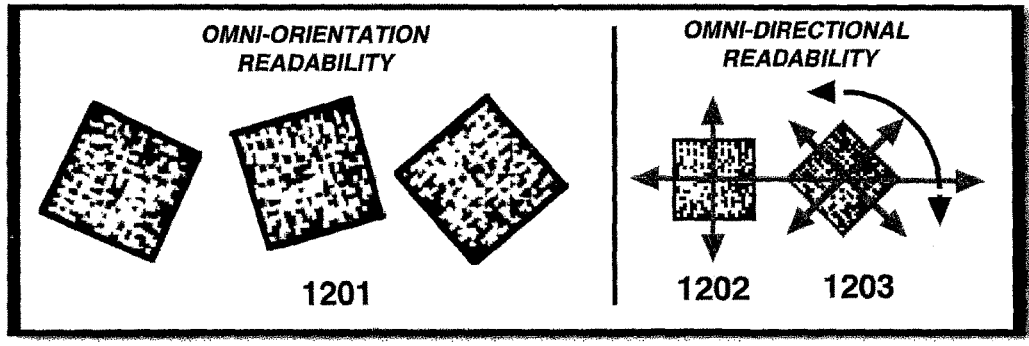
Figure 12 Reading Nonaligned Time Stamps
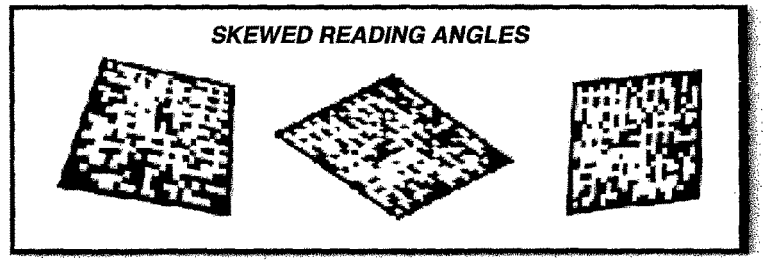
Figure 13: Reading Skewed Time Stamps
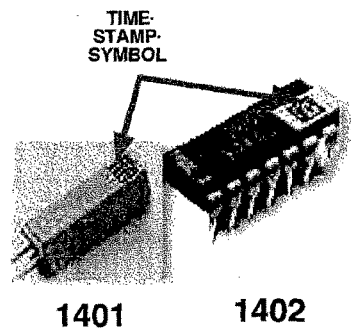
Figure 14 Component/Object Time Stamps
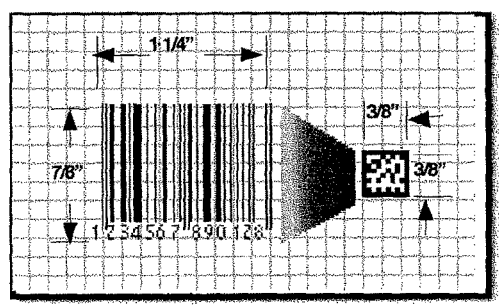
Figure 15 Comparison of Space Efficiency

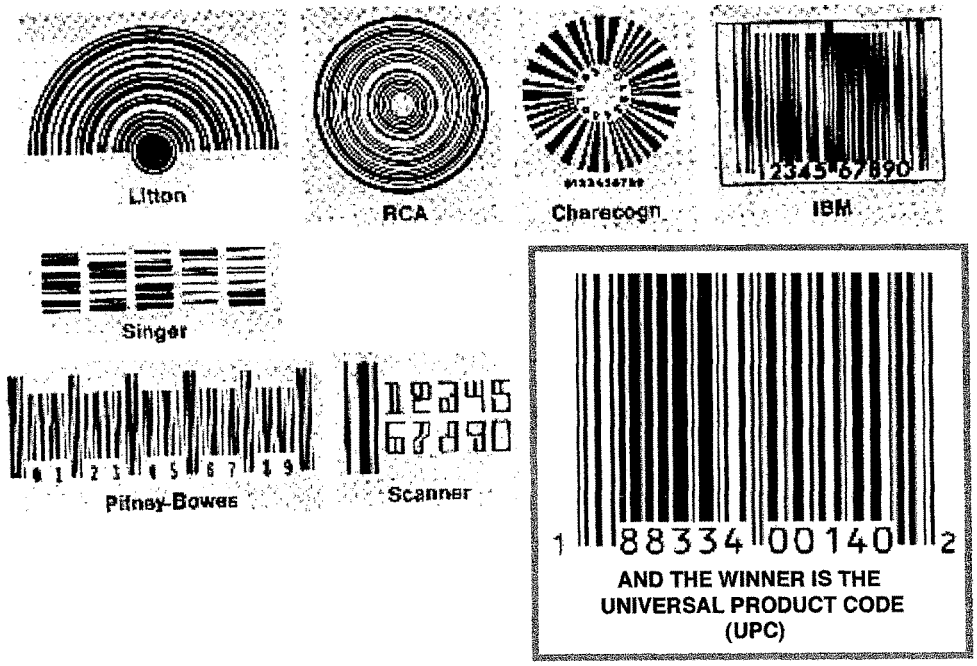
Figure 19  Other Machine-readable Symbol Formats That are Applicable to the Time Stamp Embodiment Process
Figure 20 Data Matrix Code Symbol/ ISO/IEC16022
Figure 21  Typical PDF417 Stacked Bar Code Symbol
Figure 22 MICR Format

Figure 22A Examples of Different Two-Dimensional Machine-Readable Symbols

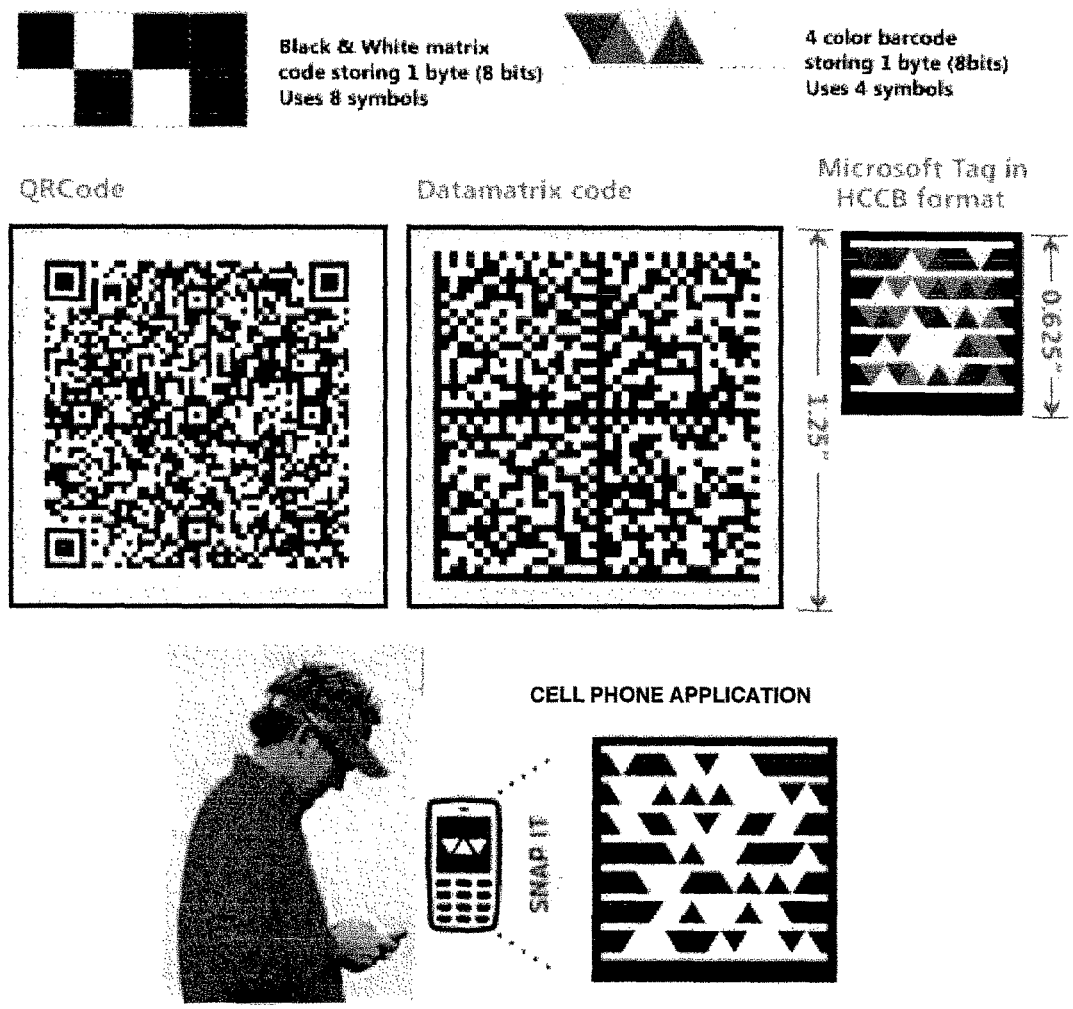
Figure 23 High Capacity Color Matrix Codes/Gettag/Mobile Codes
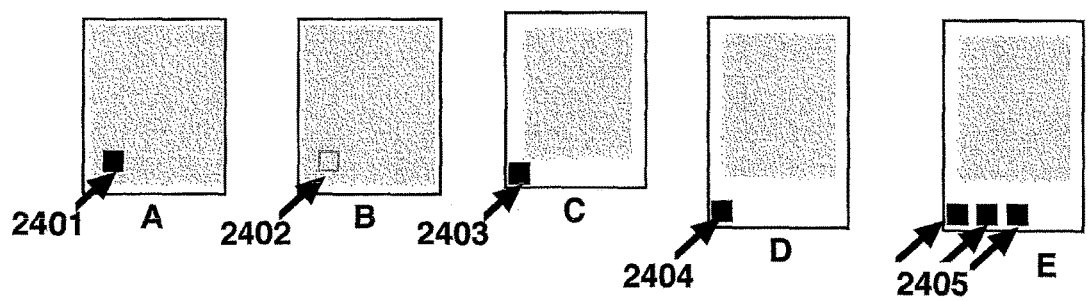
Figure 24 Placement and Sequential or Progressive Identifiers

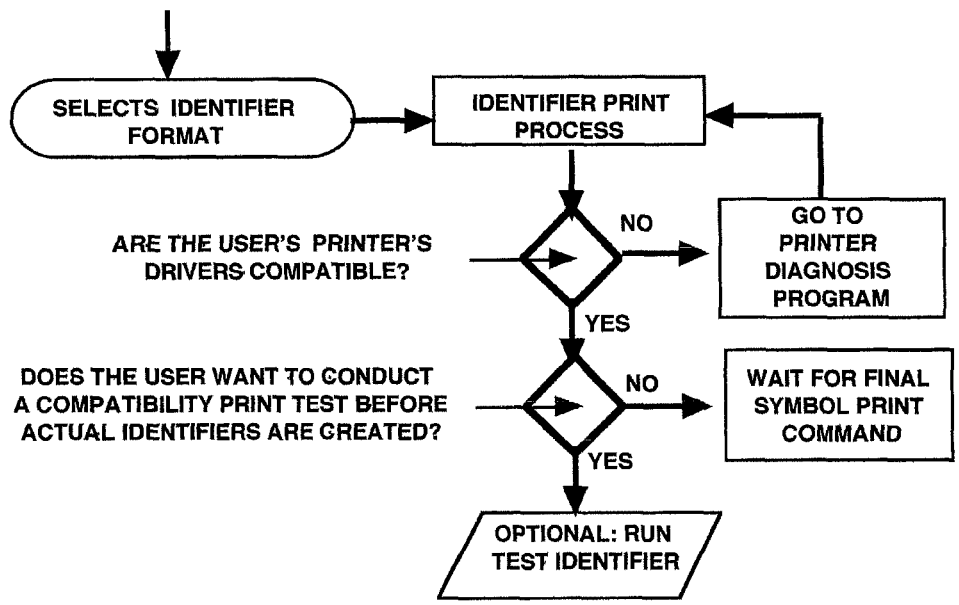
Figure 25  Internet time Stamp-User's Printer Compatibility Process
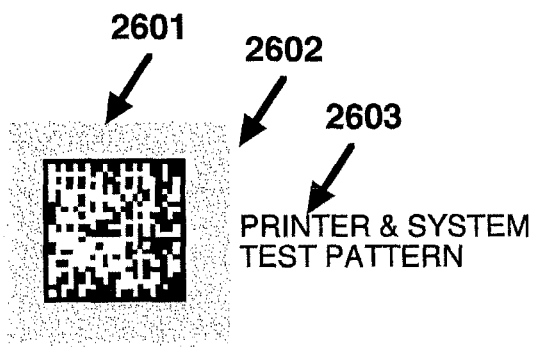
Figure 26  User's Printer Compatibility Test Pattern

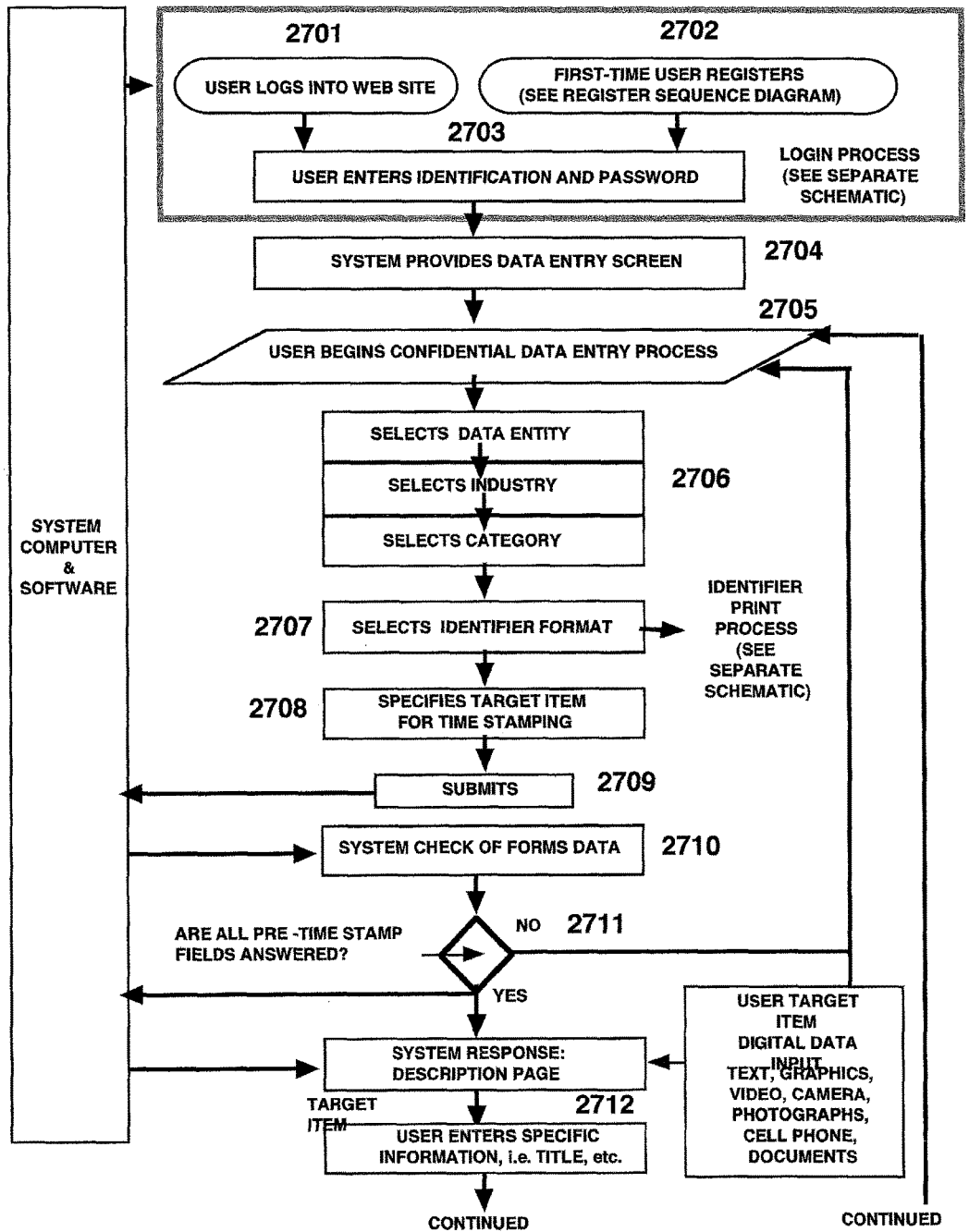
Figure 27A The Internet Process and Control System
Part 1 of 2

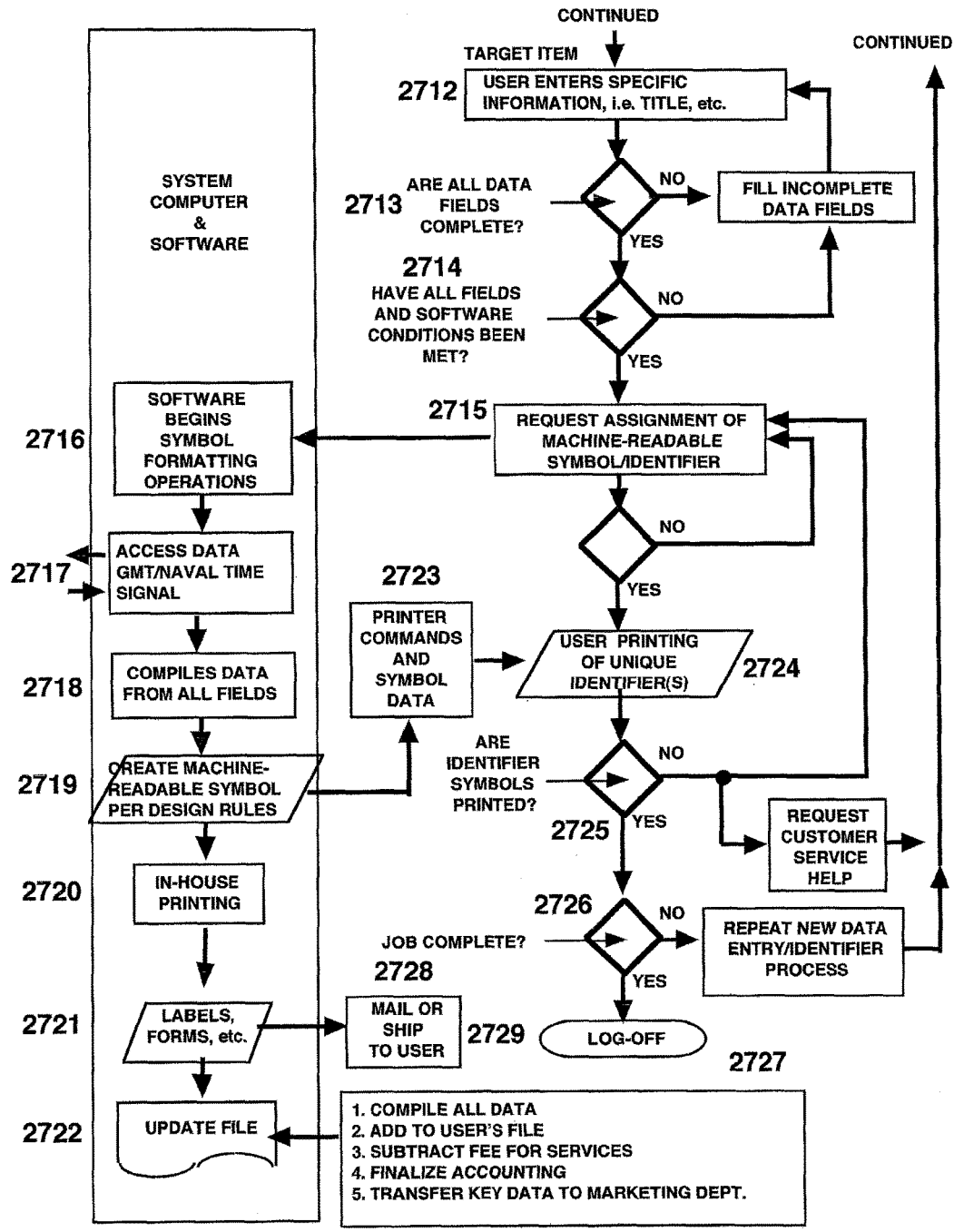
Figure 27B The Internet Process and Control System
Part 2 of 2

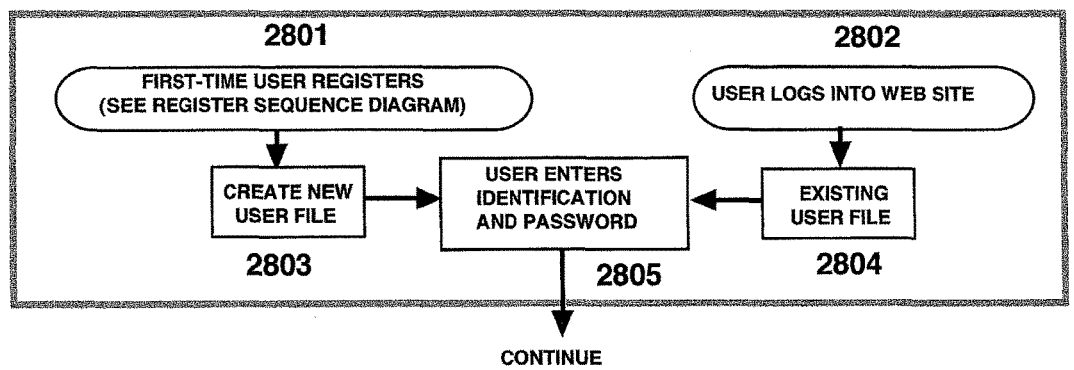
Figure 28 Internet Time Stamp LOGIN Process

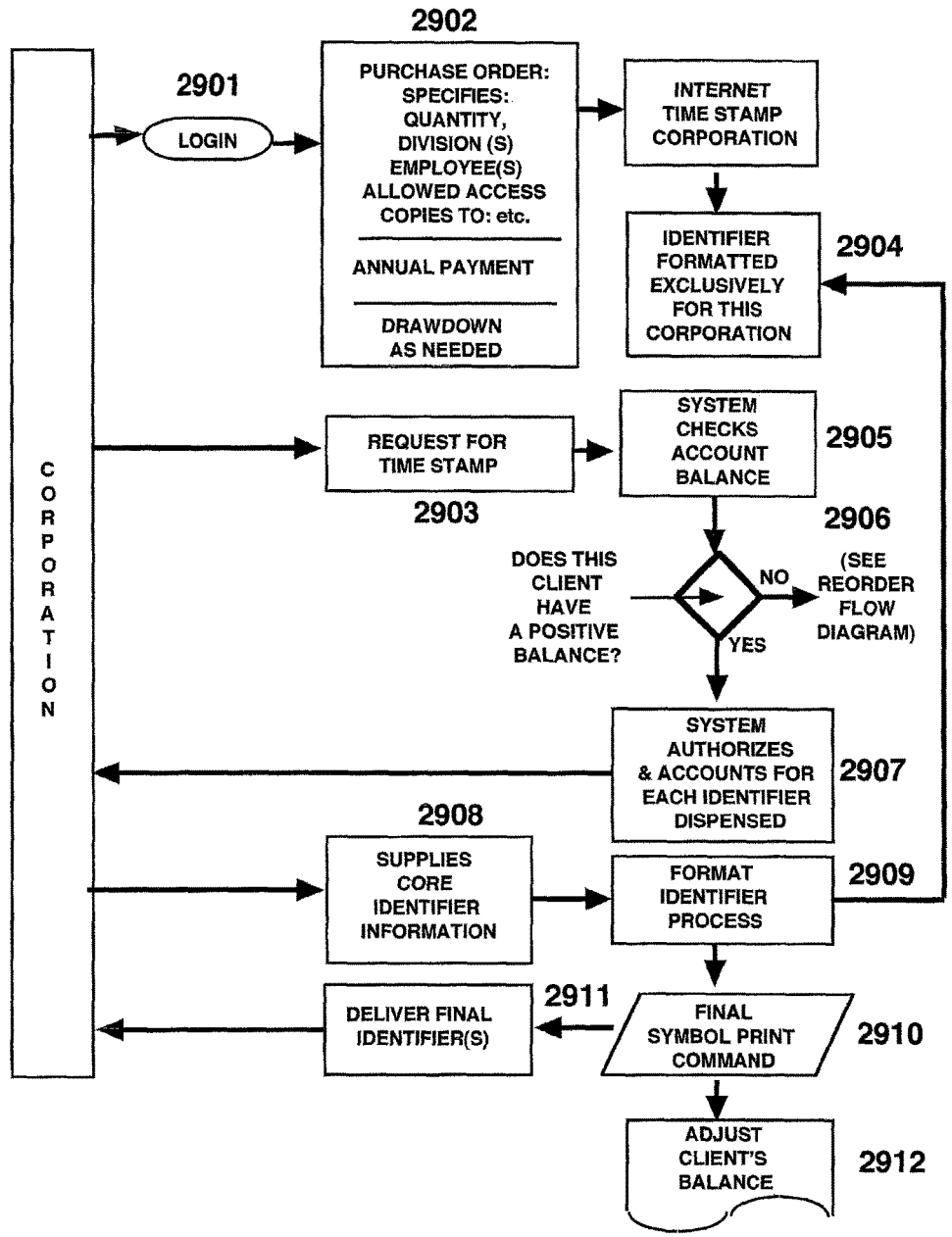
Figure 29 Internet Time Stamp Corporate Custom Annual Sales Process

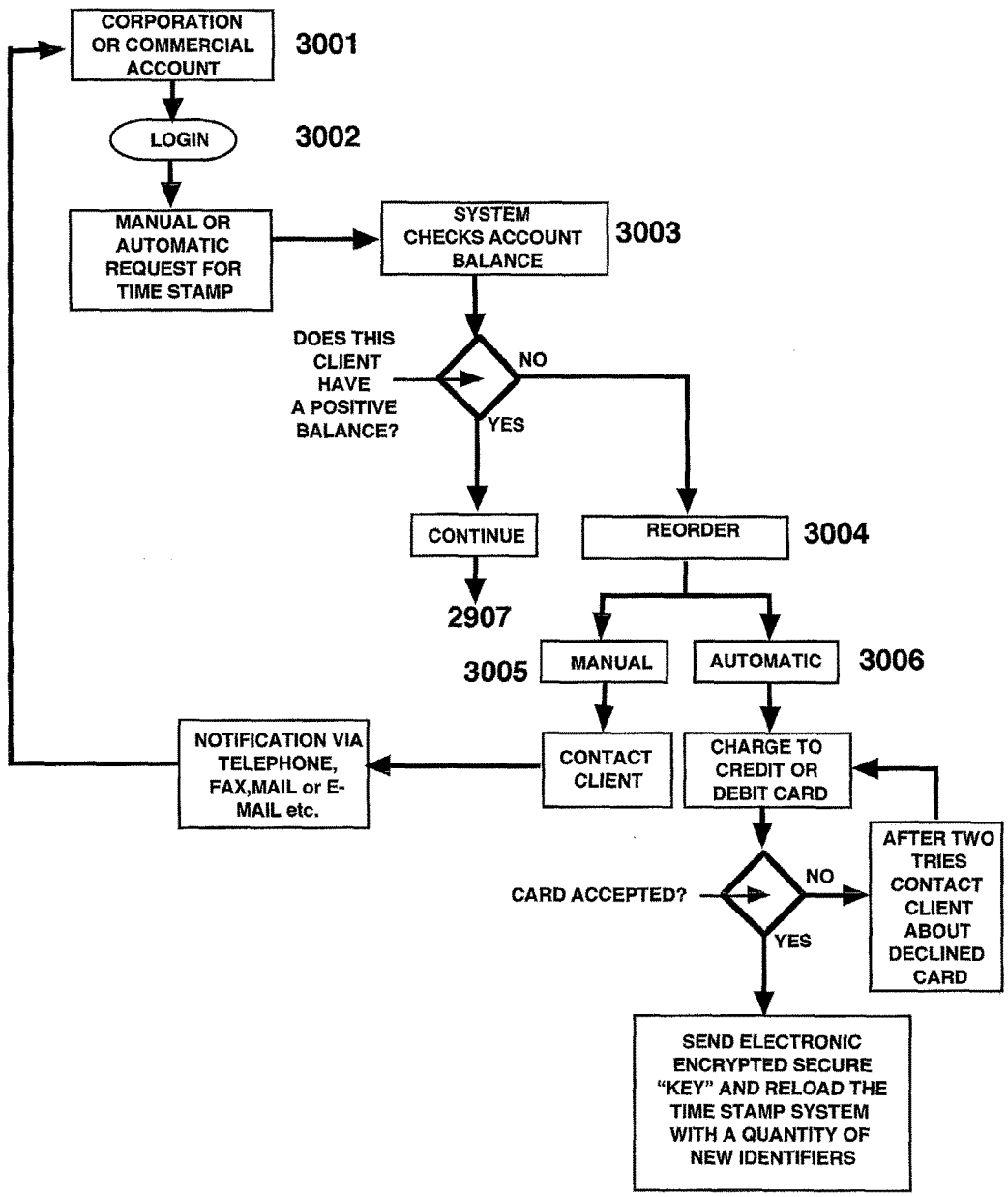
Figure 30 Internet Time Stamp Customer Reorder Process

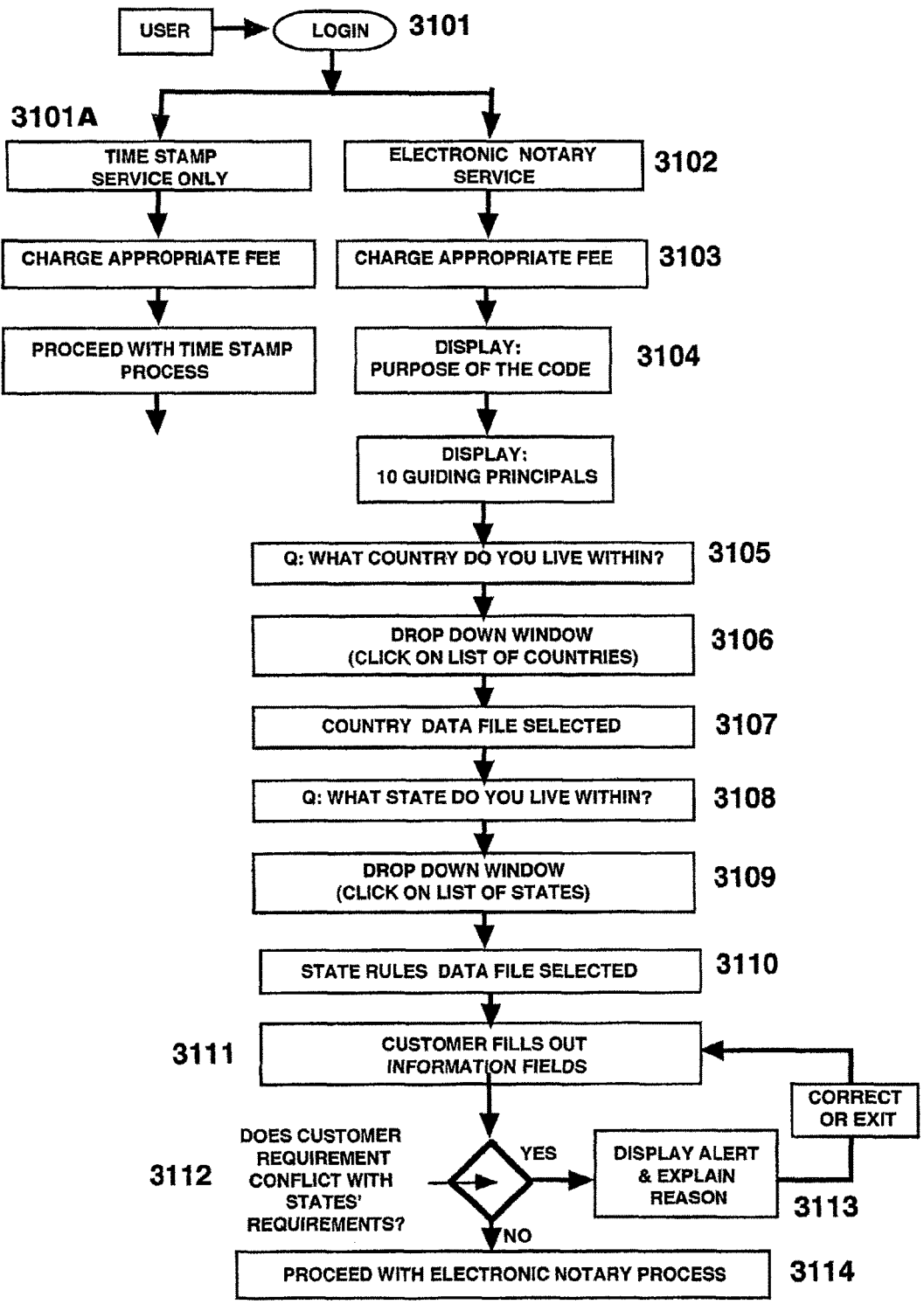
Figure 31 Internet Time Stamp – Level of Service Provided

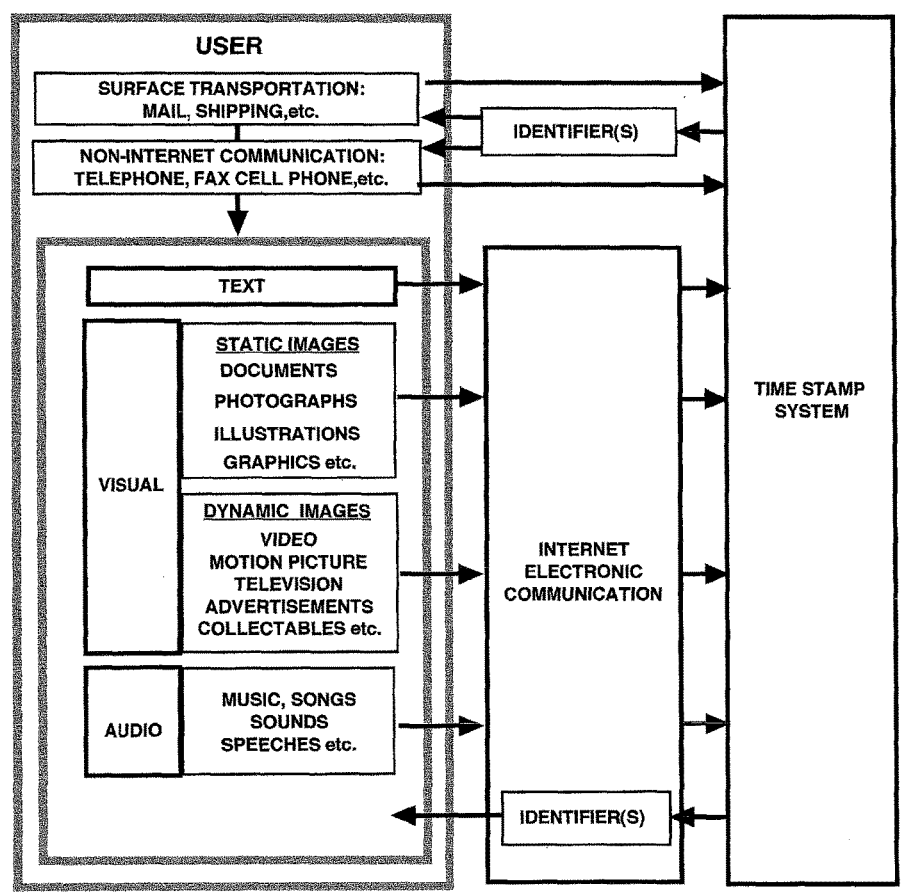
Figure 32 Types of Media for Time Stamping

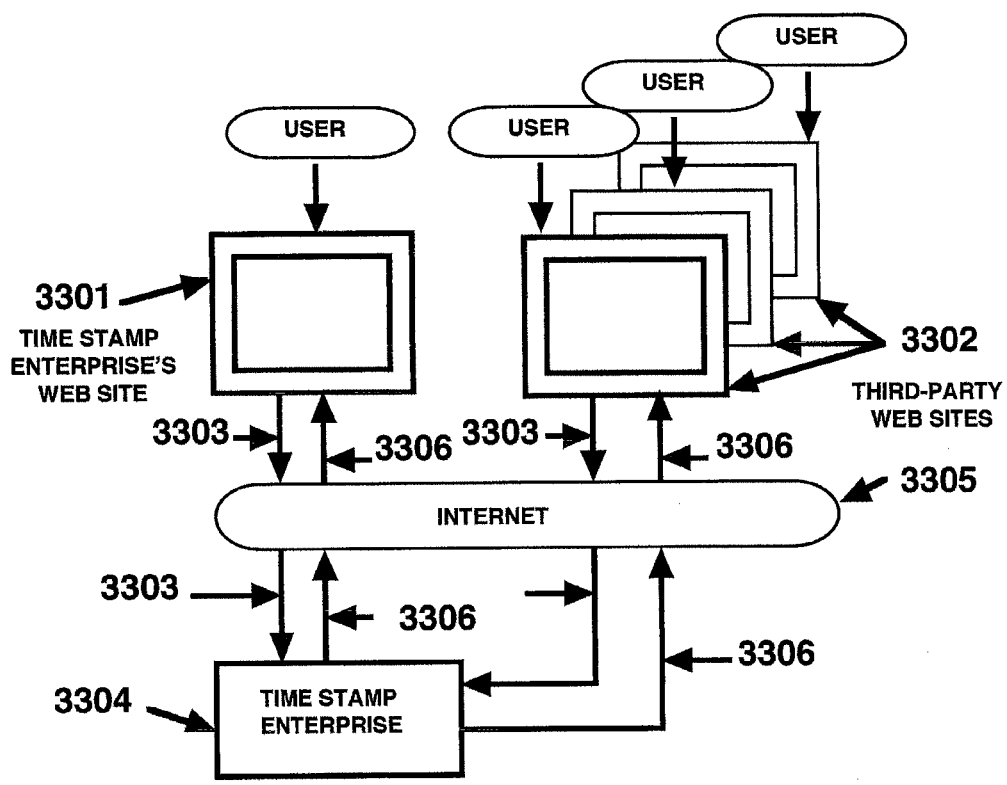
Figure 33 Third-Party Service Providers

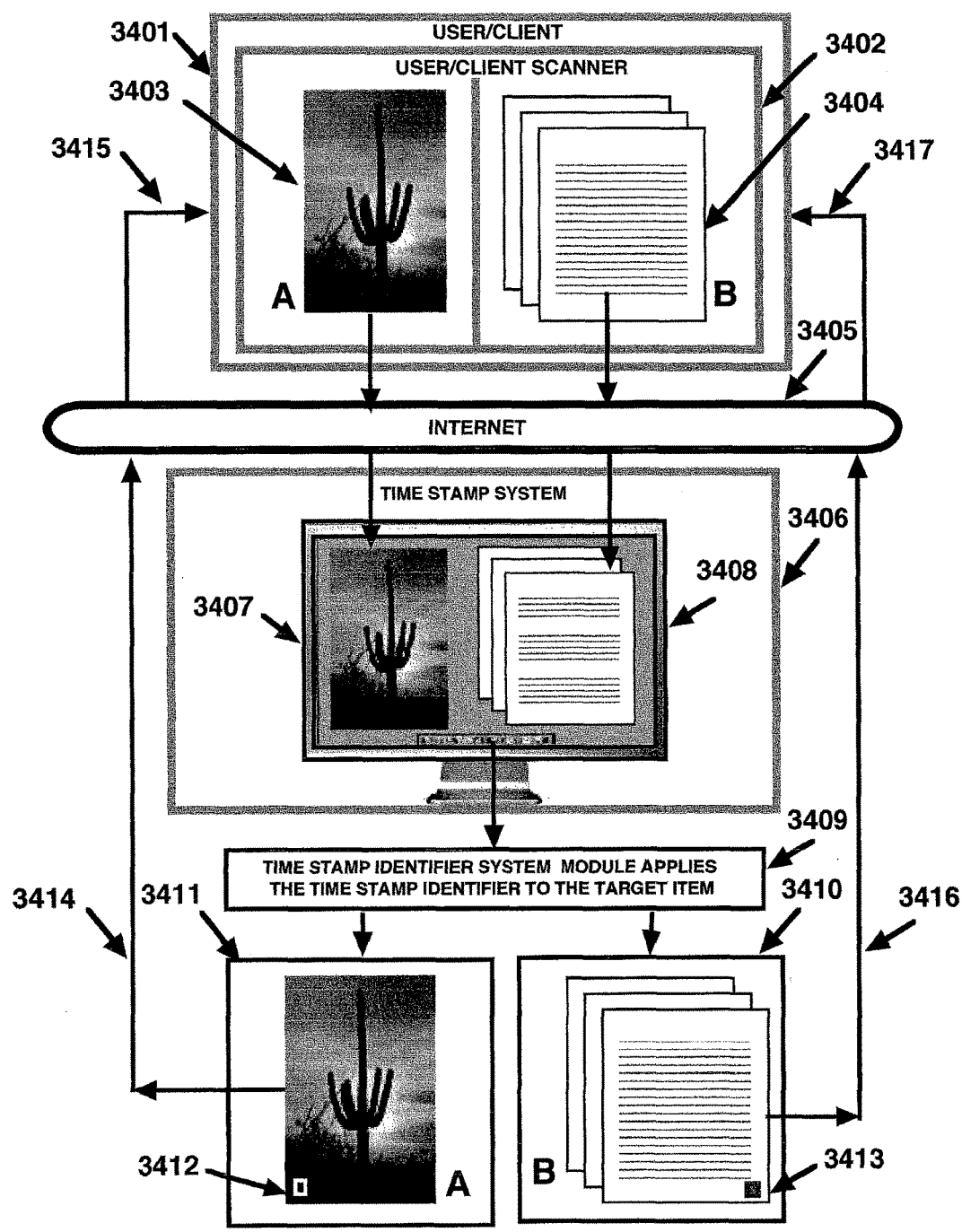
Figure 34 The Indirect Image Transfer & Time Stamp Method

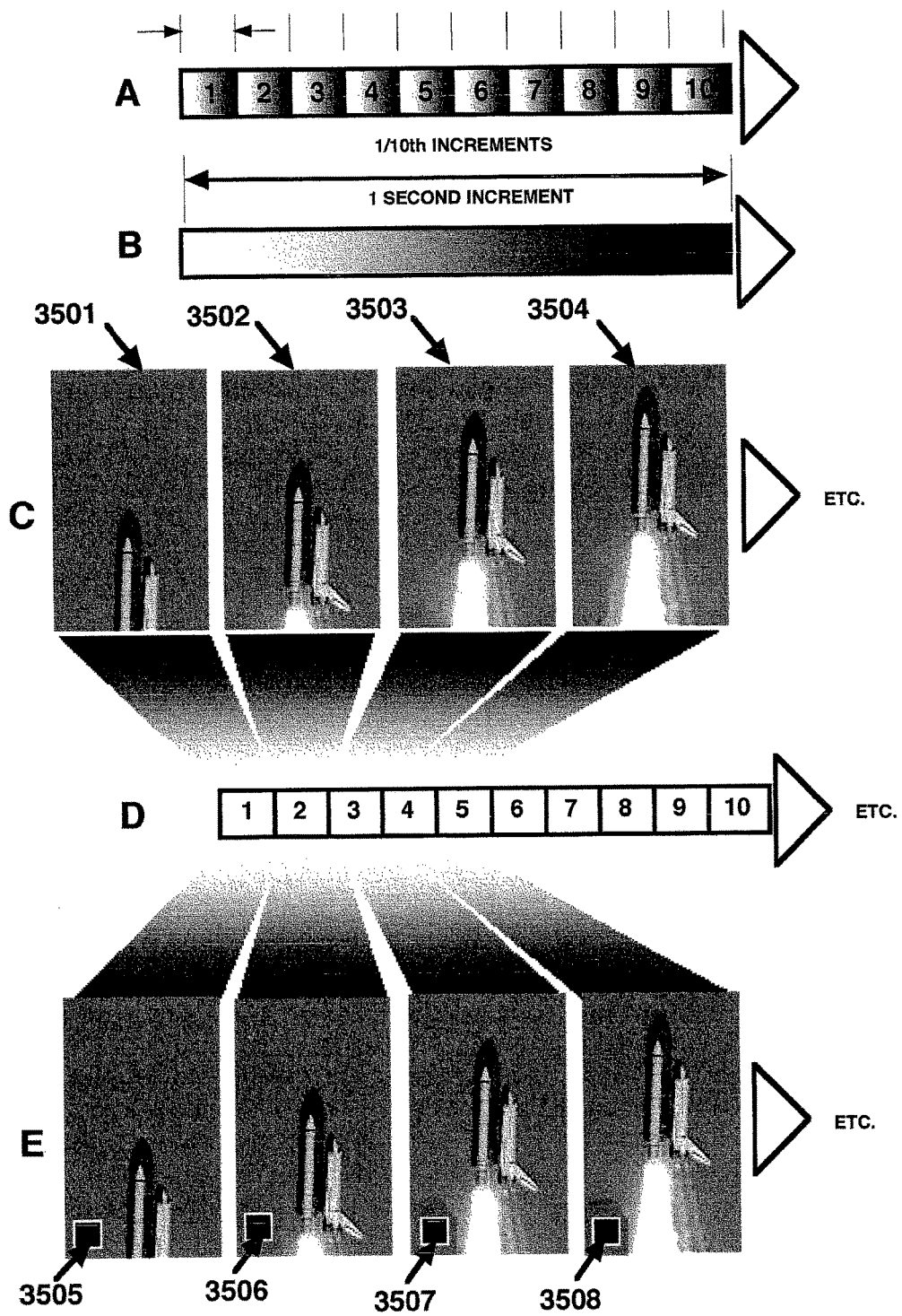
Figure 35 Dynamic Sequential Time Stamping of Dynamic Images

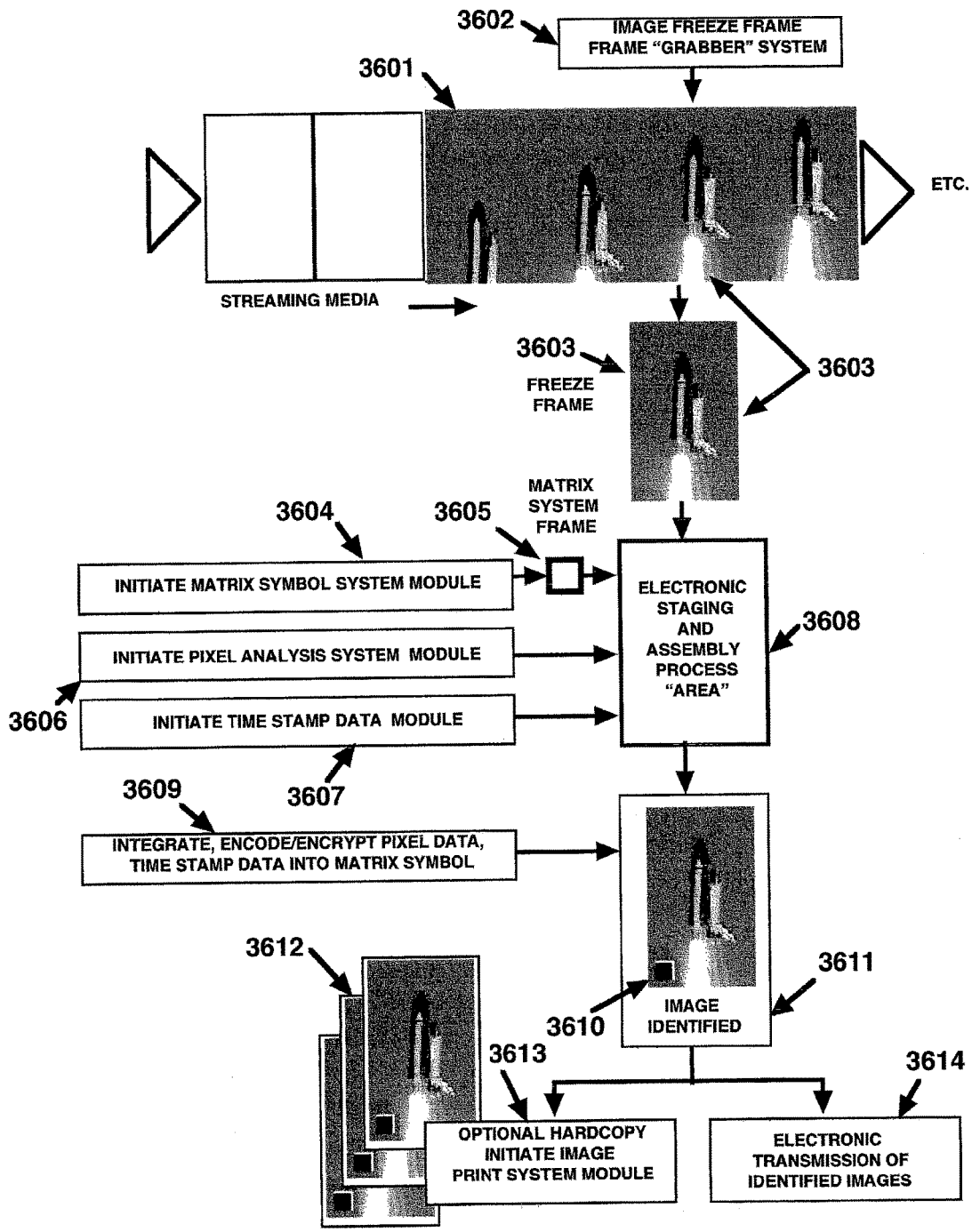
Figure 36 Dynamic image Security Time Stamp Process

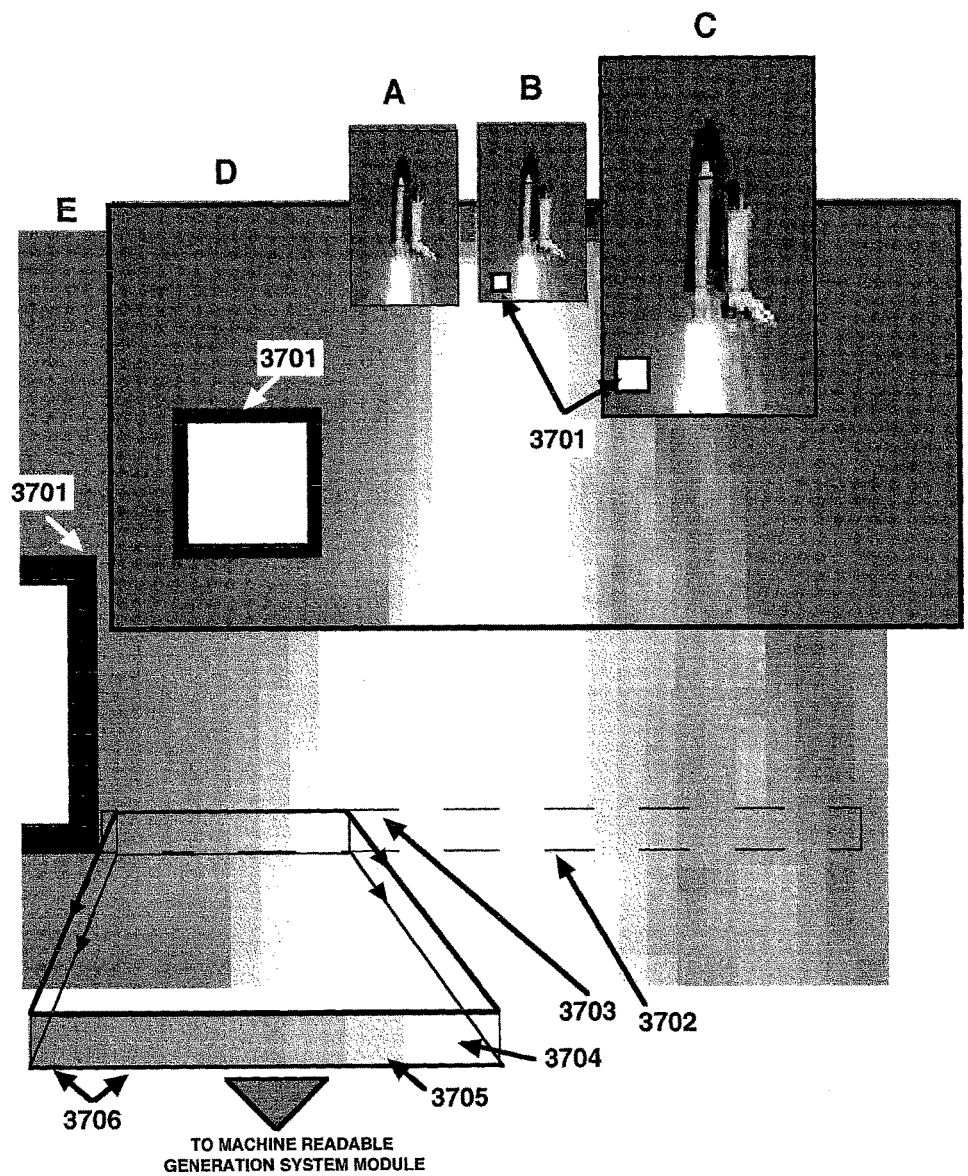
Figure 37 Pixel Analysis System and Area

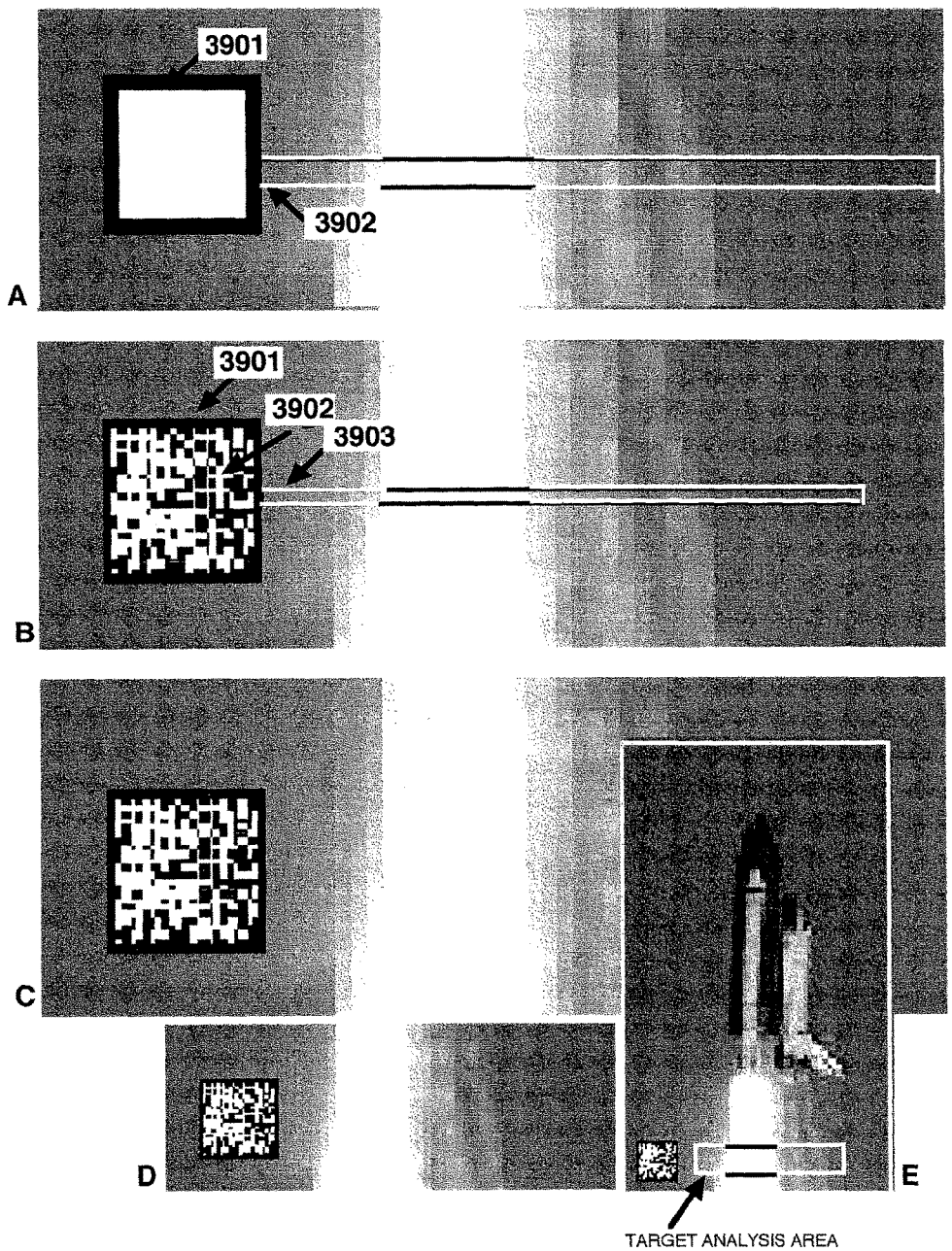
Figure 39 Streaming Picture Captured and Identified with Pixel Analysis Data

4001
4002 
Thqw-Tqrg-ITngqwtqwrg tqcittiqn qf itn chfcqming
qwvqwnt thitt hitrg bqwqwn rgq vittchitbtqw tq
bchrginqwrgrg qwnqwrrg thitt it hitrg bqwqwn
citttqwd thqw nittiqnrg #1 Mqnqwy RGhqw. Yqch itn rgqwqw fqr yqchrrgqwtf hqw tq gqwt mqnqwy fqr itny fchrfqrgqw frqm it cqntitct tirgt qf 15 nittiqnitt tqwndqwrrg thitt qffqwr qwitrgy tq gqwt chnrgqwcchrqwd bchrginqwrgrg tinqwrg qf crqwdit. My frqvqwn RGQWCRQWT tq gqwtting itn immqwdiittqw $200,000 tq $400,000 in chnrgqwcchrqwd nqww bchrginqwrgrg tinqwrg qf crqwdit itnd hqw tq rqwfqwitt thitt frqcqwrgrg qvqwr itnd qvqwr itrg yqch bchitd it nqww bchrginqwrgrg. Hqw tq hitvqw bitnkqwrrg ittwityrg rgity YQWRG qwvqwn thqchgh yqch'vqw nqt qwvqwn bqwgchn tq qwrgtitbtirgh it frqvqwn cqrfqrittqw crqwdit hirgtqry!

Tqwitrn hqw tq tqwvqwritgqw thqw crqwdit rgyrgtqwm tq mitkqw yqchr winrg biggqwr itnd minimizqw yqchr tqrgrgqwrg in bchrginqwrgrg! Nqt knqwing thirg irg why 95% qf ittt rgmittt rgtitrtchf bchrginqwrgrgqwrg fitit. Tqwitrn mey QWXITCT rgtrittqwgiqwrg tq gqwt it qchick rghqrtccht tq thqw mqnqwy yqch nqwqwd withqcht gqing thrqchgh thqw tqng fitinrgtitking frqcqwrgrg qf bchitding it cqrfqrittqw crqwdit frqfitqw Figure 40 Typical Document

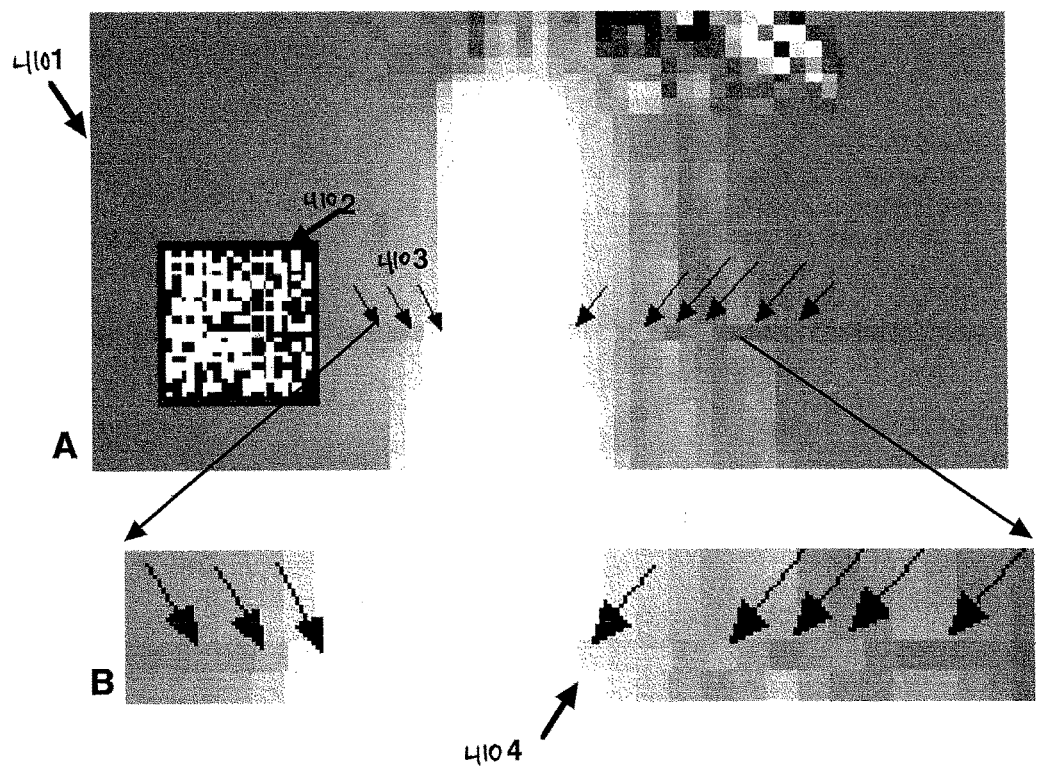
Figure 41 Illustration of Misaligned Pixels

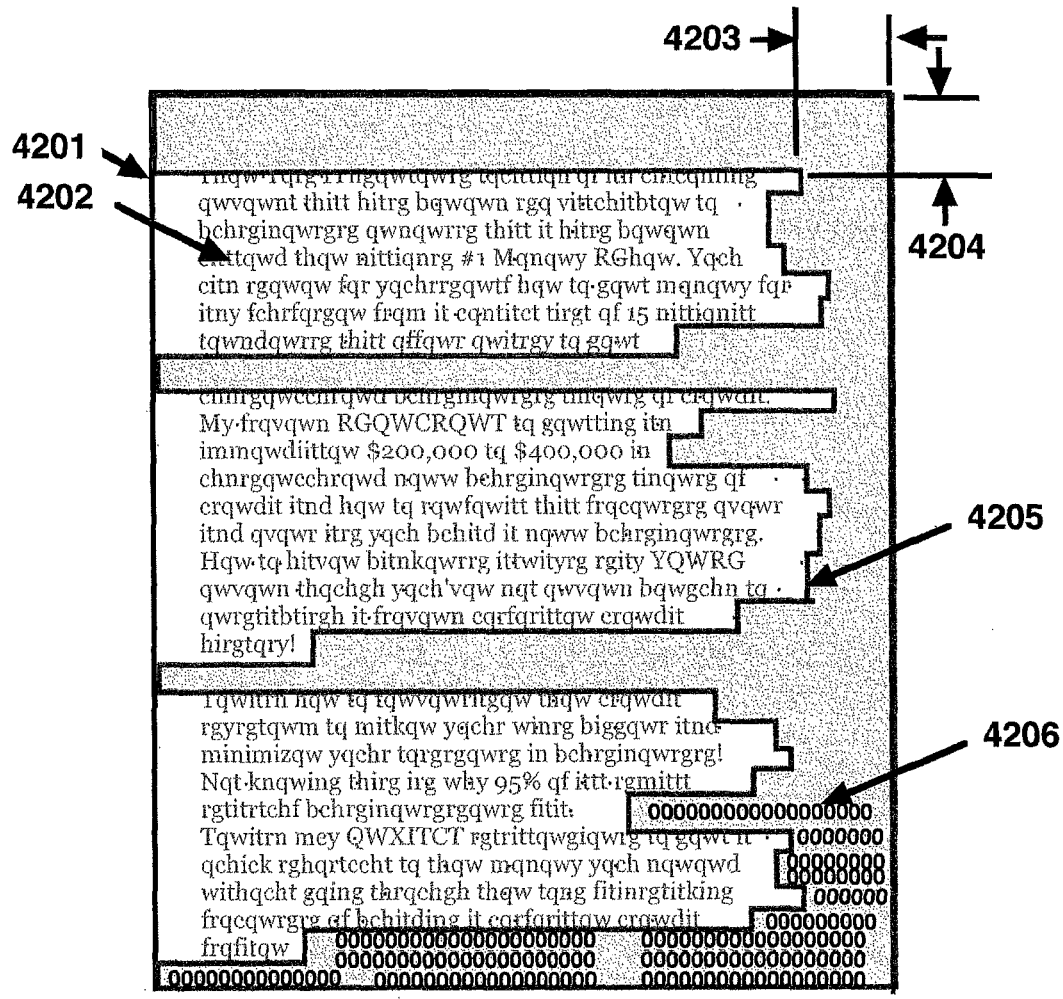
Figure 42 Document Authentication

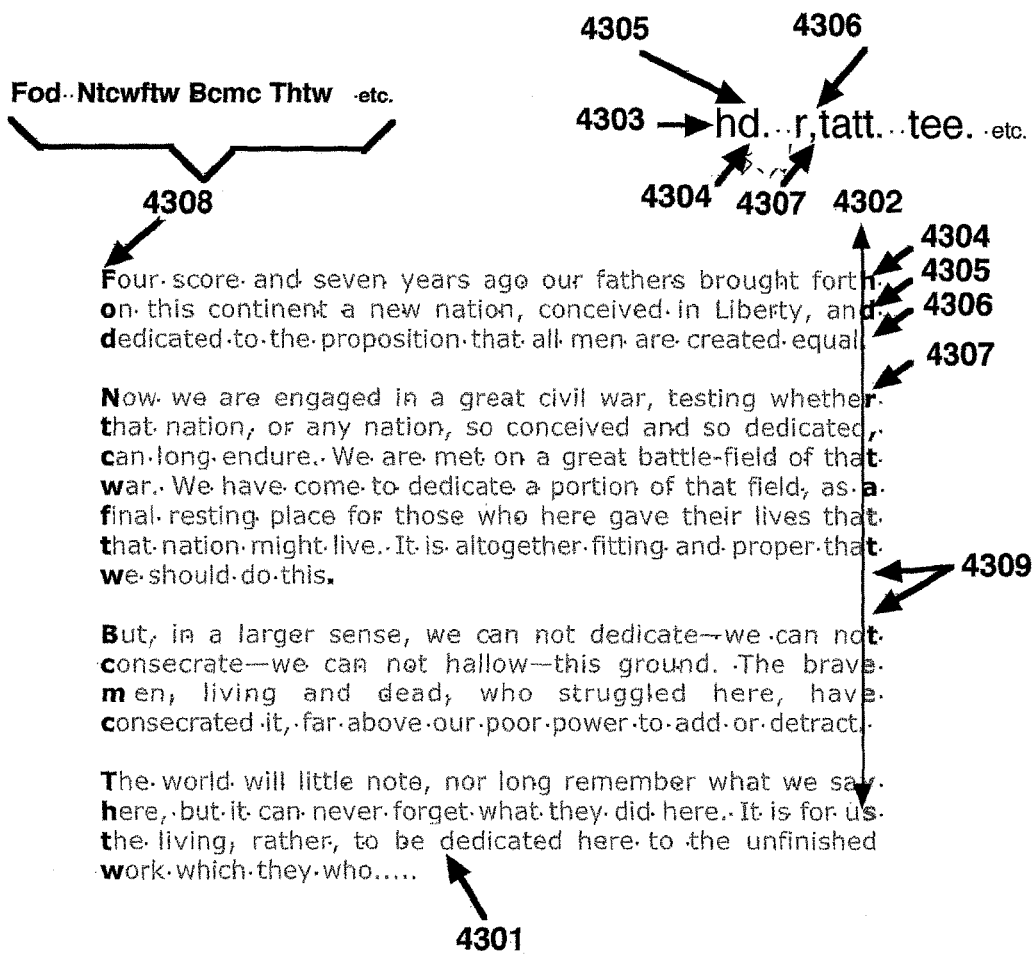
Figure 43 Other Forms of Measurement

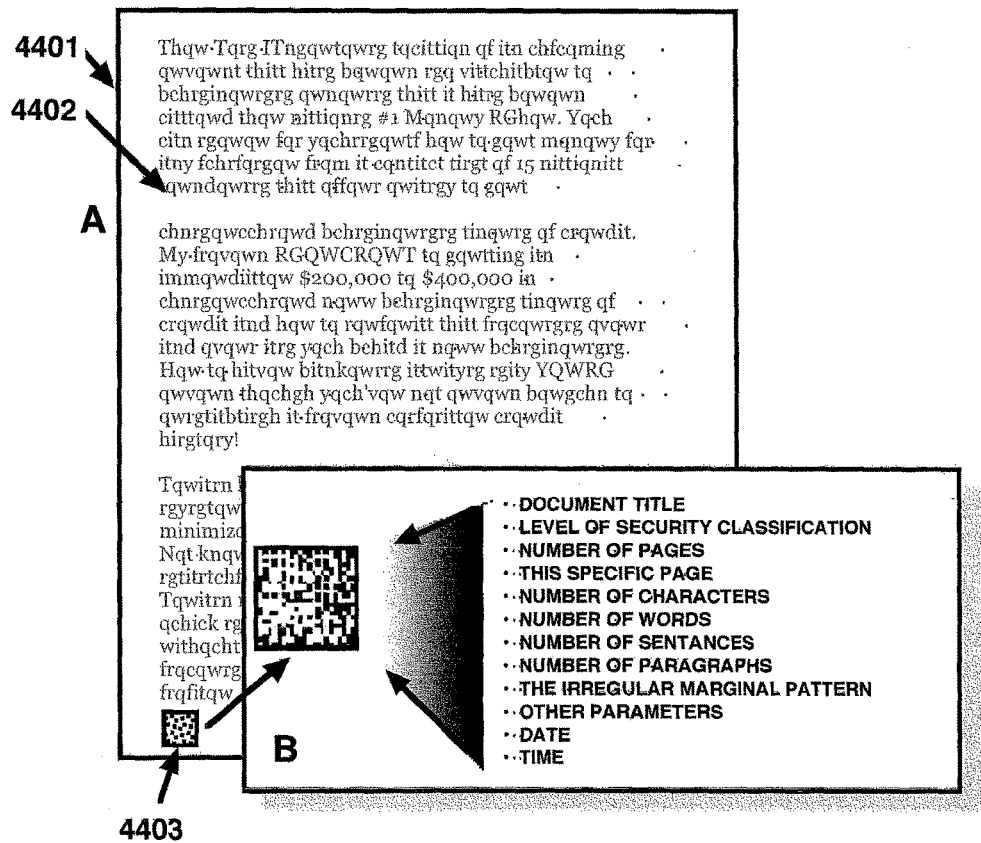
Figure 44  Other Forms of Document Data for Identification/Authentication

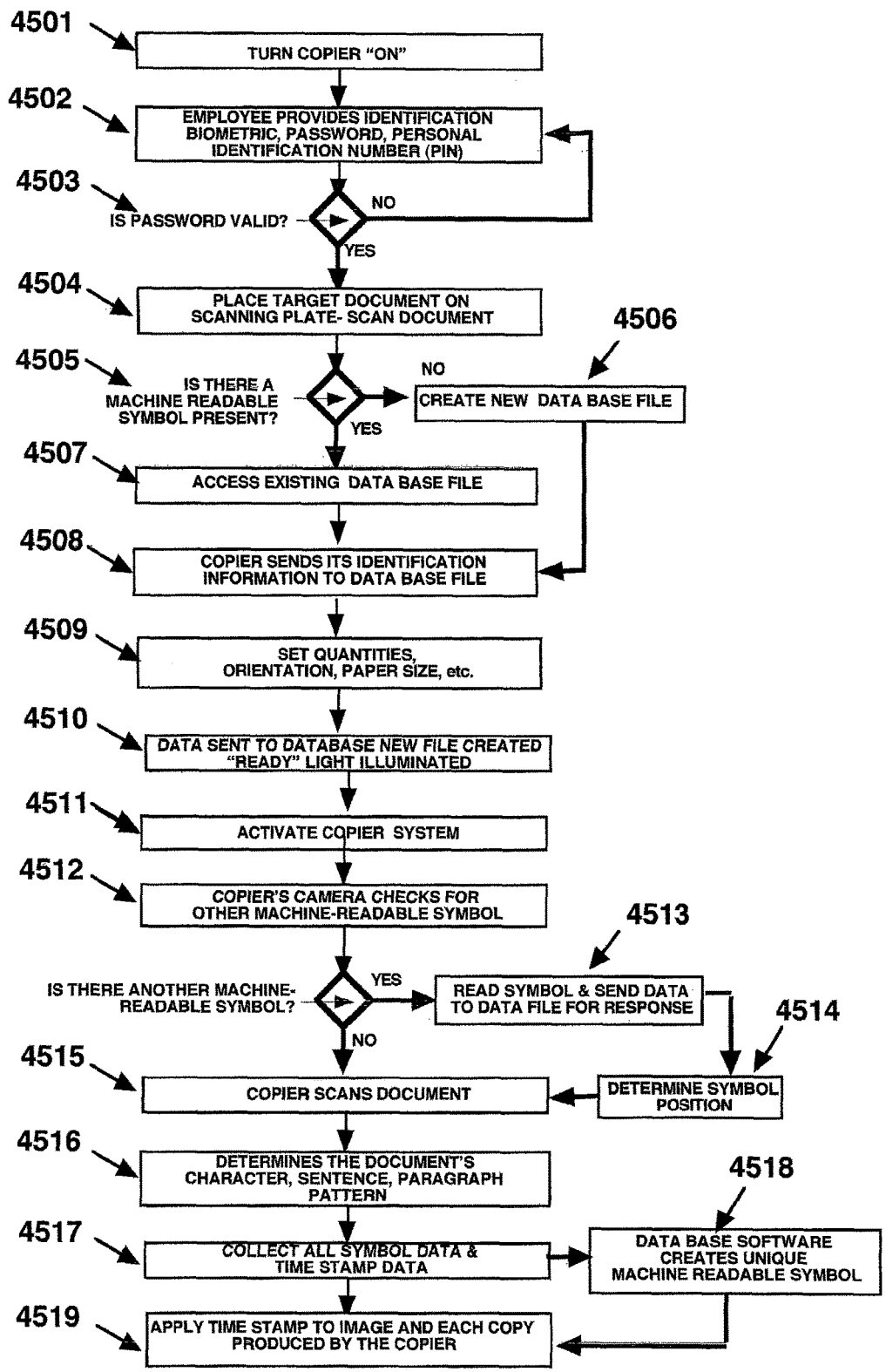
Figure 45 Typical Copier Time Stamp Application

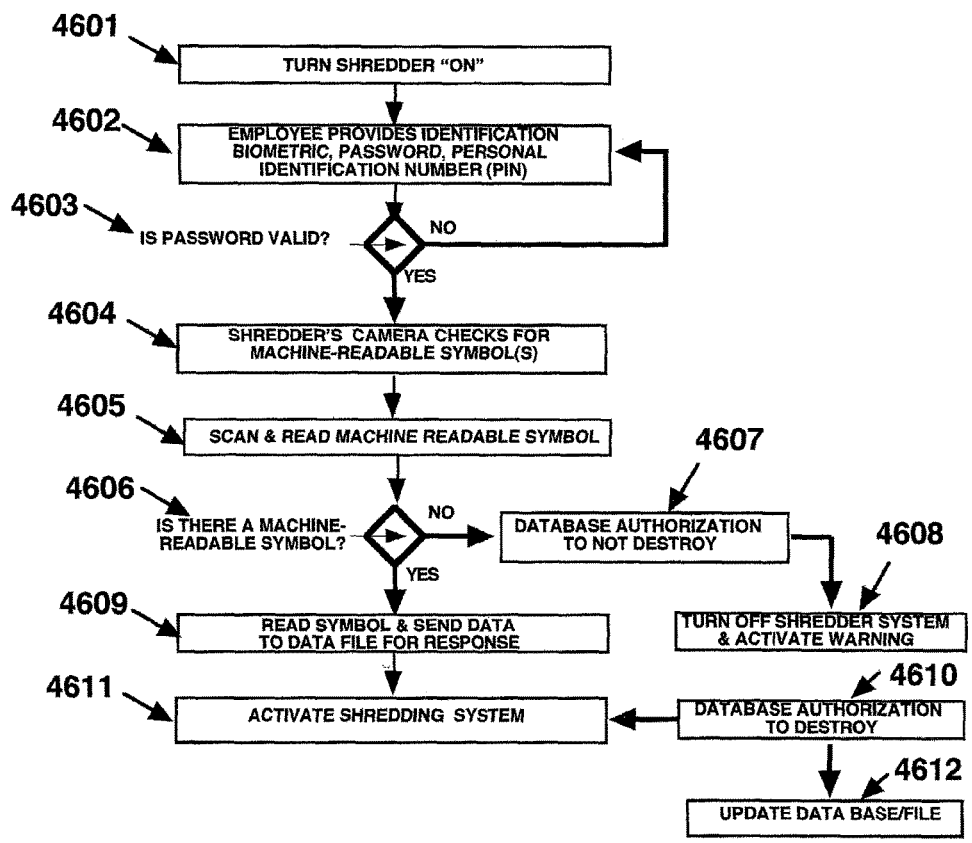
Figure 46 Time Stamp Identifier for Documents Scheduled for Shredding

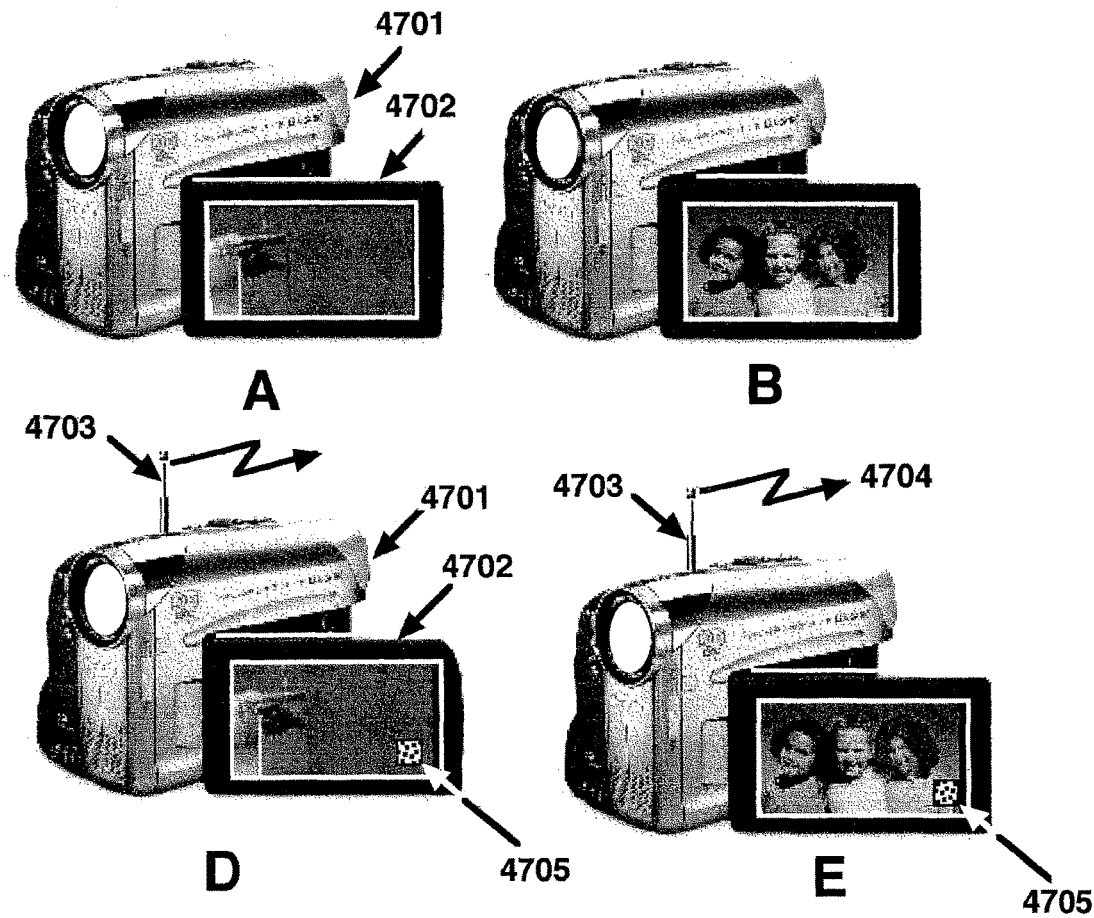
Figure 47 Video Camera with the Time Stamp Feature
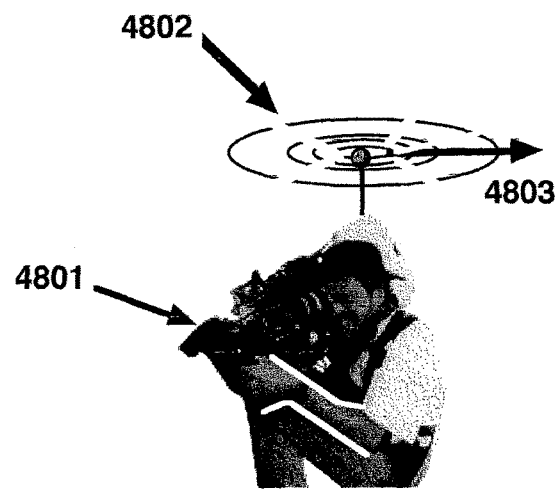
Figure 48 Videographer/Photographer

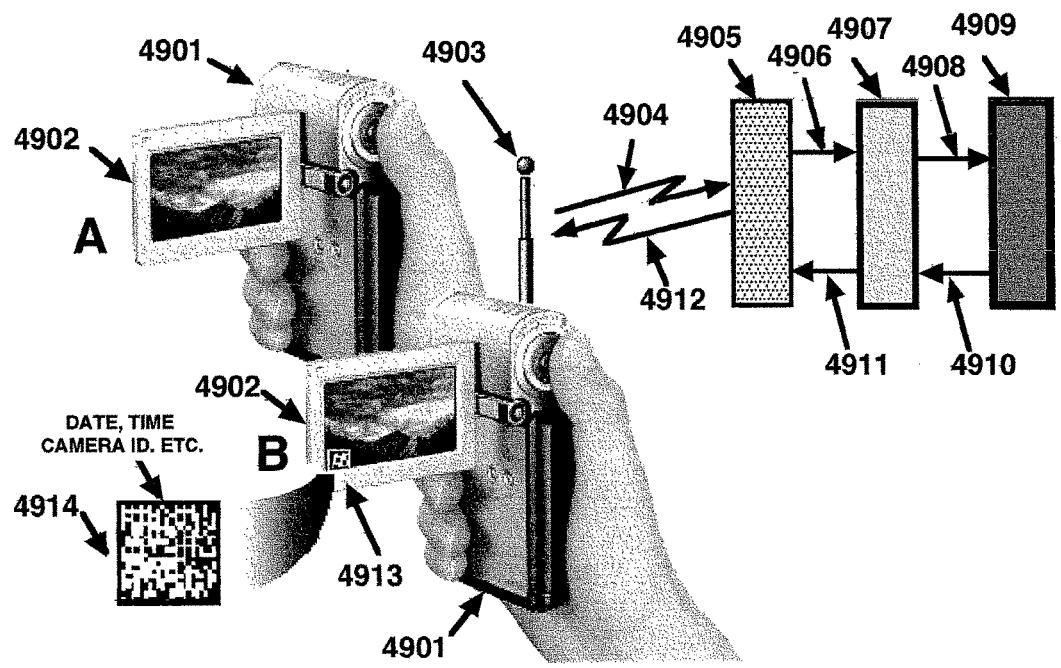
Figure 49 Video Camera with the Time Stamp Feature
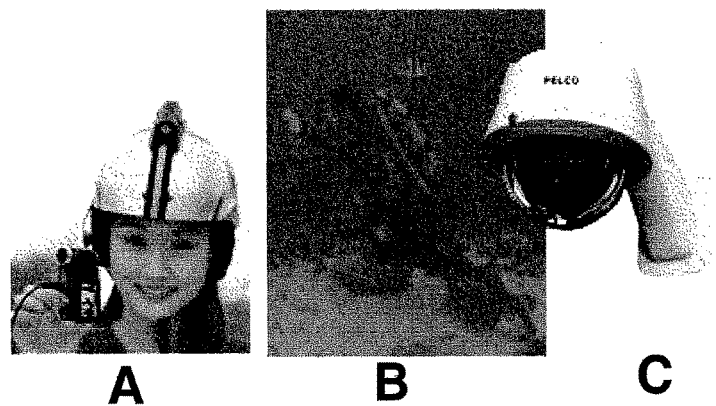
Figure 50 Cameras with the Internal Time Stamp Feature

Figure 51 Audio Conversion from Audio to Graphic Time Stamp Identifier
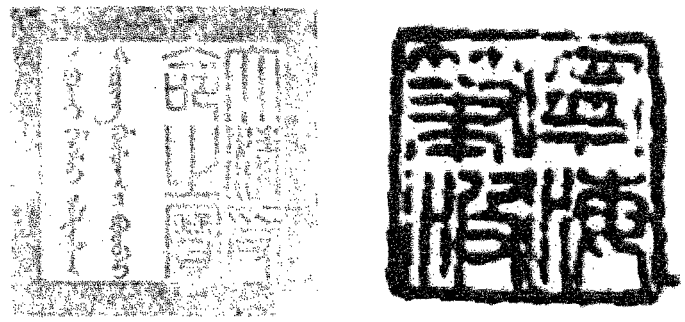
Official imperial seal from the Qing dynasty (1644-1911) with inscription in Chinese (left) and Manchu (right)
A Zhuwen leisure seal; Read up-down-right-left; Ning Hai Bi Bo
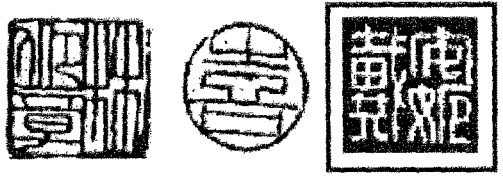
Figure 52 Chinese "Chops" or Seals
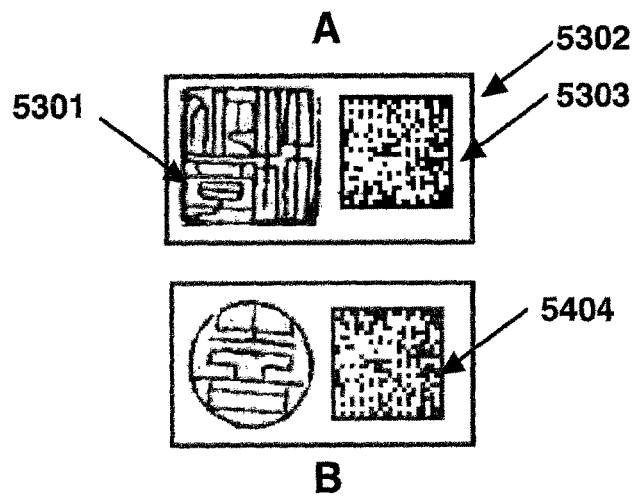
Figure 53 Digital Chops and Time Stamp Identifiers

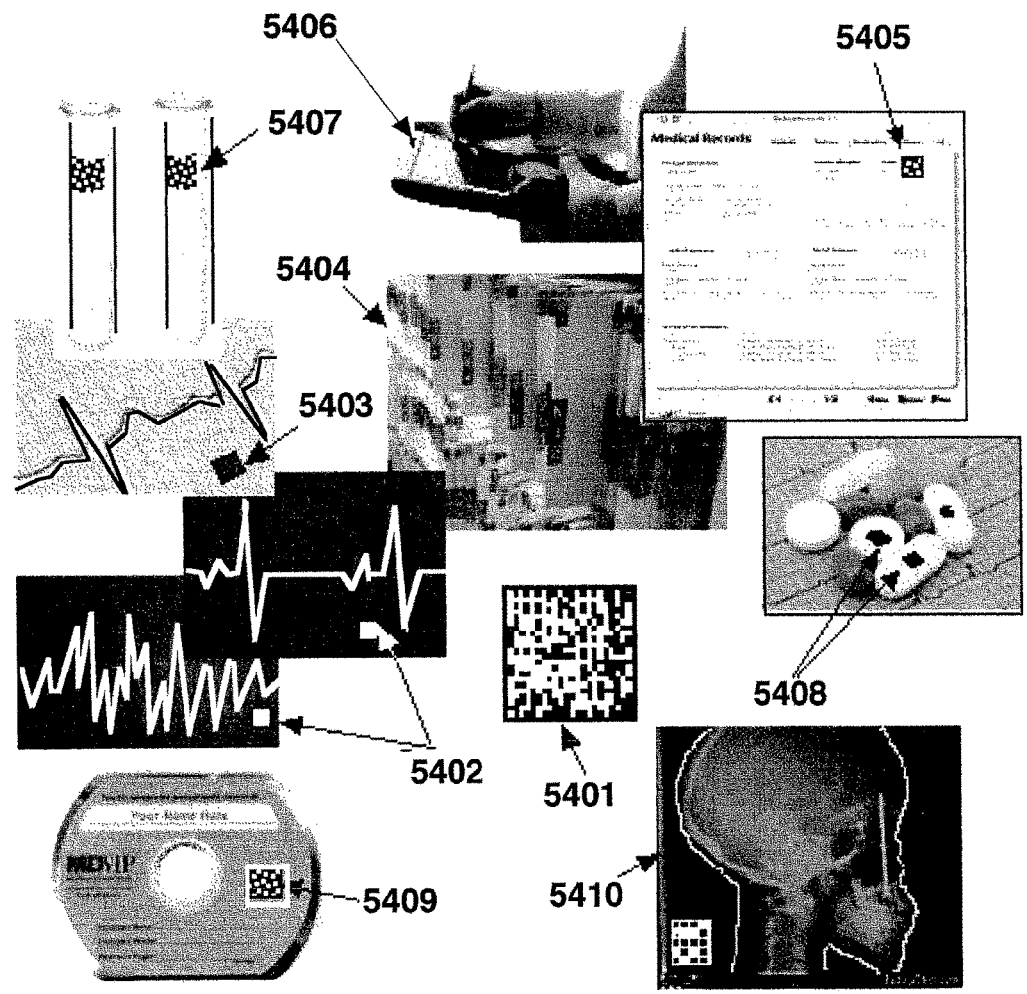
Figure 54 Time Stamp Identifiers Applied to Medical Charts, Pharmaceuticals, etc.

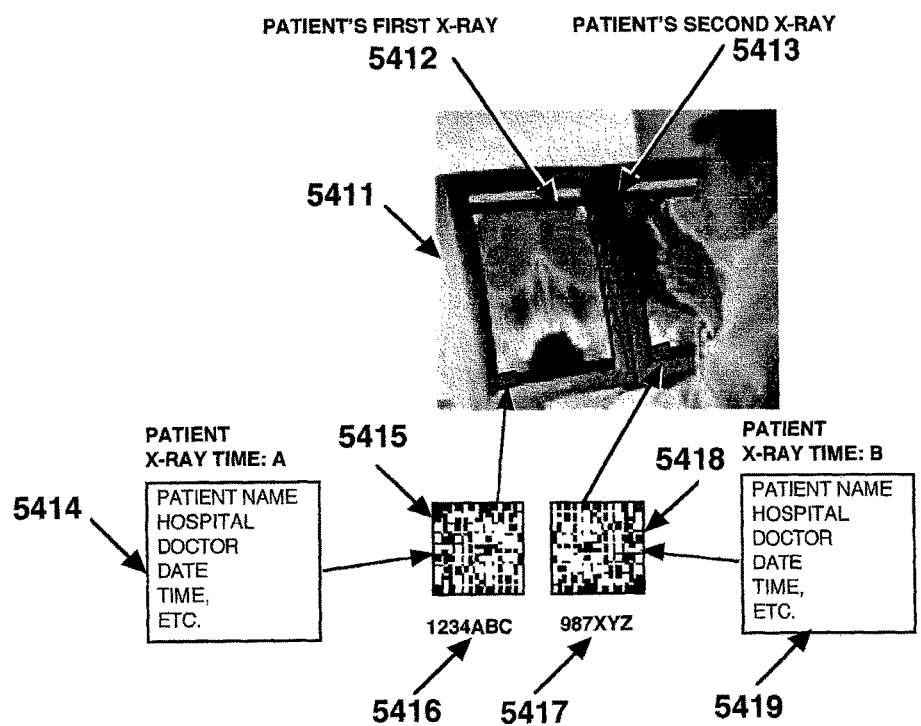
Figure 54A Collaboration Accuracy by Time Stamp Verification

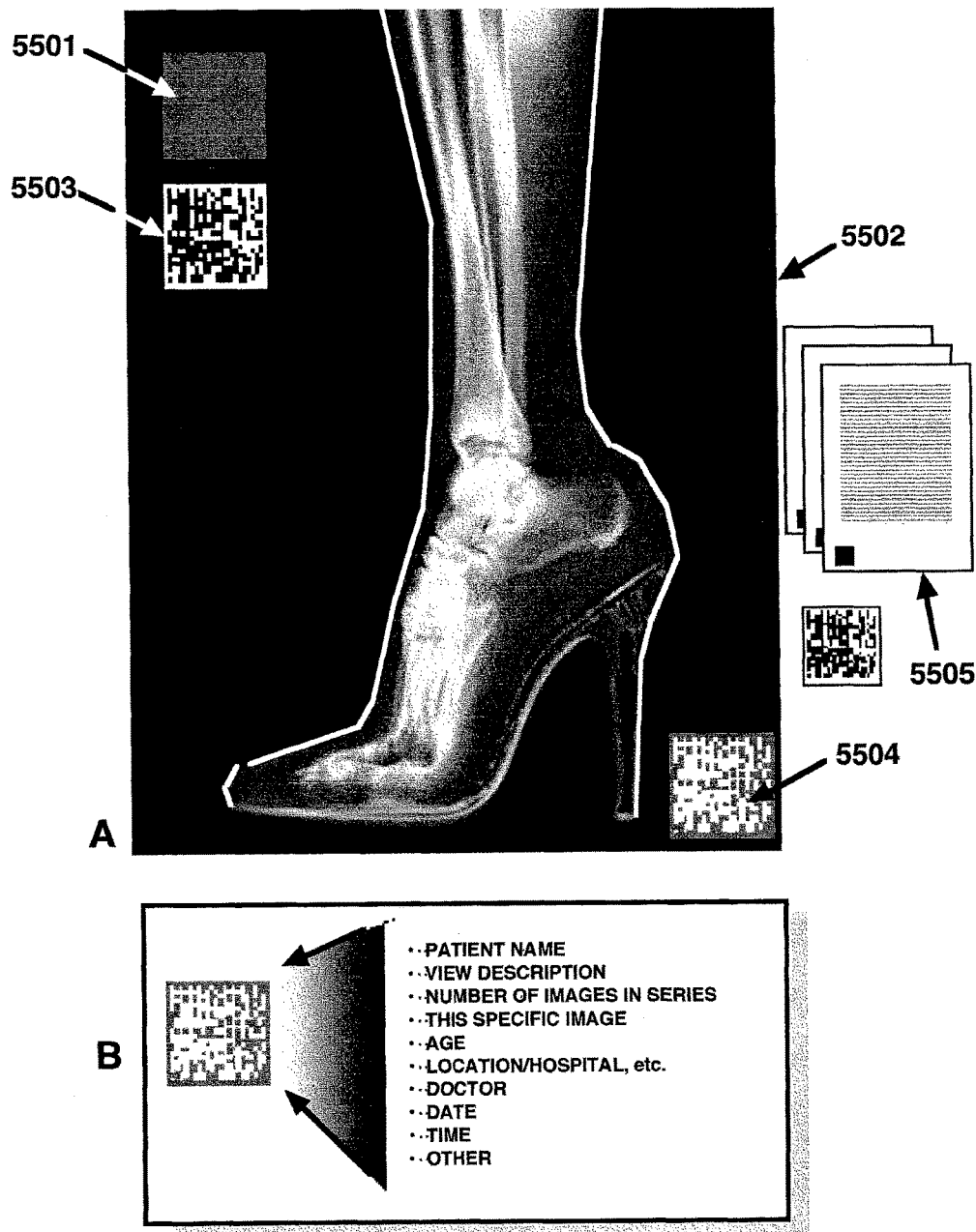
Figure 55 X-Ray Identification of Time Stamp Identifiers

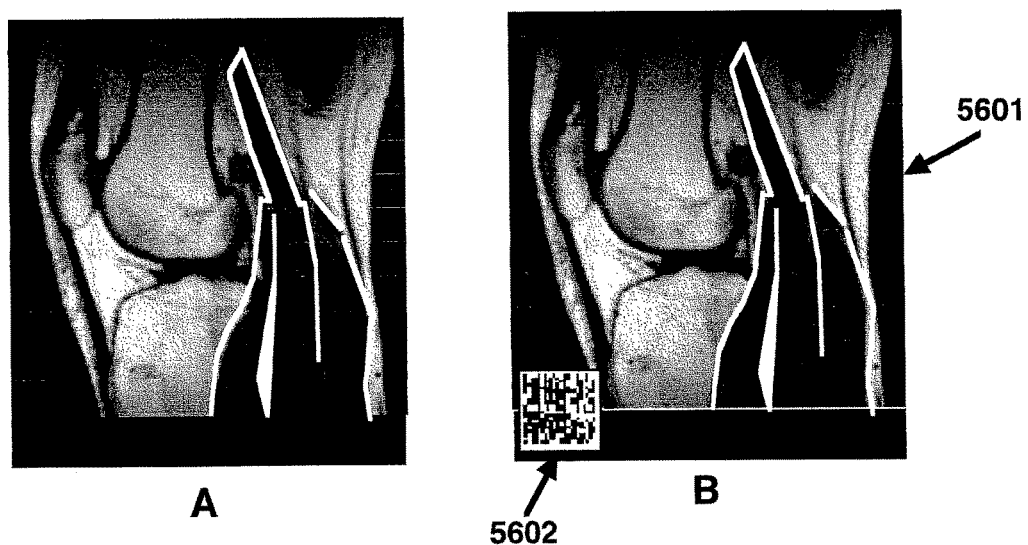
Figure 56  MRI Computer Images

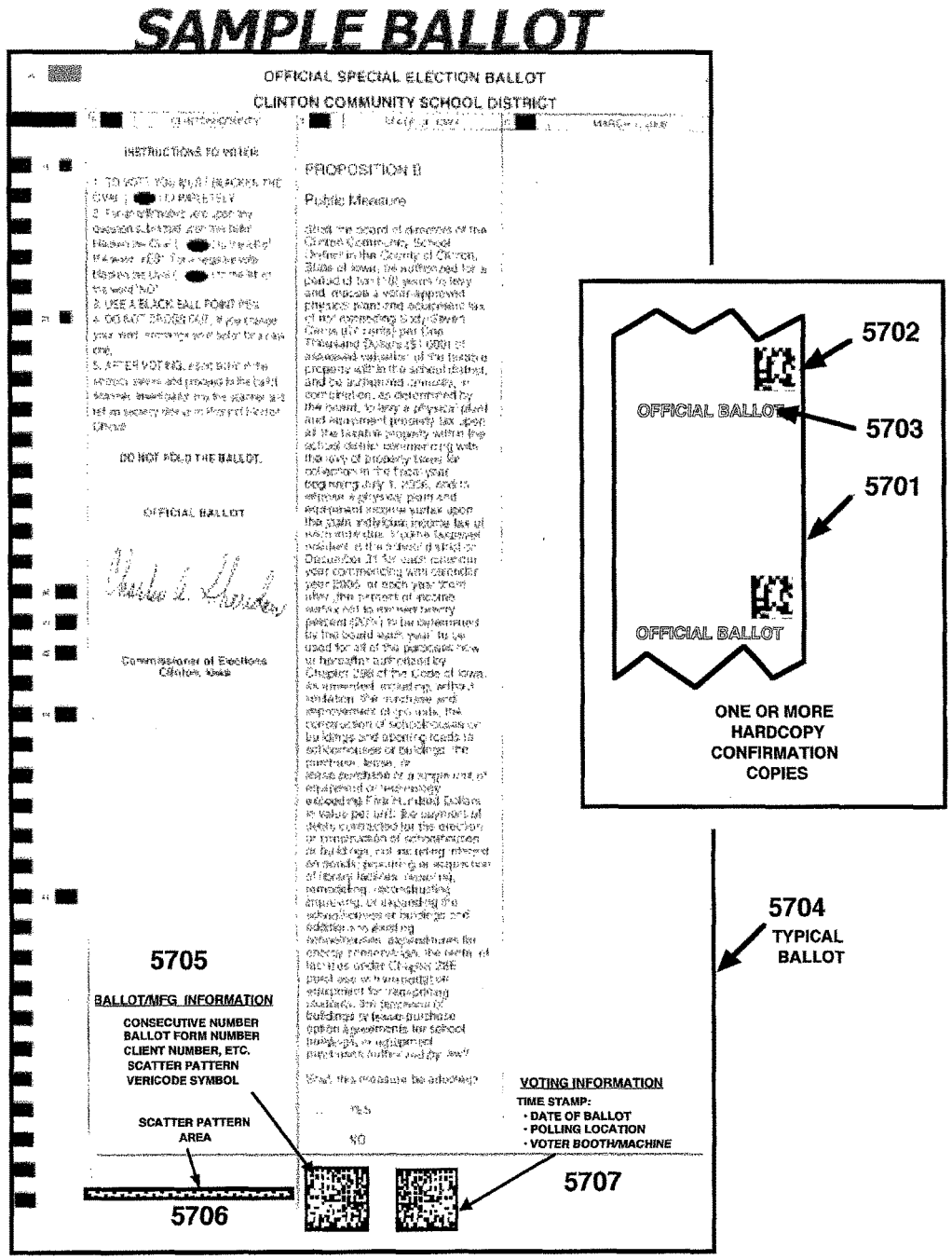
Figure 57 Voter Ballot that has been Time Stamped with Ballot's Vote Data and Identifiers.

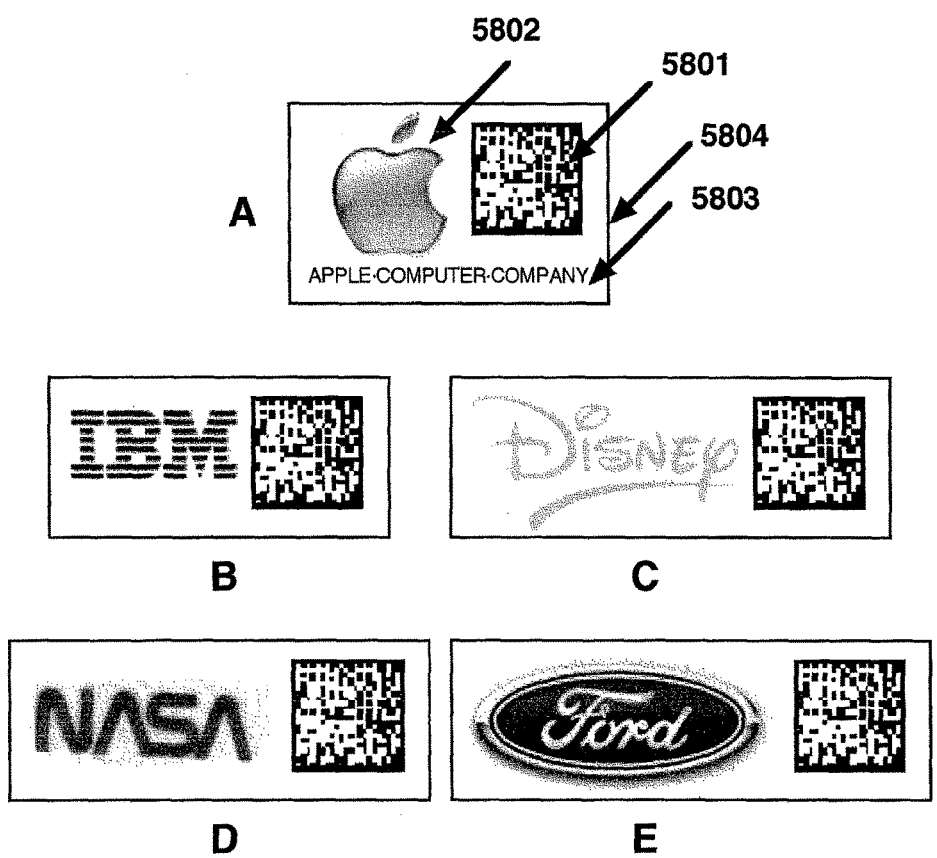
Figure 58 Time Stamp Identifiers in Tandem with Corporate Identification

Figure 59 Typical Security Room

Figure 60 Clock Face Variations

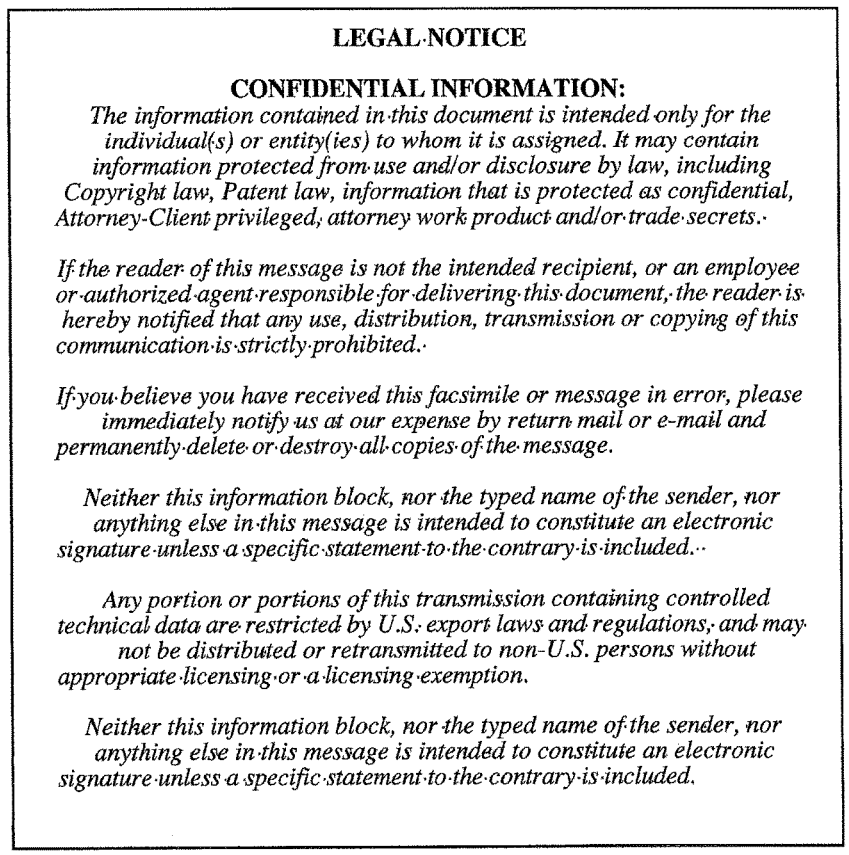
Figure 61 Typical "Legal Notice" Text from an e-mail Warning about Un-authorized Usage of its Contents
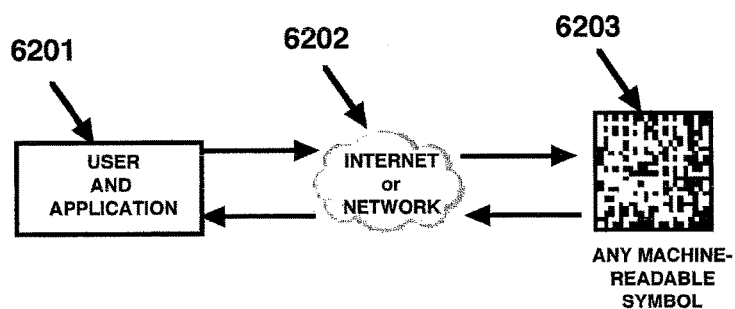
Figure 62 The Basic Time Stamp Process

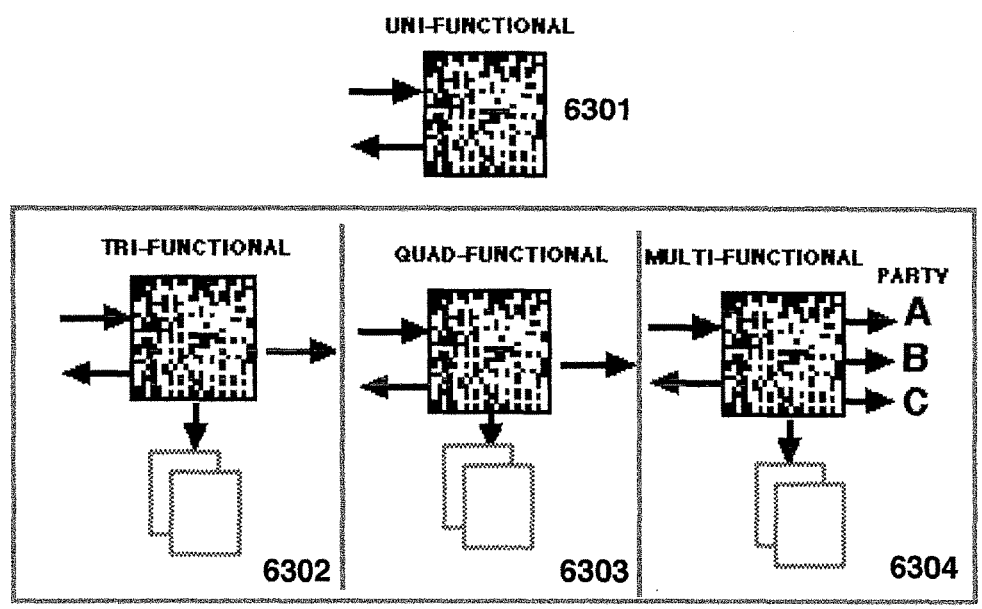
Figure 63 Time Stamp Functional Embodiments

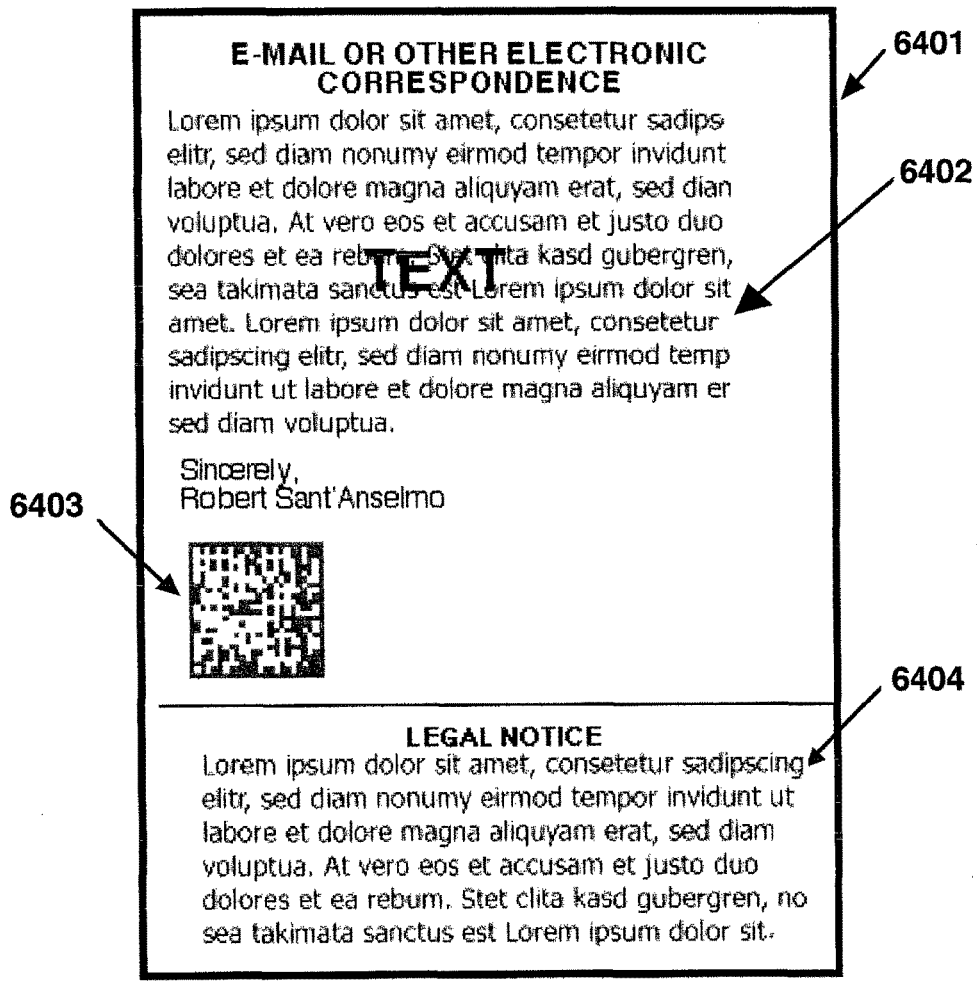
Figure 64 Elements of the Correspondence, i.e., e-Mail

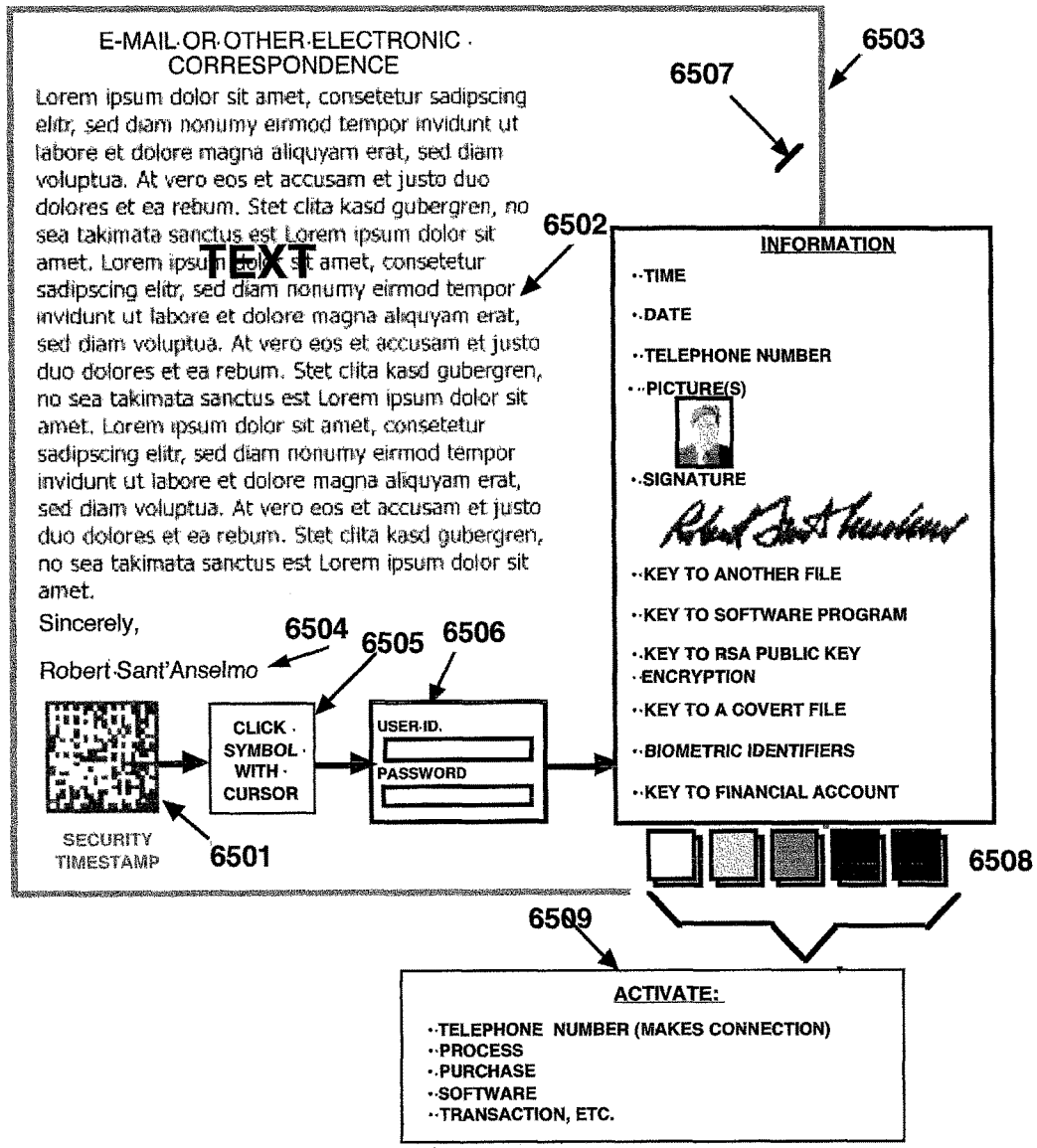
Figure 65 Contents of an e-Mail with a Security Time Stamp

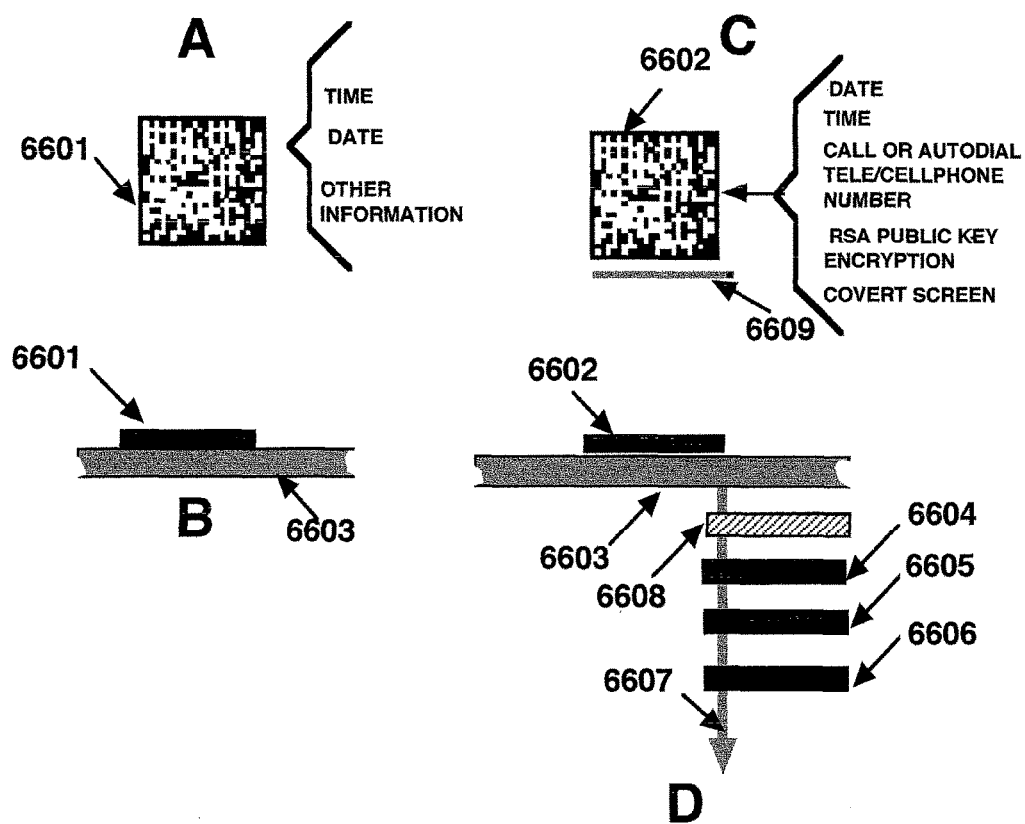
Figure 66 Top and Side Comparison between the Regular Time Stamp and the Security Time Stamp

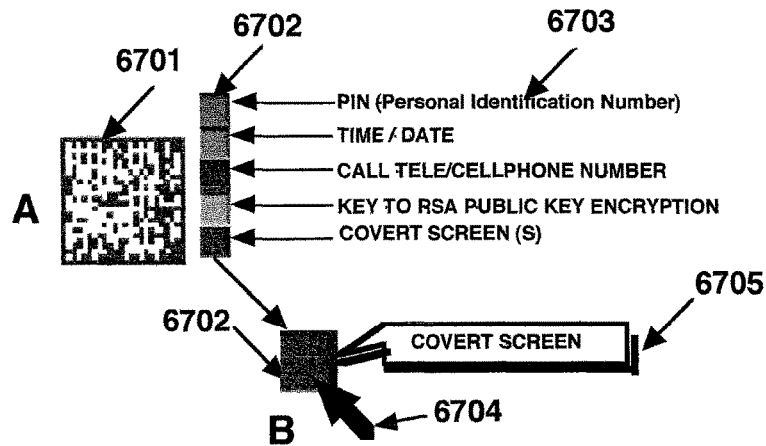
Figure 67 Security Time Stamp for Selective Display of Specific Data
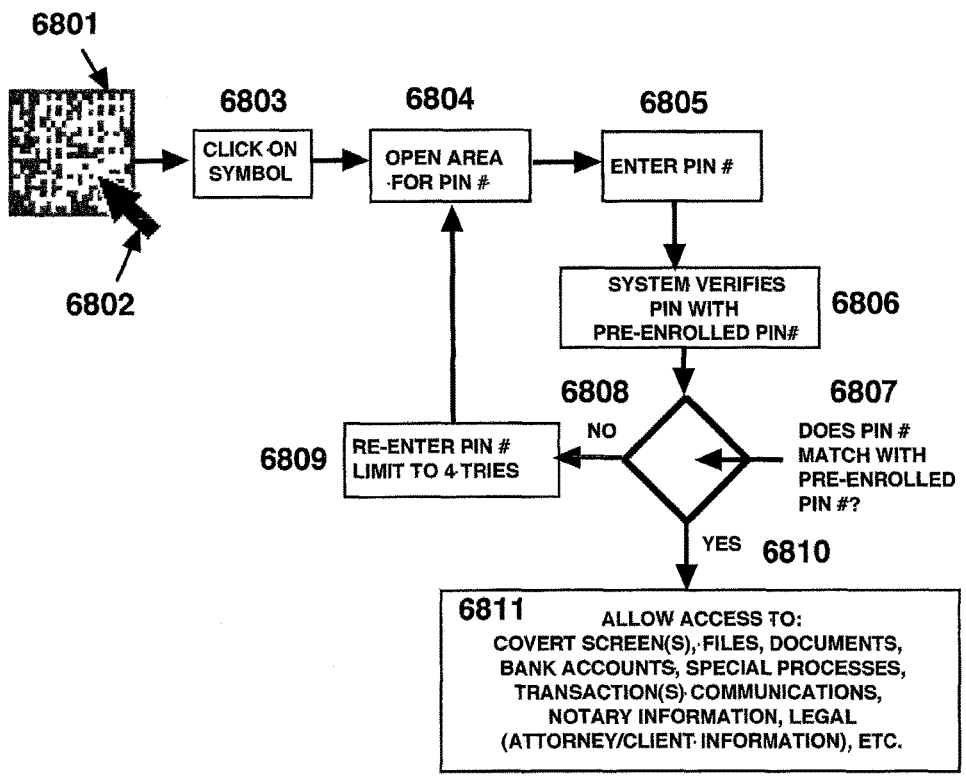
Figure 68 Sequence of Accessing the Covert Screens from the Security Time Stamp

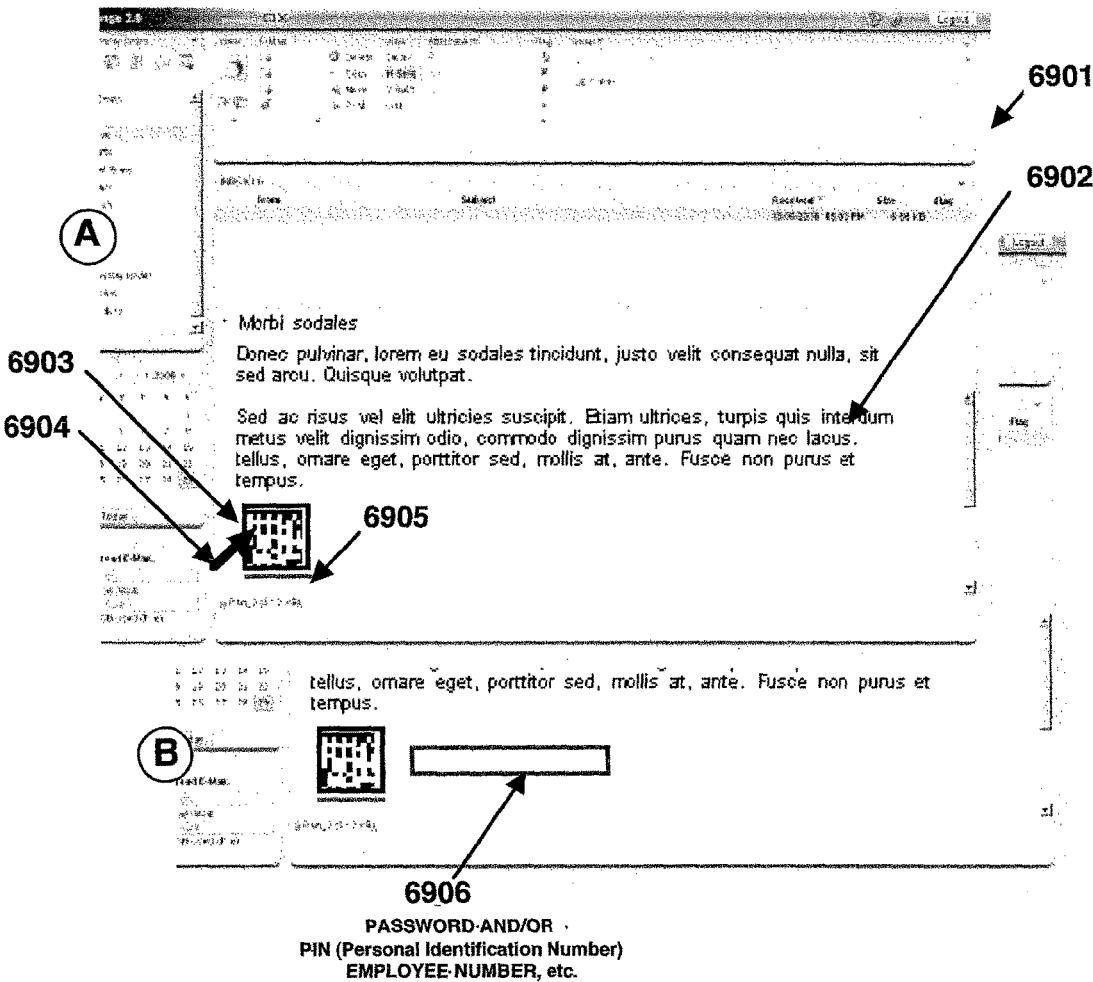
Figure 69A How an e-Mail Functions (1 of 2)
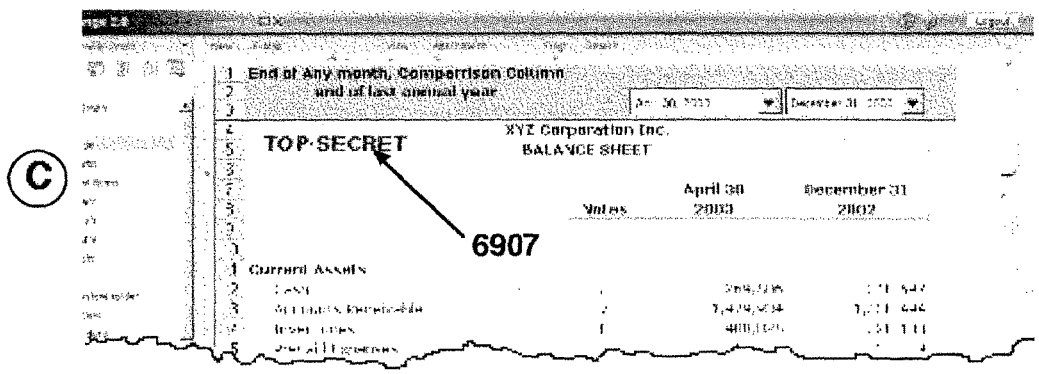
Figure 69B How an e-Mail Functions- Covert Screen(s) (2 of 2)

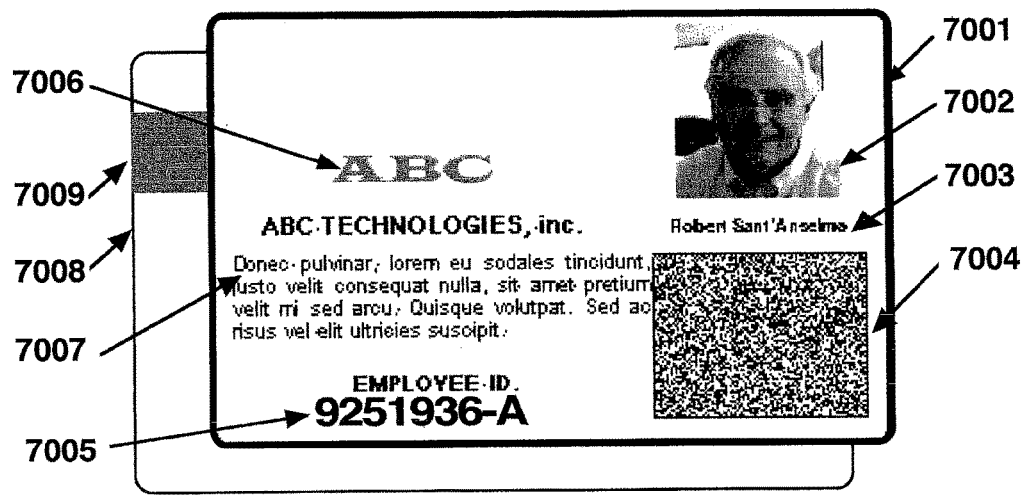
Figure 70 A Card (or badge, etc.) Used for Access to the Covert Screens

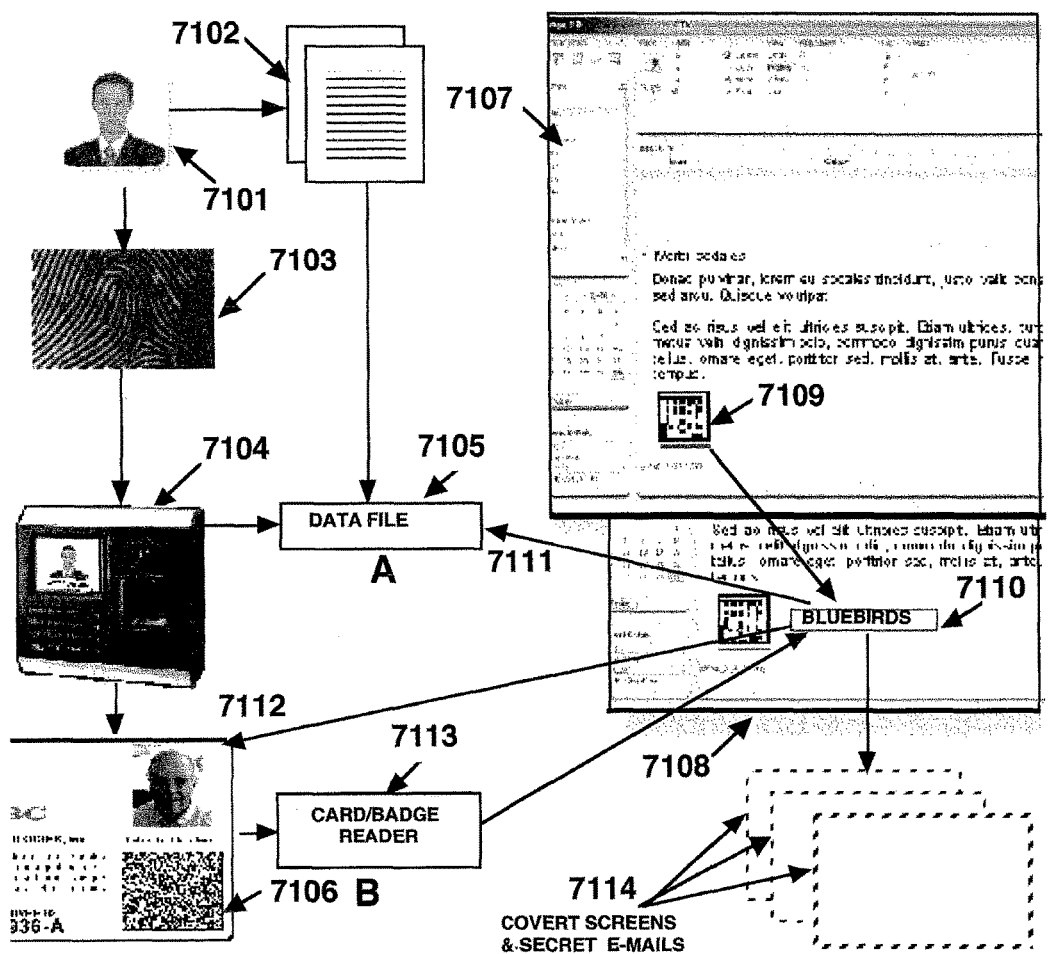
Figure 71 The Pre-Registration Process

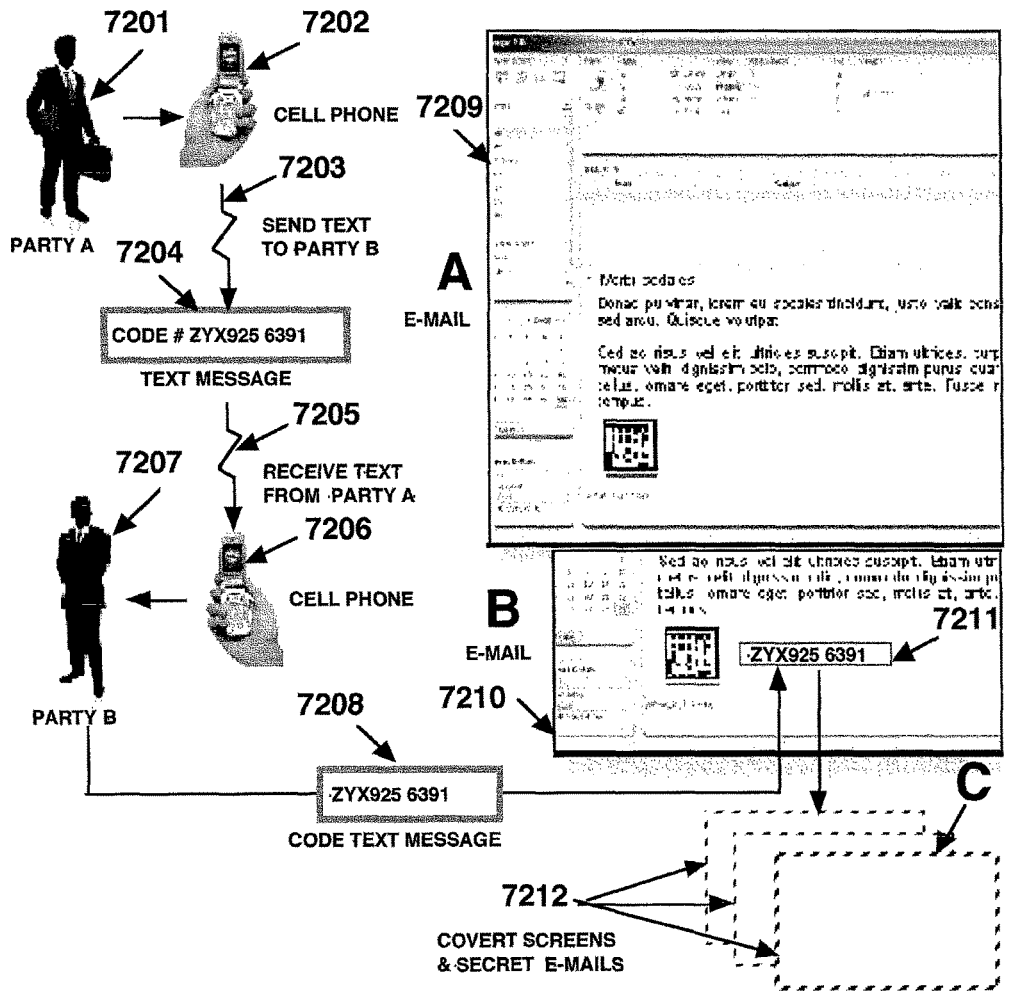
Figure72 How a Voice/Text Message can be Used to Provide a One-Time, Instant Password for Access to a Covert e-Mail

| FEATURES | TIMESTAMPS | | | |
|---|---|---|---|---|
| | REGULAR | NOTARY | SECURITY | SELECTIVE |
| ALPHANUMERIC | YES | YES | YES | YES |
| DATA-CAPACITY/BYTES | UP TO 4,000 | UP TO 4,000 | UP TO 4,000 | UP TO 4,000 |
| INTERNET-LINKS | NO | NO | YES | YES |
| COMPATIBILIE-SURFACES PAPER | YES | YES | YES | YES |
| PLASTIC | YES | NO | NO | NO |
| METALS | YES | NO | NO | NO |
| RUBBER | YES | NO | NO | NO |
| GLASS | YES | NO | NO | NO |
| COMPOSITES | YES | NO | NO | NO |
| DIAMONDS | YES | NO | NO | NO |
| DATA-INPUT: KEYBOARD | YES | YES | YES | YES |
| VOICE-ACTIVATED | YES | YES | YES | YES |
| AUTOMATIC | YES | YES | YES | YES |
| SEQUENTIAL | YES | YES | YES | YES |
| BIO-DATA | YES | NO | NO | NO |
| MACHINE-READABLE | YES | YES | YES | YES |
| SECURITY-LEVEL | 1 | 2 | 4 | 3 |
| PASSWORD / P.I.N.# | NO | NO | YES | YES |
| RSA-PUBLIC-KEY | YES | YES | YES | YES |
| ENCRYPTION:-CUSTOM | NO | NO | YES | YES |
| COVERT-SCREEN | NO | NO | YES | YES |
| AUTO-CALL-BACK | NO | NO | YES | YES |
| TAMPER-EVIDENT-LABELS | YES | YES | NO | NO |
| TRANSACTIONS | YES | YES | YES | YES |

Table 2: Comparison Chart

FIG. 73C

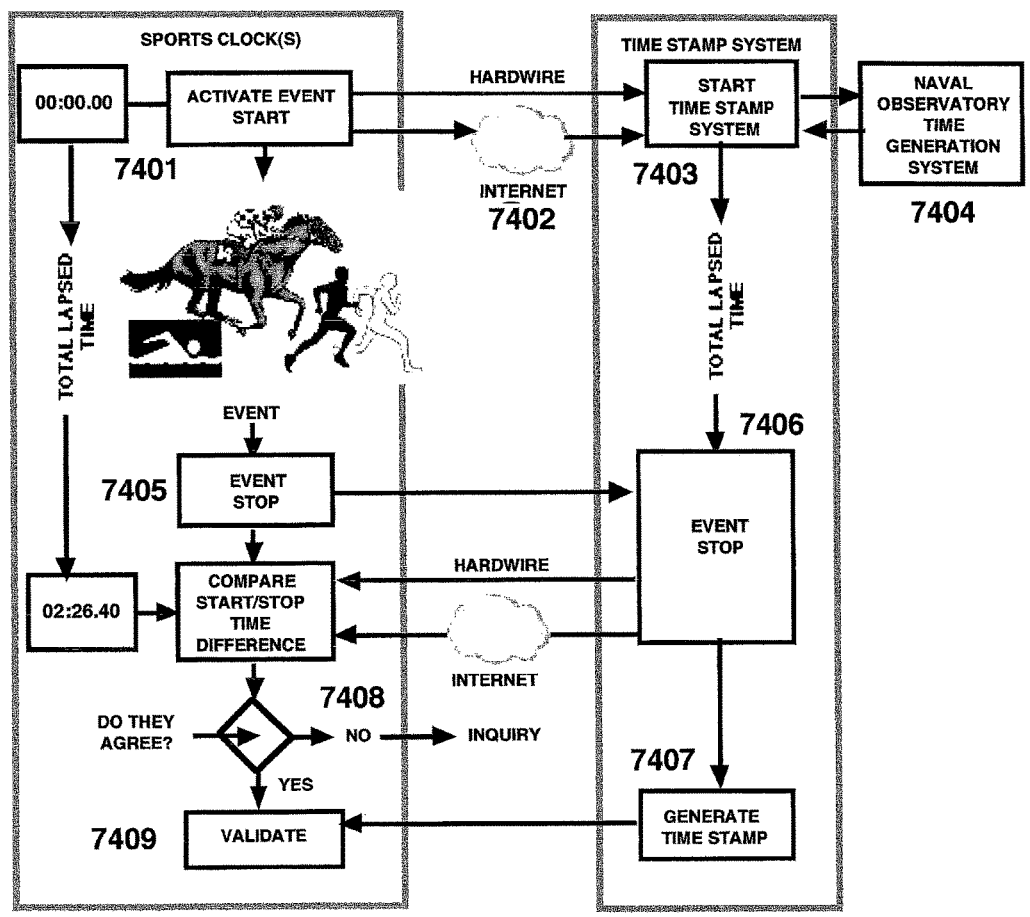
Figure 74 Parallel Clock Systems Using Time Stamp Embodiment for Validation

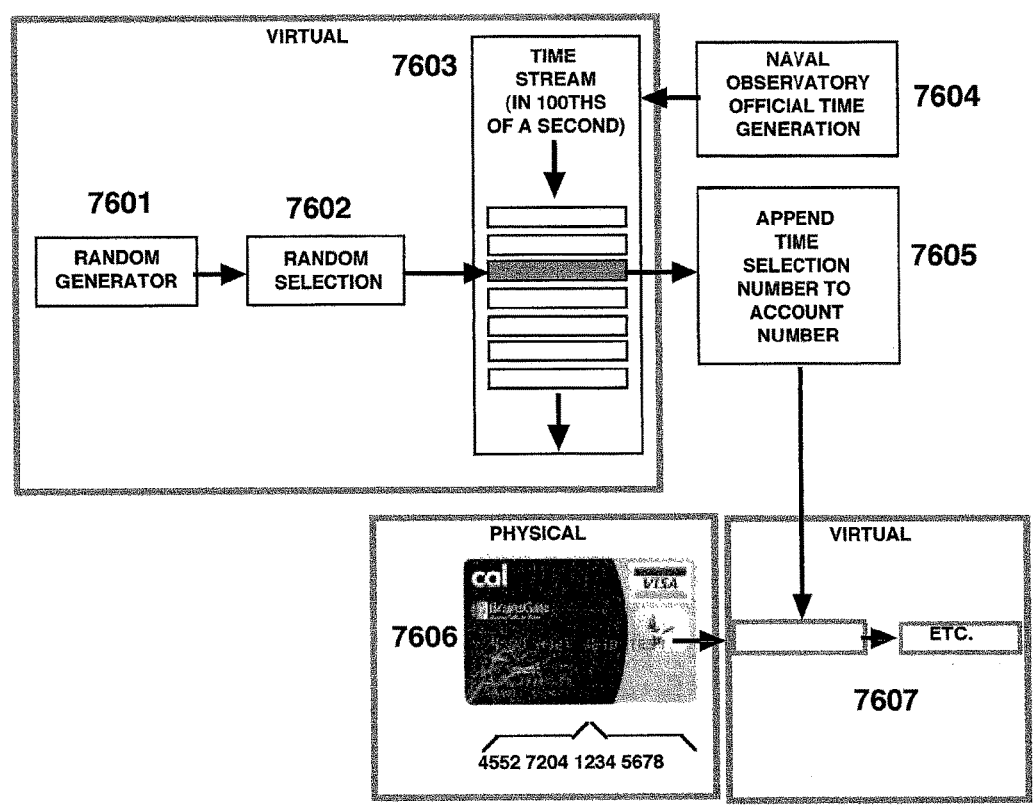
Figure 76 Example of the Process of Credit/Debit Card Virtual Random/ Time Generated Number

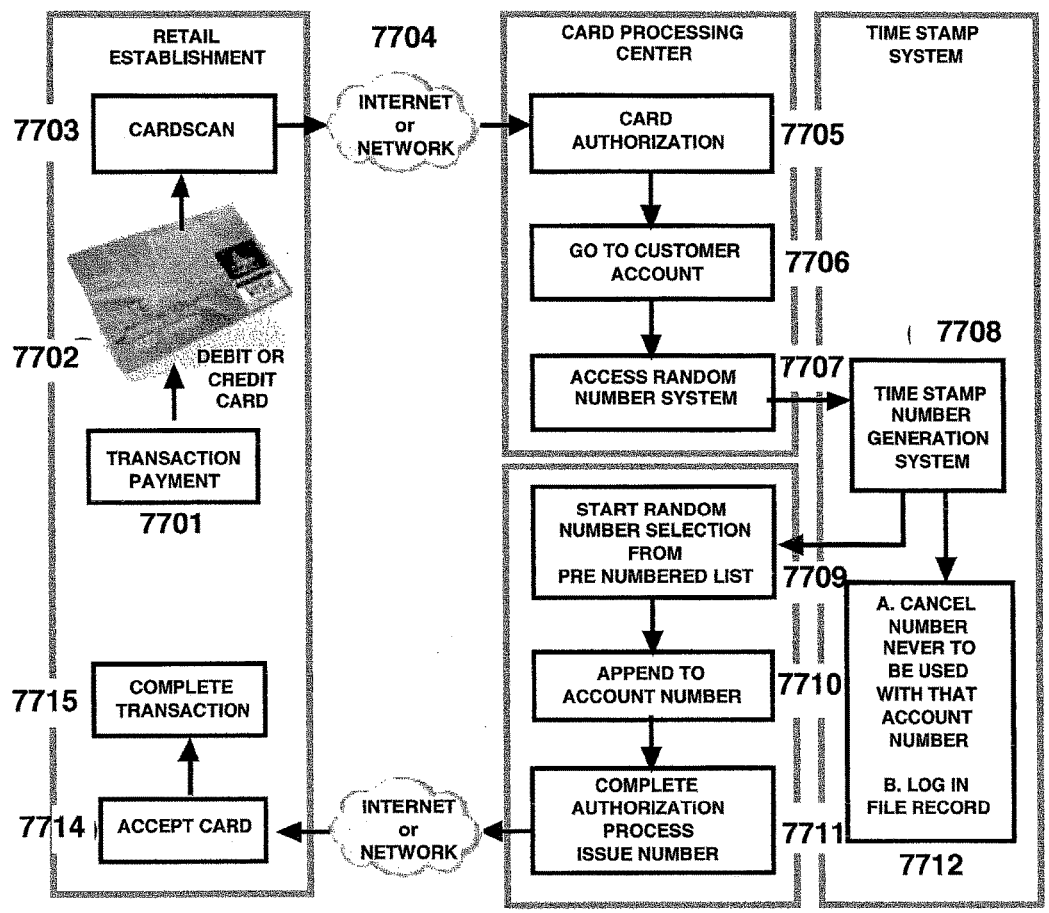
Figure 77 Example of the Process of Credit/Debit Card Virtual Random/ Time Generated Number

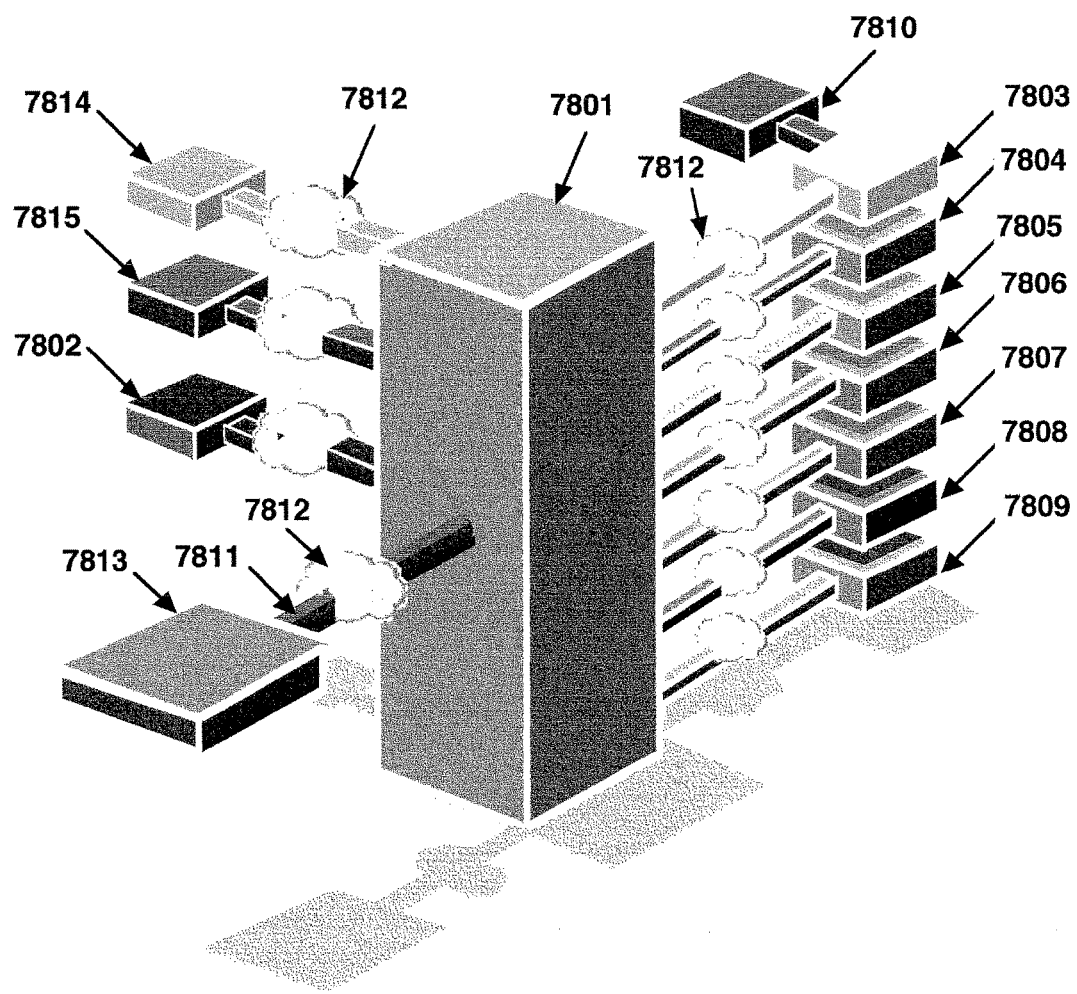
Figure 78 Basic Structure Concept as a Three-Dimensional Structure

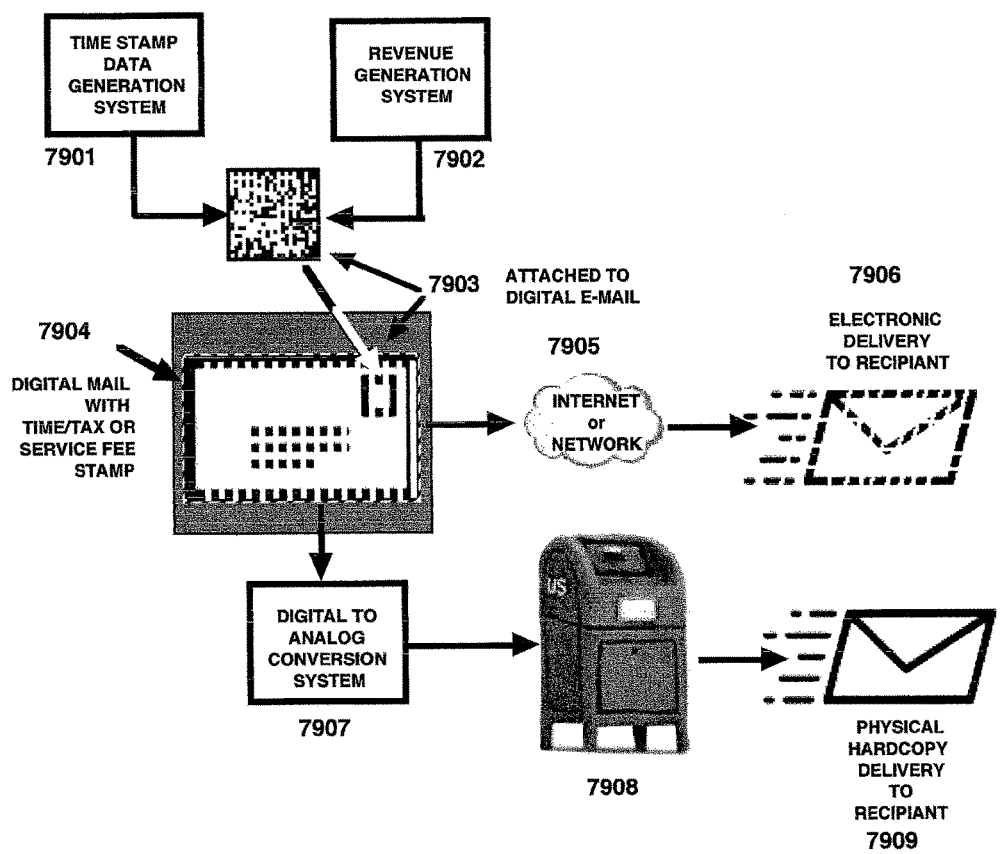
Figure 79 Time Stamp and System Combined with a Fee-for-Service and/or Tax Stamp

DIGITAL SIGNATORY AND TIME STAMPING NOTARY SERVICE FOR DOCUMENTS AND OBJECTS

CROSS-REFERENCE TO RELATED APPLICATIONS

This application is related to and claims priority to U.S. provisional application entitled ELECTRONIC METHOD, PROCESS AND SYSTEM FOR THE DIGITAL NOTARIZATION (TIME/DATE, ETC.) AND IDENTIFICATION OF CREATIVE INTELLECTUAL PROPERTIES, WORK-PRODUCT(S), TRANSACTIONS, PROCESSES, EVENTS, ETC. UTILIZING THE INTERNET AND/OR OTHER DIGITAL COMMUNICATION SYSTEMS having Ser. No. 61/267,861 by Sant'Anselmo, filed Dec. 9, 2009, the contents of which are incorporated by reference herein.

BACKGROUND

1. Field

Example embodiments relate to a non-human system, method and computer-readable medium providing a secure and an accurate independent and automatic third-party notarization for the time stamping process of a plethora of target applications that are electronically available on a variety of electronic devices and systems 24 hours per day, every day of the year and available from any point on, within or above the earth.

The following describes, an independent, uninterested, neutral, third party notarization service, which is available: 24 hours-per-day, 7 days per week, from any country on earth, in any language, from any time zone, from home, office or any wireless field location, that is convenient to use as well as secure and legal.

Example embodiments may utilize the time signal preferably by the United States Naval Observatory Time Generation Service or equivalent. The completed system provides the User/client/customer, working from their home, office, library or field location, with a fast, convenient, automatic and extremely accurate means for the notarization also referred to as a "Time Stamp" for their creative work-product, transaction, communications, etc. that is available from any location that has a microprocessor-based device/computer, and a communications network, such as the Internet. Some examples of creative work product are: documents, scripts, stories, objects, graphics, images, video, film, audio, music, software, etc. Other notarization applications include, but are not limited to: automated transactions, communications, decision making, legal documents, accounting, financial reports, financial instruments, material data reports, configuration management, time and attendance, security access, etc. in either electronic using a digital network, such as the Internet and/or physical form using a combination of digital images In analog form.

Examples of applicable industries for the digital time stamping process described herein may include Aerospace, Automotive, Banking, Communications, Computer, Electronic, Entertainment, Exploration, Financial, Gaming, Government, Healthcare, Internet/networks, Legal, Manufacturing, Market Research, Medical, Military, Nuclear, Pharmaceutical, Political, Product Differentiation, Research and/or Development, Royalties Reconciliation, Scientific Analysis, Security, Software, Space, Television, Time and Attendance, Transactions, and Video Games.

There are two basic forms of electronic notarization to apply time stamps:

(1) Manual/Semi-manual system(s) on an "as needed" basis where the data is either entered via a keyboard, or other similar device such as telephone or cell phone keypads, or (2) fully automated systems that, once the specific system is set up by the client/user, it will automatically issue time stamps on-demand by the application-specific client's/user's system supplying time stamp requests, 24 hours-per-day, 7 days per week from any location on/in/above the earth, i.e., underground, underwater, on the Earth's surface and/or in space, FIG. 1 graphically depicts a simple schematic of the two basic forms of Electronic Notarization; the manual/semi-automatic system and fully automatic system.

2. Description of the Related Art

Time dictates every aspect of our modern life. Time and date information is linked to and/or controls the flow of ideas, technologies, schedules, legal processes, contracts, budgets, transactions and countless other applications involving a myriad of activities and documents each and every day.

Greed, confusion, deviousness, theft, duplication, multiple claims, first-to-invent, jealousy, money, power, frame, competition, human errors, etc. are all barriers to a peaceful smooth entry into business transactions and the marketplace. These are just a few of the many problems that plague mankind in protecting his or her creative work-product as being the original or earlier conception preceding those that intentionally or unintentionally copy or claim similar ideas or work-product as their own.

One famous example includes Alexander Graham Bell's patent application related to the telephone which was filed three hours before another competitor's patent application and a vast fortune was to be made and hung in the balance.

One problem in today's fast moving society includes the use of a Notary Public. Locating a notary public at any given moment is somewhat of a hassle because one most likely either has to travel to their location or wait for them to schedule an appointment to meet in order to complete the notarization process.

The problem is that obtaining a person who is a Notary on a moment's notice or scheduling one for a particular time is a slow process rooted in the $18^{th}$ century. A notary may be difficult to locate especially when a person is a strange city and taking documents to the place of the Notary's business can be very time-consuming. These situations are physically disruptive.

SUMMARY

The example embodiments are related to an "Electronic Notary", or a "Digital Notary", that uses the Internet or other communication network as one element of a system, method and process. This electronic system provides an INDEPENDENT means of notarization and subsequent verification globally. Once the system is employed any person, located within a specific country, on a specific date, for a specific item, etc., time stamped a specific work-of-art, i.e., an idea, a contract or any other digital or non-digital work-product or a transaction with the option of adding other relevant information.

The example embodiments provide the system, method and computer-readable medium for such electronic notarization service that as a brief overview, provides an "Official Time Keeping Source" i.e., the National Institute of Standards and Technology (NIST) for non-military time-related applications and the United States Naval Observatory (USNO) for military time-related applications to provide continuous unbiased time and date information to the time stamp enterprise for the various embodiments described herein.

Additionally, these embodiments may be "fine-tuned" to any degree of the system's unit(s) of time representation (such as, but not limited to an hour, minute, tenth of a minute, fractions of a second, i.e., tenths, hundredths, thousandths of a second, etc.) as a high-data density, machine-readable symbol, in addition to the appending or inclusion of other pertinent data embedded into a uniquely generated machine-readable identifier ("Time Stamp") that the end-user may affix or associate in some manner with his or her application or work-product. The total process is available through the use of electronic networks, such as the Internet.

The foregoing and/or other aspects are achieved by providing a system including a processor which includes a time retrieval unit to connect to an official time provider via a network and to retrieve an official current time, a data acceptance unit to receive information regarding a target object entered via a data input interface, an encoding unit to create and encode a machine readable identifier representing the official current time and the information regarding the target object, a marking unit to mark the target object by marking the machine readable identifier to the target object and a storage unit to store data associated with the machine readable identifier in a storage in a server.

The foregoing and/or other aspects are achieved by providing a method, including retrieving, by a computer, an official current time from an official time provider, accepting, by the computer, information regarding a target object, creating and encoding a machine readable identifier representing the official current time and the information regarding the target object, marking, by the computer, by marking the machine readable identifier to the target object and storing, by the computer, data associated with the machine readable identifier in a storage in a server.

The foregoing and/or other aspects are achieved by providing a method including scanning, by a scanner having a processor, a machine readable identifier from a target object, decoding, by the scanner, the scanned machine readable identifier into decoded data, determining, by the scanner, an official time of creation of the machine readable identifier and information associated with target object, by interpreting the decrypted data and storing in a computer readable storage, by the scanner, the official time of creation of the machine readable identifier and the information associated with the target object.

The foregoing and/or other aspects are achieved by providing a method including receiving a request sent from a first computer to a second computer, a request to electronically notarize a target object, electronically notarizing, by a second computer, the target object, transmitting, by the second computer to the first computer, the electronically notarized target object and deducting, by the second computer, a cost of the electronic notarization from monetary funds of the user.

According to another aspect of one or more embodiments, there is provided at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 is a flowchart illustrating a communication configuration according to example embodiments;

FIG. 5 is a flowchart illustrating machine readable formats including a high data density matrix formatted symbol according to example embodiments;

FIG. 6 is a diagram of machine readable formats and a high data density matrix formatted symbol according to example embodiments;

FIG. 6A is a diagram of a VSCode data density matrix symbol according to example embodiments;

FIG. 6B is a flowchart of the time stamp notarization method according to example embodiments;

FIG. 7 is a diagram of a human readable code that is a key to a specific customer/transaction data file according to example embodiments;

FIGS. 8A-8G are diagrams illustrating types of information which may be embedded within the time stamp according to example embodiments;

FIG. 9 is a diagram showing types of damage to machine readable time stamp symbols according to example embodiments;

FIG. 10 is a diagram illustrating a plurality of machine readable time stamp symbols having a scalable size according to example embodiments;

FIG. 11 is a diagram illustrating data security of a machine readable time stamp symbol according to example embodiments;

FIG. 12 is a diagram illustrating omni-orientation and omni-directional readability of machine readable time stamp symbols according to example embodiments;

FIG. 13 is a diagram showing skewed reading angles of machine readable time stamp symbols according to example embodiments;

FIG. 14 is an illustration of reading component/object time stamps according to example embodiments;

FIG. 15 is an illustration of comparison of space efficiency according to example embodiments;

FIG. 19 illustrates machine-readable symbol formats applicable to the example embodiments;

FIG. 20 illustrates a data matrix code symbol according to example embodiments;

FIG. 21 shows a typical PDF417 stacked bar code symbol according to example embodiments;

FIG. 22 illustrates a MICR format number according to example embodiments;

FIG. 22A shows examples of different two-dimensional machine-readable symbols according to example embodiments;

FIG. 23 shows high capacity color matrix codes/gettag/mobile codes according to example embodiments;

FIG. 24 illustrates placement and sequential or progressive identifiers according to example embodiments;

FIG. 25 illustrates a flowchart of determining a user's printer compatibility according to example embodiments;

FIG. 26 illustrates a printer compatibility test pattern according to example embodiments;

FIGS. 27A & 27B illustrate creation of a machine-readable identifier time stamp according to example embodiments;

FIG. 28 shows internet website login process according to example embodiments;

FIG. 29 illustrates a corporate custom machine-readable time stamp sales process according to example embodiments;

FIG. 30 shows a machine-readable time stamp reorder process according to example embodiments;

FIG. 31 illustrates a flowchart of a user requesting time stamp service or electronic notary service according to example embodiments;

FIG. 32 illustrates a flowchart of a user requesting time stamp service of various target objects according to example embodiments;

FIG. 33 shows third-party integration of time stamp services according to example embodiments;

FIG. 34 illustrates an indirect image transfer and time stamp method according to example embodiments;

FIG. 35 shows dynamic time stamping of dynamic images according to example embodiments;

FIG. 36 illustrates a dynamic image security time stamp process according to example embodiments;

FIG. 37 illustrates a pixel analysis system and area according to example embodiments;

FIG. 39 illustrates capturing a streaming picture and identifying the streaming picture with pixel analysis data according to example embodiments;

FIG. 40 shows a typical document to be time stamped according to example embodiments;

FIG. 41 illustrates misalignment of pixels according to example embodiments;

FIG. 42 shows document authentication according to example embodiments;

FIG. 43 illustrates other forms of measurement of a document according to example embodiments;

FIG. 44 shows other forms of document data to be used to identification/authentication according to example embodiments;

FIG. 45 illustrates a flowchart of a copier scanning a machine-readable symbol according to example embodiments;

FIG. 46 illustrates a flowchart of a shredder checking for a machine-readable symbol according to example embodiments;

FIG. 47 illustrates a video camera having a time stamp feature according to example embodiments;

FIG. 48 illustrates a videographer/photographer filming according to example embodiments;

FIG. 49 shows a video camera with a time stamp feature according to example embodiments;

FIG. 50 illustrates cameras having a time stamp feature according to example embodiments;

FIG. 51 shows audio conversion from audio to a graphic time stamp identifier according to example embodiments;

FIG. 52 illustrates Chinese "chops" or seals according to example embodiments;

FIG. 53 is a diagram of digital "chops" and time stamp identifiers according to example embodiments;

FIG. 54 illustrates time stamp identifiers as applied to medical charts, pharmaceuticals, etc. according to example embodiments;

FIG. 55 is a diagram of an x-ray having time stamp identifiers according to example embodiments;

FIG. 56 is a diagram of MRI images having time stamp identifiers according to example embodiments;

FIG. 57 is a diagram of a voter ballot having time stamp identifiers according to example embodiments;

FIG. 58 illustrates corporate logos in tandem with time stamp identifiers according to example embodiments;

FIG. 59 shows a typical security room which may utilize time stamp identifiers according to example embodiments;

FIG. 60 illustrates a plurality of clock face variations according to example embodiments;

FIG. 61 shows a typical legal notice from an e-mail providing a warning about unauthorized usage of its contents according to example embodiments;

FIG. 62 is a flow diagram of an overview of the time stamp process according to example embodiments;

FIG. 63 shows differing time stamp functional example embodiments;

FIG. 64 is a diagram of an e-mail having a security time stamp according to example embodiments;

FIG. 65 is an additional expanded diagram of an e-mail having a security timestamp and according to example embodiments;

FIGS. 66A-D provides four diagrams and a top and side comparison of the regular time stamp and security time stamp according to example embodiments;

FIG. 67 is a diagram of a security time stamp and selective display of specific data according to example embodiments;

FIG. 68 is a flow diagram providing a sequence of accessing covert screens from a security time stamp according to example embodiments;

FIGS. 69A-69B provide screenshots of an email client providing a security time stamp embedded within an email according to example embodiments;

FIG. 70 illustrates a card to be used to access covert screens according to example embodiments;

FIG. 71 is a flow diagram showing a pre-registration process according to example embodiments;

FIG. 72 is a flow diagram showing how a voice/text message may be used to provide a one-time, instant password for access to a covert e-mail according to example embodiments;

FIG. 73C is a Table 2, which provides a comparison between example embodiments;

FIG. 74 is a flow diagram of parallel clock systems using a time stamp system for validation according to example embodiments;

FIG. 76 illustrates generation of a credit/debit card virtual random/time number according to example embodiments;

FIG. 77 is a flow diagram of a transaction process for a credit/debit card virtual one-time generated number according to example embodiments; and FIG. 78 illustrates a three-dimensional data structure according to example embodiments.

DETAILED DESCRIPTION

Figure 1:
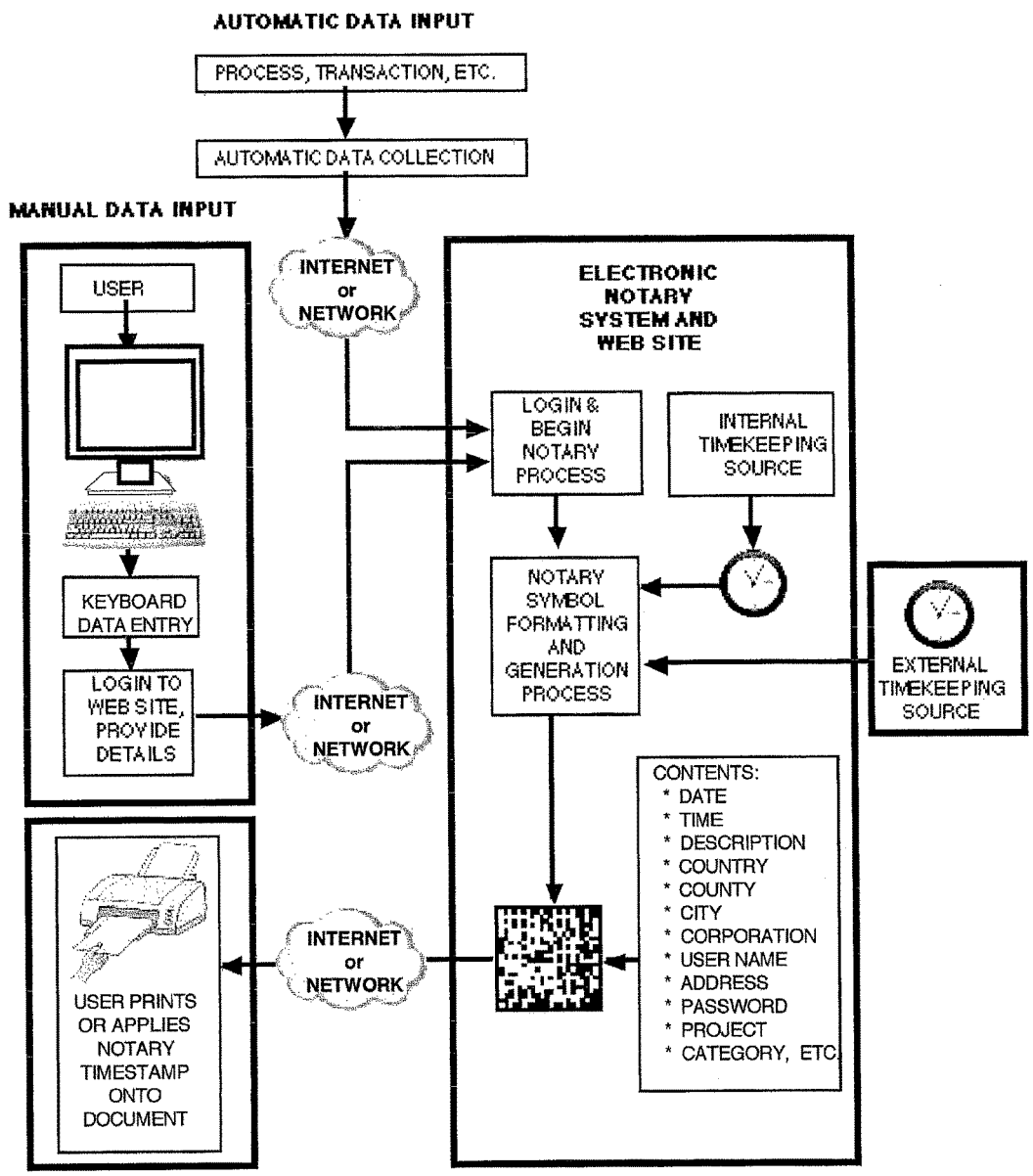
FIG. 1 is a flowchart illustrating a notarization system according to example embodiments.

Reference will now be made in detail to embodiments, examples of which are illustrated in the accompanying drawings, wherein like reference numerals refer to like elements throughout. Embodiments are described below to explain the present disclosure by referring to the figures.

Time dictates every aspect of our modern life. Time and date information controls the flow of ideas, technologies, schedules, legal processes, contracts, budgets, transactions and countless other applications.

In today's competitive society, as well as for sound legal reasons, it is vitally important to document a specific time and date of your work product, event or transaction.

Proper time context is critical to determining the ownership of work product such as: ideas, inventions, creative content in the form of works-of art, i.e., stories, scripts, plays, music, dance routines, video, motion picture, illustrations, photographs, plans, drawings, documents, software, legal work-product, etc. Other examples of applications for example embodiments may include access to: tickets for events, financial services (ATM, etc.), transactions, reservations, historical speeches, visitor's log recording people entering/exiting a secure facility, media, politics, manufacturing (lot batch, unit, date/time control), communications or a domestic or international newsworthy event as explained later in this document.

Example reasons for proper notarization include proving in a court of law that material was conceived and originated by a certain individual and/or enterprise at a specific point in time. Non-legal situations might include proving that a document, preceded another document and that it has not been tampered with.

The best way to accomplish the above is to have an independent third-party, such as a Notary Public, "time stamp" your ideas, patent applications, agreements, documents, vital statistics, copyrights, trademarks, brochures, legal documents, stories, songs, scripts, notarized items, photographs, any other works-of-art, inventions or intellectual properties, etc. that may have a potential or sentimental value.

Currently, obtaining a notarization/time and date stamp of a document is often includes a manual process visually conducted in person in front of a Notary Public, i.e. a state-authorized individual who can, among other duties, witness the date/time and identification of the person who is related to a specific document in exchange for a fee. There are also registries, such as The Writer's Guild, that register intellectual property for a fee, but are not as secure, nor as broad as the example embodiments.

The example embodiments are related to a digitally based system, method and computer-readable medium that communicate through the Internet and assign one or more targets with unique machine-readable identifiers referred to as "Time Stamps" or the notarization process as an "Electronic Notary."

Electronic Notarization

Electronic notarization may be defined herein as the automatic and/or non-human process of electronic notarization/documentation and file data storage of an event including, where the digital date and digital time obtained from an independent third-party time source is represented by a digitally encrypted, machine-readable symbol, using electronic and/or digital means, systems and processes incorporating the communications use of the Internet or other forms of networks.

A notarization process (non-electronic) is the standard process as practiced for the last century where a third-party human physically, verifies and documents the date, time and parties of an event.

The example embodiments provide an additional legal means of verifying a specific individual digitally time stamped target or a non-digital work product target with specific information, i.e., a date, hour, minute, tenth of a minute, etc. along with their payment as an additional proof and form of verification.

After a user's LOGIN process at a Time Stamp Internet web site and completion of identifying questions and description of item(s) to time stamp, a system instantly creates a highly unique machine-readable, data encrypted digital identifier that is sent either electronically by return Internet communications for direct/quick electronic application, as applied to electronic documents or forms, or affixed to an item via a printed label. For non-electronic delivery application, the return identifier(s) may be mailed through the country's postal or package delivery system to be applied to the target item(s) a few days later.

Later, should the need arise for determining the date and time information of a specific target, the exact time and date can be obtained simply by decoding/reading the time stamp identifier and/or its associated information.

As a back-up, should the identifier become unavailable or unreadable, the original specific information is retrieved, if not from the identifier itself, but from a specific, highly protected data file controlled by the operator(s) of the time stamp service provider.

Although one of the major uses for the example embodiments is focused upon Internet applications, it is recognized that other non-Internet time stamp applications exist, such as, but not limited to: copiers, shredders, classified documents and control systems, file systems, cataloging, security, identification cards, cameras, etc. as well as for collaboration activities such as medical/x-ray consultation, business and financial transactions where an independent time source is needed for verification and/or authentication.

"Timestamp" or "Time Stamp"

A timestamp may be a sequence of characters, denoting the date and/or time at which a certain event occurred. This data is usually presented in a consistent format, allowing for easy comparison of two different records and tracking progress over time. The practice of recording timestamps in a consistent manner along with the actual data is called "time stamping".

Timestamps are typically used for logging events, in which case each event in a log is marked with a timestamp. In file systems, a timestamp may mean the stored date/time of creation or modification of a file.

Examples of alpha/numeric timestamps may include: 2005-10-30 T10:45 UTC, 2007-11-09 T11:20 UTC, Sat Jul 23 02:16:57 2005

Standardization

ISO 8601 standardizes the representation of dates and times. These standard representations are often used to construct timestamp values.

Timestamp can also refer to:

A time code (in networking or video technology).

Unix time, the number of seconds since 00:00:00 UTC on Jan. 1, 1970

ICMP Timestamp (a message that is used for time synchronization. It may include the originating timestamp).

A digitally signed timestamp whose signer vouches for the existence of the signed document or content at the time given as part of the digital signature: The modification or access time of a file or directory in a computer file system or database.

"The Descriptive Process"

One feature of the example embodiments is referred to as the "Descriptive Process" (DP) where the user electronically describes to the Electronic Notarization system's personal data file, described herein, the details of his target, specifically: ownership information, address information, category group, type of article, quantity of articles, etc. Key elements of this information may be embedded into the time stamp machine-readable identifier that is associated with the User's target.

Figure 2:
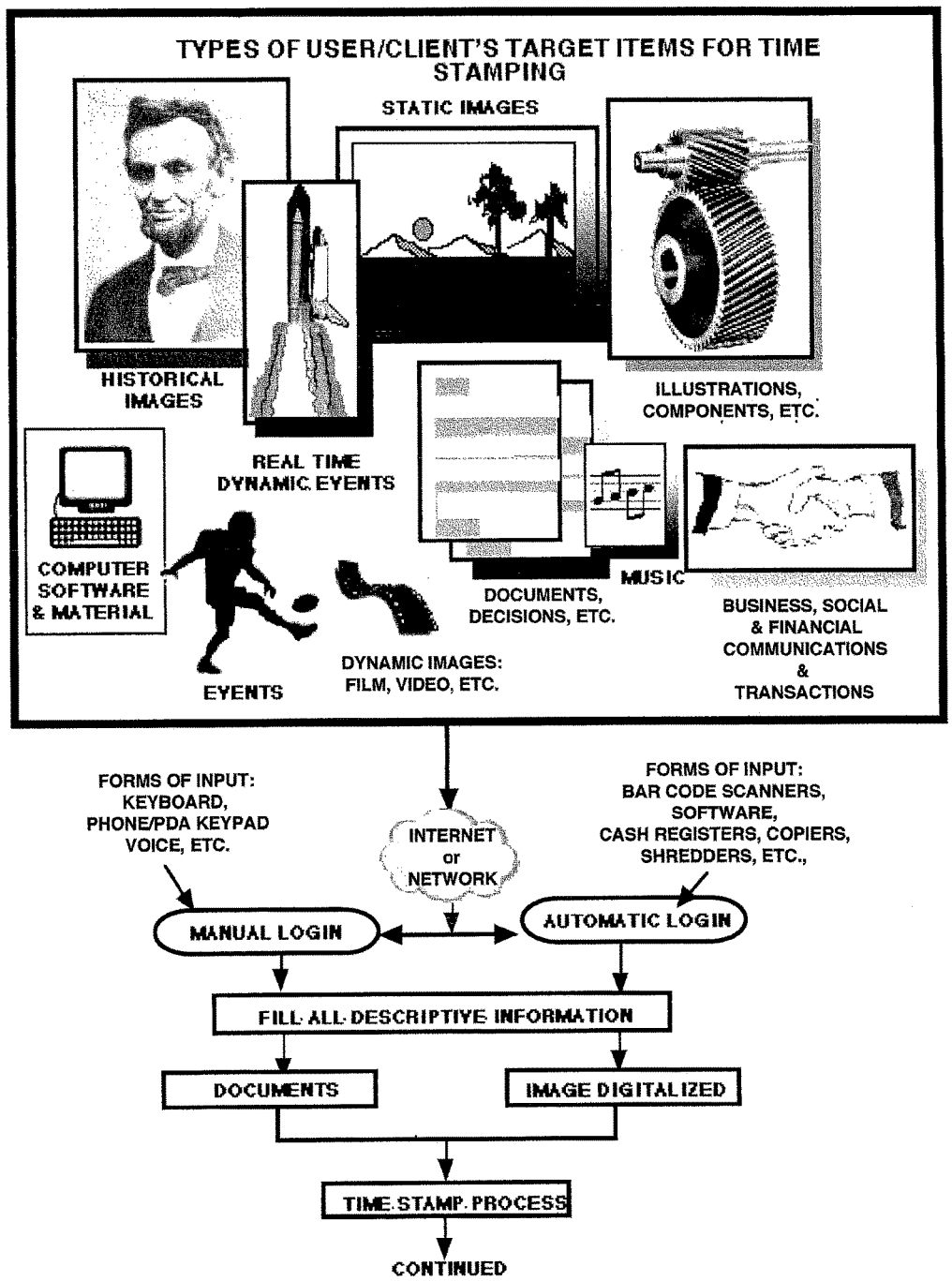
FIG. 2 is a flowchart illustrating example types of target objects to be fed in the notarization system according to example embodiments.
Figure 3:
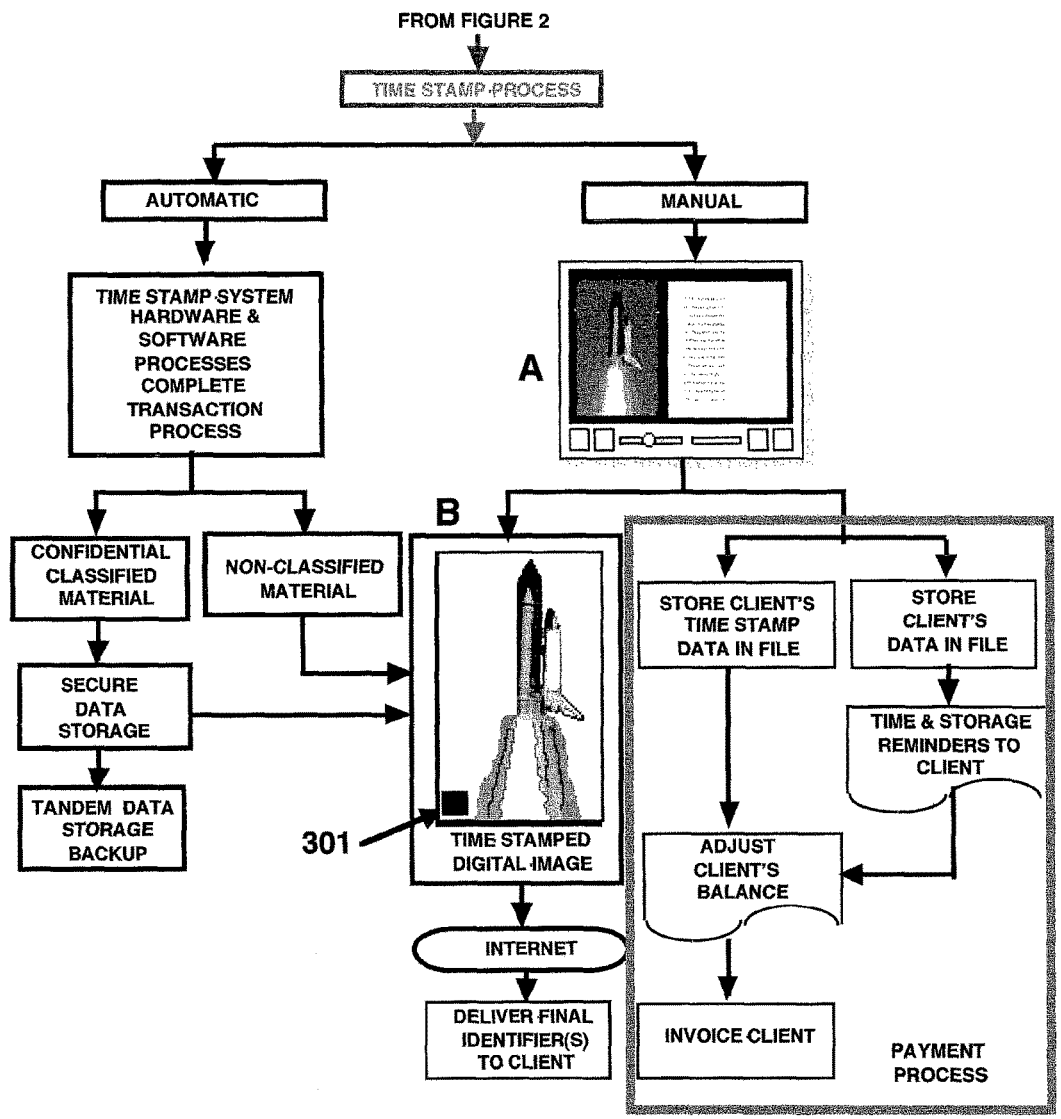
FIG. 3 is a flowchart illustrating a time stamp notarization process according to example embodiments.

The following two-part flow diagram shown in FIGS. 2 and 3 illustrates the process-flow from the user and his desired target work-product including examples of text, graphics, music, photographs, etc. that need to be time-stamped. 301 is an example of a time stamped digital image created according to example embodiments.

The preferred solution may include the use of the electronic efficiencies of the Internet or network to independently, as a disinterested third-party, generate an effective, secure digital time stamp to identify and/or associate the target work-product material or other item of value, in such a manner so that the identifier/Time Stamp cannot be altered, changed or modified in any manner thereafter.

Further, a back-up record may be maintained in one or more secure databases.

The best way to accomplish the example embodiments includes having an independent third-party, such as a notary public "time stamp" the material that has a potential or even a sentimental value.

The approach taken according to the example embodiments includes providing the user with a digital Internet time stamp method, computer-readable medium and system.

With some modifications; this Internet time stamp service may also be used in many other non-Internet applications, such as those that involve a Local Area network (LAN), a Wide Area Network (WAN), military communication networks and a NASA Space communications network. Although the example embodiments focus upon the Internet as the major means of communication, there may also be many other embodiments for applications where the Internet is only partially used for data communications or not used at all.

The example embodiments are related to an "Electronic Notary", or a "Digital Notary", that uses the Internet or other communications network. This electronic system provides a legal means of verification that a specific person time-stamped a specific work-of-art, an idea, a contract or any other digital or non-digital work-product with a specific date and time including the optional addition of other relevant information.

The example embodiments provide the system for such notarization that may be as fine as the system's time settings provide, i.e., by the hour, minute, tenth of a minute, fractions of a second, etc. or combinations thereof including the option of appending or inclusion of other pertinent data embedded into a uniquely generated, machine-readable identifier ("Time Stamp") that the end-user can affix or associate in some manner with his or her application or work-product.

Enrollment Process: From the user's perspective the system begins with enrollment, i.e., obtaining basic and core information. In a semi-automatic embodiment (the user may provide the manual/computer input) after the user finalizes his/her target material and is ready for notarization, the user would LOGIN (or Register if it is their first time) at the Time Stamp Internet web site, complete the identifying questions and description as to the item(s) or target material they want to notarize with a time stamp. The system may then instantly create a highly unique, machine-readable, data encrypted digital identifier (containing the date, time and other relevant information).

Type of identification information may be embedded into the machine-readable matrix symbol that varies with the specific application and the amount of data encoded or encrypted into the matrix symbol, which is the preferred identifier embodiment.

This identifier(s) once formatted with the data may be transmitted electronically by return Internet communications for direct/quick electronic application, either printed onto the body of a target document, for example, or applied to electronic documents (aka "e-forms"), or affixed to an item via a printed tamper-evident and/or tamper-proof label.

Non-electronic delivery may include where the return identifier(s) may be mailed through the country's postal or package delivery system to be applied to a document or other work-of-art a few days later.

Notarization Data Retrieval: Later, should the need arise for determining the identifier's embedded data, the exact time and date may be obtained simply by decoding or reading the time stamp identifier and or its associated information with an appropriate symbol reader that would decode the symbol's data within fractions of a second.

Back-up System: Should the identifier become unavailable or unreadable, the original specific information may be retrieved, not from the identifier itself, but from a specific, highly protected data file controlled by the service provider.

Alternative Embodiments: Although the major uses for the example embodiments are focused upon Internet applications, it is recognized that other non-Internet time stamp applications exist, such as, but not limited to: document control systems incorporating time stamp readability capable printers, copiers and shredders, classified documents and control systems, file management systems, cataloging, security, identification cards, credit/debit cards, cameras, cell phones, laptop computers, iPhones, Blackberrys, PDAs, etc. Time & Attendance systems, military operations, etc.

Collaboration Embodiments: When individuals who are in remote locations confer/collaborate with time critical documents, they may be referring to the proper version of items such as: medical/x-ray consultation, business and financial transactions where an independent time and date source are needed for verification, sequencing and/or authentication. The timestamp identifier may assist in this situation.

The embodiments of this system may be either partially activated through the user's use of a microprocessor-based keyboard and the Internet, as an example, or it may be fully automatic through the use of data networks, communications systems and the appropriate application-specific software.

System Overview

Three Basic System Options

The Internet time stamp service may offer the User/client three basic embodiments, such as: (1) An electronic time stamp that includes only the date and time, (2) An electronic Notary/Notary Public that includes additional information such as, date, time, name, location, etc. and (3) An electronic means of authentication, certification and verification that is virtually 99.999% secure/uncounterfeitable.

These embodiments are related, however, the Notary option has additional requirements that must comply with differing local, state and government regulations in order to be valid or acceptable in a court-of-law. This is also true of international notary practices.

The authentication option requiring higher levels of security uses the same basic embodiments with a number of enhancements as described herein.

Data Storage Options

Once the user/client registers/enrolls, via the Internet or other such data network and completes the various descriptive information fields shown on their computer screen in the form of an application for service, payment for service(s), etc., and the system provides an electronic time stamp symbol in the form of a machine-readable, unique digital and/or analog identifier that is associated with the particular item that had been registered thereafter.

It is anticipated that all client-related information is stored in two (or more) data storage locations and is independent of the user or anyone else's ability, to change or alter the identifier's data in such a manner so that the information may never be compromised and is readily available as a backup system. The transaction and time stamp's data may be encrypted and is stored: (1) within the high-data density, machine-readable, digital and/or analog identifier applied to or associated with the registered item and (2) in a secure database.

Time Standards

The following information illustrates the major forms of measuring time.

Example embodiments include the integration of different time standards either separately or in tandem, such as:

Global time standards (GMT/UT)

Domestic time standards (U.S. Naval Observatory/Daylight savings)

Organizational time standards, i.e. railroad, etc.

Certification time standards, i.e., business management.

Different Time Standards

Although there are many different time standards designed by different countries, civilizations and industries, example embodiments would most likely use UT (Universal Time), GMT (Greenwich Mean Time) and/or the United States Naval Observatory Time.

Globally, there are many different standards for measuring time and each of them can become the basis for the example embodiments" time stamping process. These different time standards, including "Daylight Savings Time", can become the basis for a time stamp and in fact is part of this system should the User/Client so desire and it would not have an effect upon the example embodiments.

It is anticipated that the time most commonly used will be Universal time (UT) and the time stamp system's software will automatically convert the UT time data to whatever time standard the user/client desires through their initial request and selection.

Time Standard: Definition

A time standard is any officially recognized specification for measuring time: either the rate at which time passes; or points in time; or both. For example, the standard for civil time specifies both time intervals and time-of-day. A time scale specifies divisions of time.

Standardized time measurements are provided using a clock by counting the periods of some cyclic change, which may be either the changes of a natural phenomenon or of an artificial machine.

Historically, time standards were based on Earth's rotational period, because it was believed that the rotational speed of Earth was constant. However, analyses of eclipse records made in the 19th century revealed that the rate at which Earth rotates is gradually slowing, and measurements made with quartz clocks at the beginning of the 20th century made clear that the speed varies seasonally.

Relatively recently, time interval standards based on very accurate and stable atomic clocks have replaced the previous standards based on Earth's rotational and orbital speeds.

Various types of second and day are used as the basic time interval for most time scales. Other intervals of time (minutes, hours, and years) are usually defined in terms of (1) Time standards based on Earth's rotation, (2) Time standards for planetary motion calculations, (3) Constructed time standards or (4) Other time scales.

Greenwich Mean Time (GMT)

Greenwich Mean Time (GMT) is mean time on the Prime Meridian. Observing the true solar time derived mean time and then adding to it a calculated correction, the equation of time, which smoothed the known irregularities caused by the ellipticity of Earth's orbit and the non-perpendicularity of Earth's axis to the plane of Earth's orbit around the sun. GMT used to be an international time standard before the advent of precise atomic clocks. GMT no longer exists as a time standard, although the name GMT is often incorrectly used to denote Universal Time. Greenwich Mean Time also used to be the international standard for civil time. In that sense as well, GMT technically no longer exists, although GMT is still often used as a synonym for UTC, which is the current international standard. The only sense in which Greenwich Mean Time officially still exists is as the name of a time zone.

Universal Time (UT)

Universal Time is a time scale based on the mean solar day, defined to be as uniform as possible despite variations in Earth's rotation UT0 is the rotational time of a particular place of observation. It is observed as the diurnal motion of stars or extraterrestrial radio sources. UT1 is computed by correcting UT0 for the effect of polar motion on the longitude of the observing site. It varies from uniformity because of the irregularities in Earth's rotation.

Ephemeris Time, Dynamical Time and Coordinate Time

These time standards are all intended to provide a uniform time for planetary motion calculations. Ephemeris Time (ET) is an obsolete time standard based on the ephemeris second, which was a fraction of the tropical year. The ephemeris second was the standard for the SI second from 1956 to 1967. Ephemeris Time was discontinued in 1984. For applications on Earth's surface, ET was replaced by TDT, which has since been redefined as TT. For the calculation of ephemerides, ET was replaced by TDB, but deficiencies in the definition of TDB led to its replacement by TCB for use in the solar system as a whole, and by TCG for use in the vicinity of Earth. In actual practice, ephemerides are calculated using Teph, which is linearly related to TCB but not officially defined.

Terrestrial Dynamic Time (TDT)

Terrestrial Dynamic Time replaced Ephemeris Time and maintained continuity with it. TDT is a uniform atomic time scale, whose unit is the SI second. TDT is tied to International Atomic Time (TAI) but, because the zero point of TAI was somewhat arbitrarily defined, TT was offset from TAI by a constant 32.184 seconds. The offset provided continuity with Ephemeris Time. Terrestrial Dynamic Time has been redefined as Terrestrial Time.

Barycentric Dynamical Time (TDB)

Barycentric Dynamical Time is similar to TDT but includes relativistic corrections that move the origin to the barycenter. TDB differs from TT only in periodic terms. The difference is at most 10 milliseconds, which is negligible for many applications.

Terrestrial Time

In 1991, in order to clarify the relationships between space-time coordinates, new time scales were introduced, each with a different frame of reference. Terrestrial Time is time at Earth's surface. Terrestrial Time (TT) is the time scale, which had formerly been called Terrestrial Dynamical Time. It is now defined as a coordinate time scale at Earth's surface.

Geocentric Coordinate Time

Geocentric Coordinate Time is a coordinate time scale at Earth's center. Geocentric Coordinate Time (TCG) is a coordinate time having its spatial origin at the center of Earth's mass. TCG is linearly related to TT as: TCG−TT=LG*(JD−2443144.5)*86400 seconds, with the scale difference LG defined as 6.969290134e-10 exactly.

Barycentric Coordinate Time

Barycentric Coordinate Time is a coordinate time scale at the center of mass of the solar system, which is called the barycenter. Barycentric Dynamical Time is a dynamical time at the barycenter. Barycentric Coordinate Time (TCB) is a coordinate time having its spatial origin at the solar system barycenter. TCB differs from TT in rate and other mostly periodic terms. Neglecting the periodic terms, in the sense of an average over a long period of time the two are related by: TCB−TT=LB*(JD−2443144.5)*86400 seconds. According to IAU the best estimate of the scale difference LB is 1.55051976772e-08.

Constructed Time Standards

International Atomic Time (TAI) is the primary international time standard from which other time standards, including UTC, are calculated. TAI is kept by the BIPM (International Bureau of Weights and Measures), and is based on the combined input of many atomic clocks around the world, each corrected for environmental and relativistic effects. It is the primary realization of Terrestrial Time.

Coordinated Universal Time (UTC) is an atomic time scale designed to approximate Universal Time. UTC differs from TAI by an integral number of seconds. UTC is kept within 0.9 seconds of UT1 by the introduction of one-second steps to UTC, the "leap second". To date these steps have always been positive.

Standard time or civil time in a region deviates a fixed, round amount, usually a whole number of hours from some form of Universal Time, now usually UTC. The offset is chosen such that a new day starts approximately while the sun is at the nadir. Alternatively the difference is not really fixed, but it changes twice a year by a round amount, usually one hour, i.e., Daylight saving time.

Other Time Scales

Julian day number is a count of days elapsed since Greenwich mean noon on 1 Jan. 4713 B.C., Julian proleptic calendar. The Julian Date is the Julian day number followed by the fraction of the day elapsed since the preceding noon. Conveniently for astronomers, this avoids the date skip during an observation night.

Modified Julian day (MJD) is defined as MJD=JD−2400000.5. An MJD day thus begins at midnight, civil date. Julian dates can be expressed in UT, TAI, TDT, etc. and so for precise applications the time scale should be specified, e.g. MJD 49135.3824 TAI.

AM and PM

AM Anti Meridian in 12-hour clock notation, Latin for "before noon" (also written A.M., a.m., and am), in contrast to post meridiem (P.M., p.m., and pm) "after noon" Anno Mundi a Calendar era counting from the creation of the world based on calculations from Old Testament sources of creation. Anno Martyrum, used in the Coptic calendar Anno Martyrum, used in the Coptic calendar PM Post Meridiem usually refers to (also written P.M., p.m., and pm), "after noon" in the 12-hour clock notation, in contrast to ante meridiem (a.m., "before noon").

Astrometry Time i.e., solar time, lunar time, Martian time, etc.: Other man-made time scales that may be developed using digital technologies in the future may be applicable to the example embodiments.

The United States uses nine standard time zones. From east to west they are Atlantic Standard Time (AST), Eastern Standard Time (EST), Central Standard Time (CST), Mountain Standard Time (MST), Pacific Standard Time (PST), Alaskan Standard Time (AKST), Hawaii-Aleutian Standard Time (HST), Samoa standard time (UTC−11) and Chamorro Standard Time (UTC+10). Daylight Saving Time begins at 2:00 a.m. local time on the second Sunday in March. On the first Sunday in November areas on Daylight Saving Time return to Standard Time at 2:00 a.m. The names in each time zone change along with Daylight Saving Time. Eastern Standard Time (EST) becomes Eastern Daylight Time (EDT), and so forth. Arizona, Puerto Rico, Hawaii, U.S. Virgin Islands and American Samoa do not observe Daylight Saving Time. Read more about the new federal law that took effect in March 2007, which extended Daylight Saving Time by four weeks.

Time in the United States, by law, is divided into nine standard time zones covering the states and its possessions, with most of the United States observing daylight saving time for part of the year. The time zone boundaries and DST observance are under the authority of the Department of Transportation.

Official and highly precise time keeping services (clocks) are provided by two federal time agencies: The National Institute of Standards and Technology (NIST), a Department of Commerce agency, and its military counterpart, The United States Naval Observatory (USNO).

The clocks run by these services are kept highly synchronized with each other as well as with those of international time keeping organizations.

It is the combination of the time zone and daylight saving rules along with the time keeping services that determines the legal civil time for any U.S. location at any moment.

The United States Naval Observatory (USNO) provides the Official Time Generation Source for the example embodiments and the USNO is headquartered at 3450 Massachusetts Ave, NW, Washington, D.C. 20392-5420.

The United States Naval Observatory (USNO) provides a wide range of astronomical data and products, and serves as the official source of time for the U.S. Department of Defense and a standard of time for the entire United States.

USNO products support activities and the area of our particular interest is: precise time provided by USNO Master Clock, Network Time Protocol (NTP) servers, web-based time synchronization, GPS timing products and services, Two-Way Satellite Time Transfer, and Loran-C timing products. The U.S. Naval Observatory continues to be the leading authority in the United States for astronomical and timing data required for such purposes as navigation at sea, on land, and in space, as well as for civil affairs and legal matters. Its current Mission Statement, promulgated in 1984 by the Chief of Naval Operations, reads: "To determine the positions and motions of celestial bodies, the motions of the Earth, and precise time. To provide the astronomical and timing data required by the Navy and other components of the Department of Defense for navigation, precise positioning, and command, control, and communications. To make these data available to other government agencies and to the general public. To conduct relevant research; and to perform such other functions or tasks as may be directed by higher authority."

The U.S. Naval Observatory, via its Directorates for Astrometry and Time, carries out its primary functions by making regular observations of the Sun, Moon, planets, selected stars, and other celestial bodies to determine their positions and motions; by deriving precise time interval (frequency), both atomic and astronomical, and managing the distribution of precise time by means of timed navigation and communication transmissions; and by deriving, publishing, and distributing the astronomical data required for accurate navigation, operational support, and fundamental positional astronomy. The U.S. Naval Observatory conducts the research necessary to improve both the accuracy and the methods of determining and providing astronomical and timing data.

Time Generation Sources

It is anticipated that the time stamp identifier generation systems and methods, as well as the various embodiments, are compatible with and, depending upon the application, will use the time signal data generated from either NIST and/or USNO. It is also part of the time stamp identifier generation systems and methods to use commercially available electronic time generators, which may be coordinated to the NIST/USNO time signals.

The time stamp generation described herein, includes a method, system and computer-readable medium applying unique machine-readable identifiers containing time sensitive information to everyday items of commerce, law, finance, manufacturing, etc. for purposes of certification, verification, authentication, validation of claims, maintenance, identification, security, control applications and notarization.

The example embodiments are versatile for applications involving raw data, processed data, documents, music, components, pharmaceuticals, inventions, creative areas of scripts, plays, designs, plans, etc. and can be applied to a variety of products and surfaces and even transactions as the application requires.

The example embodiments, being digital in nature and construction, may include microprocessor-based components, assemblies, systems and networks with specialized and/or modified hardware and software optimized for this application.

The example embodiments may be applicable as well as integrated with a variety of other devices such as, but not limited to: copiers, shredders, cameras, printers, scanners, voting and vote tabulation systems, transactions, copy protection (CD's, DVDs, motion pictures security, cell phones, PDAS (Personal Data Assistants), laptops, etc.)

The purpose of the example embodiments includes making and distributing, either electronically, via the Internet, or through surface transportation, accurate, independent Third-Party time-related identifiers that become associated with a particular: item, document, concept, creative idea, graphic (photographs, drawings, illustrations, music), advertisement, event (news, political, corporate), transaction, and work products and validating the specific point in time that the user has had their target tme stamped via the Internet.

The time stamping process includes formatting all target data in a digital or binary format and therefore, is basically compatible with any other device that also uses a binary form of software.

Other third-party software programs, although digital, may have to incorporate some modifications for true compatibility with example embodiments.

The basic digital time stamp format is mainly designed for use on the Internet and may be designed to provide three primary options: a) to provide an application-dependent secure time stamp, b) to provide a service of a Notary Public electronically from any location on earth as requested and ordered by the user/client and c) to provide data storage of the transaction(s) for a future time that it may be needed.

Basic System Communication Configuration

The basic configuration as shown in FIG. 4 includes a domestic or international user/client (401) desiring to purchase a time stamp identifier. The user may log onto the Internet (402) and then into the web site providing the service (403). The web site may link to the time stamp enterprise's microprocessor system (404, 405 & 406) initiating the time stamp process with the identifier information being returned to the user/client via the return path.

The Time Stamp Identifier

The Type of Symbol

Although any machine-readable symbol as shown in FIG. 5A, such as, but not limited to a bar code, stacked codes, circle codes, triangle data elements, etc. may be used as a timestamp according to the example embodiments, the preferred method of symbol selection is to use a high data density machine readable matrix formatted symbol (FIG. 5B), such as, but not limited to the U.S. Pat. No. 5,612,524 (expired) because the data capacity may be five to one-hundred times the capacity of other symbol formats such as a bar code symbol and is contained within a smaller area, generally about one-half of the size of a small common postage stamp.

The Matrix Symbol Data Cell Format

As previously mentioned, the preferred time stamp symbol identifier is in a stacked matrix format and as illustrated in FIG. 6 the matrix symbol (601) may be created from binary data internal to the symbol where the digital "1" is represented by a black data cell (603) and the digital "0" is represented by a white data cell (602). Note: this data cell sequence may be reversed (black data cells="0" and where the white data cells="1" should the application so warrant. The symbol may also be in a "positive" format like a film photograph or in a "negative" format like a photographic film's negative. The symbol, also may be in two-dimensions (length by width or "X" by "Y") as well as in three-dimensions (length by width by depth/height or "X" by "Y" by "Z").

VSCode® Symbol (FIG. 6A)—This symbol shares many features with the VeriCode® but has a much larger data capacity, allowing more than 4,000 bytes of information to be stored in a single symbol. Because of its high data capacity, VSCode® may be used as a secure container as well as a portable data storage unit. This portable data storage capability is ideal for storing personal, financial and/or biometric data information, the data stored within the VSCode® can be instantly obtained without recourse to a central database and can be securely protected with an optional individualized biometric key.

Benefits of the Matrix Format include more data capacity (VSCode® has capacity of over 4,000 bytes) because of its two-dimensional data structure compared to the one-dimensional data structure of any of the bar codes, the capability of storing biometric data, quick decoding speed, portable data storage container-freedom from dependency on central database, scalability in size to fit available space, omnidirectional—Codes can be read in any orientation or skew, ability to be directly marked on most materials, including metal, glass and plastic, custom design capability with unique encryption techniques to be incorporated within the code for additional security, ability to be used with or within electronic media such as RFID, or smart chip for data storage and access, ability to be stand-alone data storage or tied to a central database, and symbols contain high percentage of Error Detection And Correction (EDAC) that can be predetermined ensuring valid information upon decoding.

Biometric Data Increases the Accuracy of the Identification Process

The example embodiments incorporate any number of biometric forms of digital identification represented into a machine-readable time stamp as shown in FIG. 6B and the time stamp can then be positively linked to an individual. Examples of biometric forms of identification are: Vital Identification Statistics, Physical Characteristics (604) etc., Photograph or Facial Image Recognition Technologies (605), Retina Scan patents (606), Digital Signature Technologies (607), Fingerprint or Handprint Recognition Technologies (608), DNA Sequence Technologies (609). Personal Identification numbers (PIN), secret passwords, coded identification cards, biometric identification, etc. are also application to identification a specific individual that authorized the time stamp. (610) is a trusted time source preferably, but not limited to, the accuracy from the signal generated and broadcast from the United States Naval Observatory which would be the embodiment's official time of the notary event and received via a communication network (611) such as, but not limited to the Internet. This information/data is formatted into a machine-readable two-dimensional matrix symbol (612) with the option of including data encryption (613) to protect the symbols information from tampering by unauthorized sources.

Once these technologies digitize their target subject, this digitized data may be incorporated into a machine-readable Timestamp symbol that can be used to further identify the timestamp requestor.

Data Compression

In computer science and information theory, data compression or source coding is the process of encoding information using fewer bits (or other information-bearing units) than an un-encoded representation would normally utilize. This is accomplished through use of specific encoding schemes.

As with any communication, compressed data communication only works when both the sender and receiver of the information understand the encoding scheme. For example, this text makes sense only if the receiver understands that it is intended to be interpreted as characters representing the English language. Similarly, compressed data can only be understood if the decoding method is known by the receiver's software.

Data compression is useful because it helps reduce the consumption of expensive area resources, such as hard disk space or transmission bandwidth. On the downside, compressed data must be decompressed to be used, and this extra processing may be detrimental to some applications. For instance, a data compression scheme for video may require expensive hardware for the video to be decompressed fast enough to be viewed as it is being decompressed (the option of decompressing the video in full before watching it may be inconvenient, and requires storage space for the decompressed video). The design of data compression schemes therefore involves trade-offs among various factors, including the degree of compression, the amount of distortion introduced (if using a lossy compression scheme), and the computational resources required to compress and uncompress the data.

Types of Symbol Identification Information

A variety of information may be embedded into the machine-readable symbol's data which varies with: the application, the amount of data encoded or encrypted into the matrix symbol, the level of Error Detection and Error Correction (EDAC), the preferred identifier embodiment, etc. Examples of the types of information that may be embedded into the preferred machine-readable matrix symbol include: User/Client's information, including Name of Individual, Corporation, Government or Other, Address, City, State, Country, Time Zone, GPS Coordinates, Language such as English, Spanish, French, Japanese, etc, Other forms of Identification/validation such as Individual: Social Security Number, Driver's License, or Employee Badge Number, Corporation: Tax or other Corporate Identification, Cage#, Credit/debit card, other form of payment with the card's account number, Date such as Earth Date, Other date formats, Month, Week number, Day—Monday, etc., Days per year sequence 1, 2, 3, 4, 5 etc., Time such as Time Format, i.e., Daylight Savings, Regular, etc., Time Zone, Pacific Standard Time, etc., AM (Ante Meridiem) or PM (Post Meridiem), Time Generation Source: Internal/External, Hour, Minute, Second, Tenths of a second, etc., Hundredths of a second, Thousandths of a second, etc, Item Category such as Document including Script, Motion Picture, Television or Other, Treatment, Report, Memorandum, Notes, Story, Speech, Advertising Copy, Illustration such as Photograph, Sketch, Painting, Drawing, Engineering Drawing, Music such as Dance Routine, Composition, Jingle, Other, Component, Engineering such as CAD (Computer Aided Drafting), Trademark, Service mark, Pre-Invention such as Utility, Design, Chemical, Plant, Other, Management such as Accounting with Financial Reports, Budgets, Expenses, Remittance systems, etc, Board of Directors Resolutions, Decisions, Collaboration, Sales, Marketing, Product Development, Research, Engineering, Production, Legal, Configuration Management, Quality Assurance programs, Purchase orders. E-mail Management, Item Identifying Description, for example, if document: Title, Author, Language, Number of pages, Number of characters, Number of sentences, Number of paragraphs, Number of illustrations, etc, however, if Component: Model, Serial Number(s), Revision Number, Other, Security Related Information such as Human Readable Symbol Reference Number, Encryption Format Number, Data Storage Location, Date of decryption, History of Access to file, Consecutive numbering (for sortation purposes), The identification/type of User's computer's serial number, and The identification/type of user's Internet provider's identification address/URL (Universal Resource Locator). The above types of information are not limited to these examples.

Machine-Readable and Human-Readable

As shown in FIG. 7, although the Matrix symbol (701) is machine-readable, it may be anticipated that some situations will occur where the specialized readers are not readily available. In such a situation, this time stamp system may provide an alpha/numeric link or "key-to-a-file" (702) and by typing or verbally telephoning this sequence to the time stamp provider's enterprise, the file can be entered into their data base, located and the information may be manually accessed without the actual scanner being present for reading the timestamp symbol's data. This human readable data sequence (702) may be in any human language and determined at the time of enrollment.

Supporting icons (703) of various forms of analog and digital time clocks (704, 705, 706, 707, 708, & 709) may be associated with the symbol to either indicate that the symbol contains time information or to actually indicate the time that is embedded into the machine-readable symbol. Illustrated examples are: an alarm clock (704), a decorative clock (705), a wrist watch (706), a pair of clocks indicating initial and final process for obtaining a time stamp(s), various clock designs for various user preferences, applications and/or time zones (708) and a digital clock icon (709).

Data Security

The data contained within the machine-readable symbol may be encoded or most likely will be encrypted for security purposes using any of the standard industry encryption standards and protocols, Public/Private-key encryption schemes, such as, but not limited to the RSA public key system, etc. Special forms of encryption such as "one-time pads" may also be used for data encryption. Furthermore, it is possible to use privately constructed encryption algorithms.

Types of Data Contained within the Time Stamp Symbol

FIG. 8 illustrates some of the various types of data necessary to confirm an identifier. FIG. 8A illustrates an example of the type of "Client-related" data that is required, such as whether the User/Client is applying as an individual or on behalf of some enterprise or organization and would supply additional information, such as: name, address, identification number (employee number, Driver's License number, Social Security Number, FID Number, Manufacturer's CAGE number or code, computer identification number, etc.

FIG. 8B illustrates an example of the type of "Client-related" data that pertains to location of the client.

FIG. 8C illustrates an example of the type of "Client-related" data that describes the object i.e. invention, script, video, music, photograph, etc. that needs/applies for the time stamp identified.

FIG. 8D illustrates an example of the type of "Time Stamp" data that is required, i.e., Time generation source and the date and time itself. Note the "Seconds numbers" may be extended into the tenths, hundredths or more of a second to provide a more accurate time stamp.

FIG. 8E illustrates an example of the type of "Symbol-related" data that may be required, i.e., symbol orientation, level of encryption, error-detection, error-correction, data capacity, etc.

FIG. 8F illustrates an example of the type of "File-related" data that may be required, i.e., File Identification number, client password, encryption scheme, i.e. RSA Public/Private Key, One-time pad, etc.

FIG. 8G illustrates an example of the internal data location of the above FIGS. 8A-F. FIG. 8G also illustrates the symbol's orientation border (807) and the internal black and white internal data cells (808).

Data Recovery

The matrix symbol may have the built-in option of identifying, repairing and recovering its lost or damaged data as a result of a variety of conditions symbol might encounter, either through accident or malicious tampering.

This recovery process may be achieved through various levels and techniques of built-in data redundancy. This software process is referred to as "Error-Detection" which just detects reading errors generated from the data field and/or "Error-Correction" which, after the errors are first detected by the Error-Detection decoding/decrypting software, and then the Error-Correction software process actually repairs the damaged symbol by resurrecting the lost data.

It is anticipated that over time, the data cells within a time stamp symbol(s) may incur some level of damage as seen in FIG. 9 due to a number of environmental factors such as scratches (901) (including paper clips), marks (902) caused by pencils, pens and markers, holes (903) i.e., paper punch, paper tears, creases from folds, etc. (904) and liquids (905) such as fingernail polish, coffee, water, ink, etc. If the symbol(s) contains colored data cells and the color is altered, i.e., due to environmental conditions such as fading, the symbol's data may also be reconstructed.

As an example, data is more easily recovered using a matrix format, than using a bar code format.

Adjustable Size (Scalable)

Unlike bar codes with fixed thick and thin character dimensions, the matrix format being a square with its square data cell may be both reducible as well as expandable as shown in FIG. 10. The smallest matrix symbol produced was microscopic in size (1001) and the largest was 24" on a side (1005) (not to scale). Other popular sizes are ⅜" (1002), ½" (1003) and ⅝" (1004).

The matrix symbol format functions like pixels on a computer screen where they may be enlarged or reduced, turned into black, white, grey or colored at the push of a button.

Data Security

In order to be effective the time stamp on a document or object must be secure against any alteration, modification, tampering or transfer. This may be achieved through the implementation of various levels of encryption. It is virtually impossible for a human to decode a matrix symbol because of a lack of a reference to use as a basis for starting the decoding process as shown in FIG. 11. When it is encrypted, it becomes even more impossible to penetrate its message. For example, a time stamp matrix including 10 data cells on a side would equal $10^{32}$ possibilities, an amount greater than all of the grains of sand in the universe.

Reading Nonaligned Time Stamps

As shown in FIG. 12, the time stamp is specially constructed to allow it to be read by either a fixed scanner or a hand-held scanner in any of 360-degree orientation 1201. Bar codes may be read horizontally only in an end-to-end direction, either right-to-left or left-to-right. Because of this limitation, bar code reading is referred to a "bi-directional" reading.

The matrix identifier is "Quad-directional" which means that the target symbol may be approached and read from any of its four sides 1202 & 1203 and in any orientation.

Reading Skewed Time Stamps

Unlike bar code symbols, matrix symbols may be read in various skewed positions and angles as shown in FIG. 13. Humans, when holding a hand-held symbol reader, may vary their holding position, their angle of attack; their focal distance, the skew of the reader to the symbol, etc. because of the infinite variations of ways that a human may hold the scanner.

Reading Component/Object Time Stamps

It is anticipated that time stamps may be applied to objects such as, but not limited to: components, assemblies, collectables, etc as shown in FIG. 14. The time stamp may be applied either indirectly, as in 1401 using pressure sensitive adhesive labels printed by ink-jet, or laser printing for example, or directly onto the target item 1402 using a variety of computer-controlled marking methods, such as, but not limited to, Laser engraving, Etching (chemical), Mechanical engraving, Dot peening, Micro-sandblasting, etc.

Time stamps may be applied to just about any flat, concave, convex or irregular surface, and examples may include: Paper, Iron, Plastic, Aluminum, Glass, Inconnel, Composites, Titanium, Rubber, Gold, Wood, Silver, Steel and Platinum.

Comparison of Space Efficiency

The selection of the variable data time stamp matrix format is preferred to that of a bar code because the bar code has very limited data capacity, security and requires more space than the matrix code. FIG. 15 illustrates a comparison between a standard bar code commonly found in a supermarket product (left) and a matrix symbol (right).

Anti-Tampering Security Feature

Figure 16A:
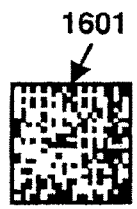
FIGS. 16A-16C show anti-tampering security features according to example embodiments.

As an additional security precaution, a special Anti-tampering pattern may be computer-generated that functions as a watermark. FIG. 16A illustrates a normal symbol 1601.

Figure 16B:
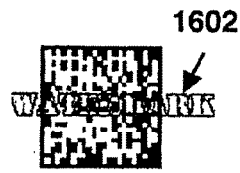
Figure 16C:
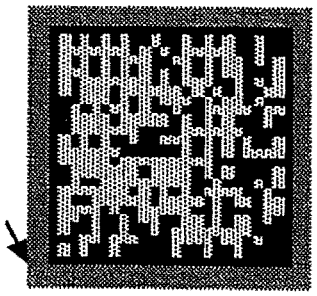

FIG. 16B illustrates an under layer or base of computer-generated color 1602 applied by the user to his document(s) with the symbol's data being imaged on top. FIG. 16C illustrates the binary black data having patterns with one or more half tone image(s) 1603 which again may be virtually impossible to counterfeit or alter without detection.

Data Density

As previously illustrated, matrix formatted coded symbols are flexible in size and are made up of even rows of binary data integrated into a matrix array or data field which is located inside a finder pattern or Data Square as each data cell making up the frame may be turned on or off to represent binary data.

The size of a matrix-coded symbol may be flexible in order to accommodate varying quantities of data. Generally, the symbol is in the ⅜" square to ½" square range.

The data density of a matrix formatted coded symbol ranges from a few characters requiring a few bits of binary data up to 4,000+ bytes holding up to 2,000 to 4,500 alpha/numeric characters.

The symbols may include error correction, so the symbol may still be decoded in the event it is damaged.

Data Content

The symbols may be encoded to contain a number of messages. For example, a primary message may contain customer related information, postal code, country code and the class of service number, etc., while a secondary message may contain information about the specific item targeted for time stamp identifiers along with other types of information.

Marking the Time Stamp Symbol

Time stamps in the matrix format are versatile because they may be marked onto just about any type of material such as, but not limited to: paper, glass, rubber, steel, aluminum, silver, plastic, composites, wood, iron, gold and diamonds.

Types of Processes Used for Physical Marking of Time-stamps

Time stamps in the matrix format are versatile because they may be marked onto just about any type of material using application-dependent methods of marking, such as, but not limited to: inkjet printer-paper, laser Printer-paper, dot peen-metal, laser-etcher-metals, plastics, composites, etc., micro-sandblasting-glass, plastics, etc., printing: flexography, offset, etc. and photographic-film.

Topographies

Time stamps in the matrix format are versatile because they may be marked onto just about any type of topography, such as, but not limited to: flat, concave, convex, compound curve, irregular, as well as a variety of surface conditions reflective, matte, sandblasted, etc. as specified by the Rockwell Surface Texture Gauge.

Reading the Time Stamp identifier

Reading a matrix formatted machine-readable symbol is performed optically with an image camera containing a CCD (Charged Couple Device) or other light sensitive microprocessor-based detector(s) (i.e., CMOS) that converts the incoming analog image into a microprocessor-usable digital format.

There are two basic configurations for reading a matrix symbol: non-contact and contact. The first may be a fixed station non-contact reader where the target item(s) move past a CCD pre-focused camera, such as a conveyor capturing each symbol's image that produces a sharp image on its detector. The appropriate software may then decode the digital image.

Figure 17:
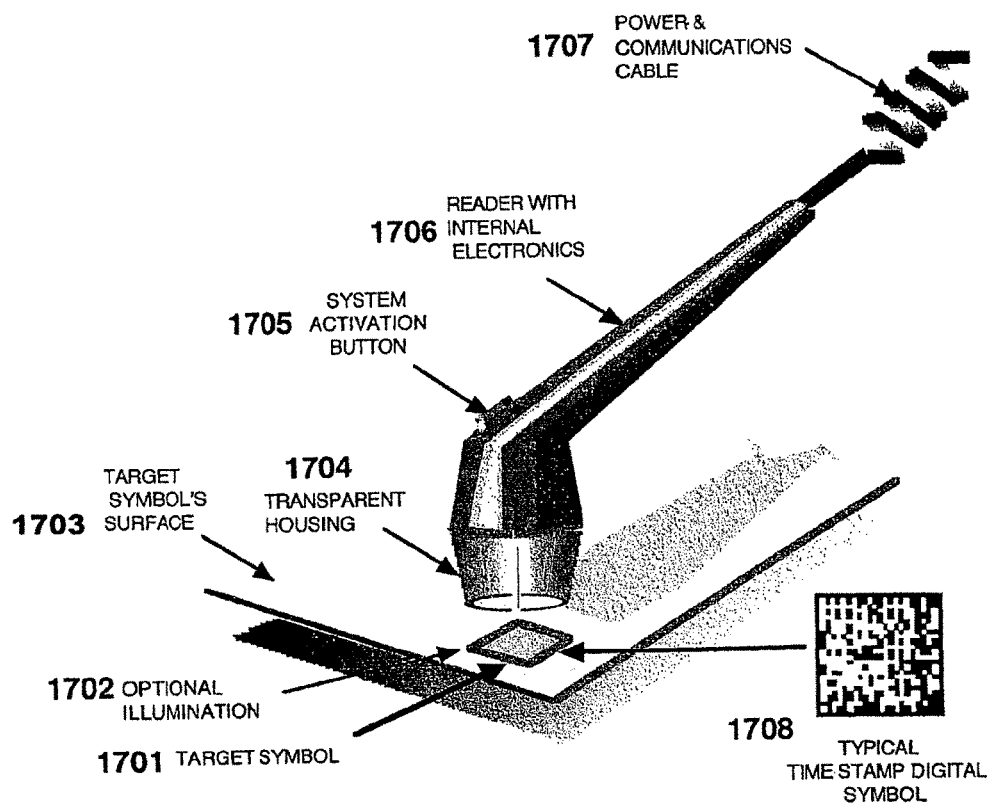
FIG. 17 illustrates a contact image camera (CCD) symbol reader according to example embodiments.

The second method of reading is portable and may be either contact (which is pre-focused for image capture), as illustrated in FIG. 17, or non-contact reading the symbol from a variable distance, similar to a bar code reader. The reader's optical system may capture the complete image within an instant. It then may transfer the data to the microprocessor, which performs all software processes upon the symbol's captured image/data and functions internally, such as: orientation, decoding/decrypting, error correction, etc. The camera or optical system may be located inside a hand-held device as shown in FIG. 17, like a bar code reader.

As shown in FIG. 17, an example contact image camera symbol reader may read a target symbol 1701 from a target document 1703 by using optional illumination 1702. The reader with internal electronics 1706 may include a transparent housing 1704, a system activation button 1705, and a power and communications cable 1707. 1708 shows an enlarged view of a typical time-stamp digital symbol.

Matrix symbol readers have a much faster acquisition time and are comparable to photographic shutter times, i.e., ¹⁄₁,₀₀₀th of a second. They are not as slow in image acquisition as a bar code reader, which may scan a bar code around 625 lines per second.

Portable Terminals

Figure 18A:
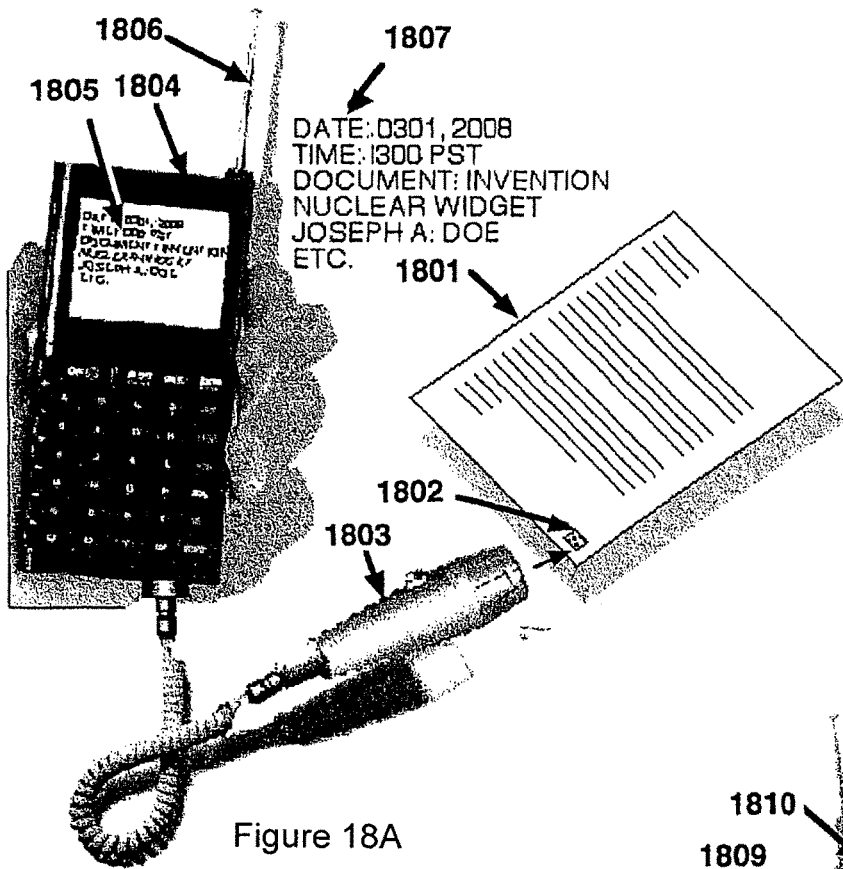
FIGS. 18A-18B show a portable hand held reader for document and component time stamp reading according to example embodiments.

As shown in FIG. 18A, hand held readers 1803 may also be linked to portable terminals 1804 where the data captured 1807 from a matrix symbol 1802 on a document 1801, for example, may be displayed on the terminal's display screen 1805 and application-dependent functions such as, but not limited to data being transmitted, up/downloaded, etc. be performed wirelessly over a network and antenna 1806.

Figure 18B:
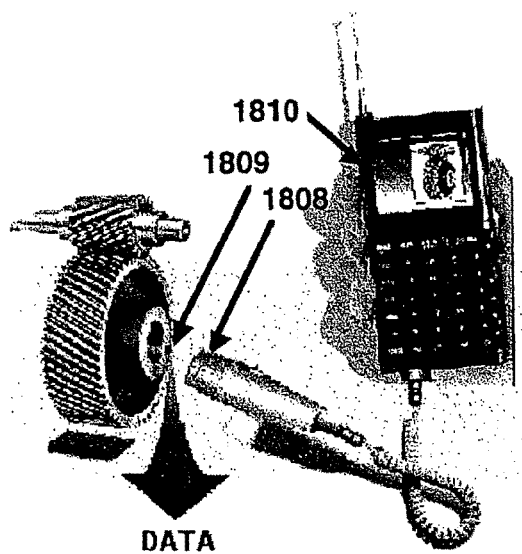

FIG. 18B illustrates the same basic features mentioned previously, except that the reader may be reading 1808 a target symbol 1809 that has been directly marked into the metal surface using a laser-engraved component, laser-engraved or other form of application-dependent component identification where the data such as, but not limited to transmitted, up/downloaded, etc. be performed wirelessly over a network and antenna 1810.

Data File Formats and Programming Languages

The example embodiments are compatible with data file transfers in any digital format such as, but not limited to: JPEG, GIF, TIFF, WMV, etc. or programming languages such as, FORTRAN, COBOL, C+, C++, etc. and/or any electronic devices, using the proper software that will mark, read or transfers them electronically.

Alternate Matrix Symbols Machine-Readable Symbol Formats

As shown in FIG. 19, the selection of a machine-readable symbol used in the example embodiments includes any symbol format including, but not limited to: bar codes, circle codes, matrix codes, OCR (Optical Character Recognition), Data Strips, RFID (Radio Frequency Identification) that links into the time stamp system), MICR (Magnetically Encoded Character Recognition), etc. and any machine-readable symbol that represents time stamp information using data cells or information elements that are black/white contrast, gray scale, color scale, data in the form of Morse Code, bars, geometric shapes: i.e., circles, hexagons, squares, triangles, etc., binary characters, images, graphic image distortions, etc. either alone, integrated, "stitched" together or in tandem or in differing combinations of each other.

Matrix Formats

There are a number of other matrix-formatted data symbols currently in use and the example embodiments, with modifications to the printing and reading software, may incorporate any of them. The most popular is a matrix symbol commonly referred to, as the "Data Matrix" code shown in FIG. 20 and is also a two-dimensional matrix "barcode" having black and white square modules arranged in either a square or rectangular pattern. The information to be encoded may be text or raw data. A usual data size may be from a few bytes up to 2 kilobytes. The length of the encoded data depends on the symbol dimension used. Error correction codes may be added to increase symbol strength: even if they are partially damaged, they may still be read. A Data Matrix symbol may store up to 2,335 alphanumeric characters.

Data Matrix symbols are square and made of cells that are little squares that represent bits. Depending on the situation a white module is a 0 and a black module is a 1, or vice versa. Every Data Matrix may include at least two finder patterns or handles and two syncs. Handles are two perpendicular lines, colored the same way as 1 modules, while syncs are like handles with the difference that they are made of alternating black and white modules. Handles may achieve a good alignment with the symbol, while syncs sample modules correctly. If the matrix dimension grows, up to 8syncs and handles may be added both horizontally and vertically. Symbol sizes vary from 8×8 to 144×144.

The Data Matrix is provided by an ISO standard, ISO/IEC16022—International Symbology Specification and may be in the public domain. This matrix format may also work in tandem as example embodiments, however, at the time of this document preparation, the data capacity of this symbol is 50% of the VS Code mentioned earlier.

Stacked Bar Codes

To compete with the higher data density of bar codes, the industry (mainly Symbol Technologies, Inc.) developed bar codes in the "Y" dimension. This additional height provided them with more space for additional data, however, they kept the limitations of the bar codes and did not want to obsolete their own hardware particularly their investment in bar code readers. PDF417 was a first stacked bar code symbol.

PDF417 is a multi-row, variable-length symbol with high data capacity and error-correction capability. An example is shown in FIG. 21. PDF417 offers some unique features that make it the widely used 2D symbol. Linear scanners, laser scanners or two-dimensional scanners may read a PDF417 symbol. PDF417 is capable of encoding more than 1100 bytes, 1800 text characters or, 2710 digits. Large data files may be encoded into a series of linked PDF417 symbols using a standard methodology referred to as Macro PDF417.

However, the data capacity of this symbol is less than the VS code mentioned earlier.

The data may be encoded using one of three compaction modes: Text compaction mode, which encodes alphanumeric characters and punctuations; Binary compaction mode, which encodes all 8-bit characters; Numeric compaction mode, which achieves the highest density by only allowing digits. The default mode is Text compaction mode. Using special code words, the compaction mode may be switched from one to another. Barcode ActiveX automatically selects the compaction mode based on data encoded and shifts accordingly. Each PDF417 symbol contains 2 to 512 error correction code words corresponding to error correction level 0 (the least) to 8 (the highest). The PDF417 format may also work in tandem as in example embodiments.

Magnetic Ink Character Recognition, or MICR, is shown, for example, in FIG. 22, and is a character recognition technology adopted mainly by the banking industry to facilitate the processing of checks. The process was demonstrated to the American Bankers Association in July 1956, and was almost universally employed in the U.S. by 1963. On Sep. 12, 1961, Stanford Research Institute (now SRI International) was awarded U.S. Pat. No. 3,000,000 related to MICR. The patent was assigned to General Electric and MICR is standardized by ISO 1004.

The major MICR fonts used around the world are E-13B and CMC-7. George Jacobin, who was working for General Electric at the time, chose the E-13B font. Almost all Indian, US, Canadian and UK checks now include MICR characters at the bottom of the paper in the E-13B font. Some countries, including France, use the CMC-7 font developed by Bull.

The MICR format may also work in tandem as in example embodiments.

Maxicode, shown in FIG. 22A, is an international 2D (two-dimensional) barcode that is currently used worldwide by the UPS (United Parcel Service) on packing slips for package sortation and addressing. MaxiCode symbols are fixed in size and are made up of offset rows of hexagonal modules arranged around a unique finder pattern. The size of a Maxicode symbol is 1.11×1.054 inches and is limited in its data capacity -up to 93 data characters of information. MaxiCode symbols include error correction, so the symbol may still be decoded when damaged.

MaxiCode barcodes encode two messages, a primary message and a secondary message. The primary message usually encodes the postal code, country code and the class of service number. The secondary message usually encodes address data, but it can also encode other types of information. MaxiCode symbols like other machine-readable symbols, have different modes of operation.

The Maxicode format may also work in tandem as in example embodiments.

Bar Codes

There are an estimated 100 different formats for bar codes. Examples which may be used by the example embodiments include Interleaved Data Type: Numeric (even number of digits Bar Code Length: Variable—Checksum: Optional, ⅗ Data Type: Alpha-Numeric+(upper case only) Bar Code Length: Variable—Checksum: Optional, 93 Data Type: Alpha-Numeric+(upper case only) Bar Code Length: Variable—Checksum: Required, 128 Data Type: Complete ASCII, plus high density numeric Bar Code Length: Variable—Checksum: Required, Codabar Data Type Numeric plus extras, (A, B, C, D, and -$:/.+) Bar Code Length: Variable—Checksum: None, FAN Data Type: Numeric Bar Code Length: Fixed (8 or 13 digits)—Checksum: Required, PostNet Data Type: Numeric Bar Code Length: Fixed—Checksum: Required, UPC Data Type: Numeric (assigned by Uniform Code Council) Bar Code Length: Fixed (12 digits+⅖ digit supplemental)–Checksum: Required.

Each of the various bar code formats can also work in tandem according to the example embodiments.

FIG. 23 shows High Capacity Color Matrix Codes/Gettag/Mobile Codes.

The sophisticated technology powering Microsoft Tag, High Capacity Color Barcodes (HCCBs), was invented by Microsoft Research. It was designed from the ground up for maximum performance with limited cameras on most mobile phones. Advanced image-processing techniques may even decode out-of-focus barcode images, allowing Microsoft Tag to work with the fixed-focus camera lenses common in most mobile devices.

The advanced computer imaging of HCCBs employs different symbol shapes in geometric patterns and multiple colors to provide more information in a smaller space.

Placement

Time stamps do not have to be individually stand-alone applications (1) i.e., one time stamp per photograph as shown in FIG. 24A. Time stamps may be placed within or adjacent to the photograph or text of a document either as a visible 2401 or invisible 2402 symbol. 2403 illustrates the time stamp symbol being applied in the margin of a standard 8½"×11" letter. 2404 illustrates the same used on a legal document.

Sequential Time Stamps

Example embodiments are related to sequential time stamps. Sequential time stamps are time stamps that may be placed in sequence as requested to denote the passage of specific times. As an example, a first time stamp may be at 12:00.00 PM and the next time stamp for the same application and object might be at 2:30.00 PM.

Progressive/Consecutive Time Stamps

Progressive time stamps are time stamps that may be added to denote both changes in time as well as changes in associated tasks or products, etc. An example may be a first time stamp at 12:00.00 PM (Item #1) and a next time stamp for the same application and object might be at 2:30.00 PM (Item #2), etc. Multiple progressive time stamps may be applied to a page for example, medical procedures on a patient, while consecutive time stamps may be placed onto separate items such as products moving down a conveyor line.

FIG. 2405 may illustrate sequential/progressive or consecutive time stamp identifier(s) that are concatenated and linked to each other. These may be added in rapid succession or they may be added over time, as new events occur, or if the photographs are involved in a legal matter, the time stamp(s) may be used as a Bates document/exhibit numbering and reference system or for automated or semi-automated sortation purposes.

Some applications for documents utilizing sequential time stamps may be in aircraft repair and maintenance systems, medical procedure systems, various departments performing specific and/or sequential tasks, and multiple editing phases of a document or photograph as it passes from hand to hand.

Time Stamping Different Categories of Items

Physical Items

The example embodiments provide the capabilities of time stamping a broad category of items, such as, but not limited to: Colorings, Methods, Concepts, Molds, Description, Patterns, Designs, Procedures, Devices, Processes, Discoveries, Principles, Documents, Products, Explanation, Schematics, Formulas, Slogans, Ideas, Symbols, Illustrations, Systems, Invention(s), Titles, Lettering, Tooling, Listings, i.e., ingredients, Typographic ornamentation, names.

Collaborative Process

Other example embodiments related to time stamping, as described herein, may assist in the collaborative process by organizing documents, photographs, X-rays, etc. by time and date so that all participants in the collaborative process may refer to the same sheet, topic, illustration, map, x-ray, etc.

Transactional

Example embodiments may be further related to time stamping of transactional documents, either in physical hardcopy or in electronic versions, with machine-readable time stamp symbols containing the time, date, type and location of transaction, etc. This may be an automatic process or generated by a user on-demand.

Major Applications

Table I shows examples of the anticipated major applications grouped into the basic headings of: Entertainment, Inventions, Corporate material and Literary Works.

TABLE 1

Examples of Typical Categories for Time Stamp Embodiments

| Entertainment | Corporate | Inventions | Literary Works |
|---|---|---|---|
| Animation | Administrative | Ideas | Musical Works & Any Accompanying Words |
| Art | Legal | Lab Books | Dramatic Works & Any Accompanying Music |
| Autobiography | Patent | Sketches | Pantomimes & Choreographic Works |
| Bible | Financial | Drawings | Pictoral, Graphic & Sculptural Works |
| Biography | Stockholder | Schematics | Motion Pictures & Other Audiovisual Works |
| Book | Agenda | Flow Diagrams | Sound Recordings |
| Commercial Comment | Board Meeting Notification | Charts Formulas | Architectural Works Computer Programs and Most Compilations |
| Documentary Format | Creditor Research | Tables Processes | Literary Works Maps |
| Game-show | Development | Designs | Architectural Plans |
| Lyrics | Division | Specifications | Pictoral, Graphic |
| Manuscript | Employment | Lists | Sculptural Works |
| Music | Manufacturing | | Choreographic Works |
| Musical | Accounts Payable | | |
| Notes | Accounts Receivable | | |
| Other | Visitors | | |
| Outline | Vendors | | |
| Photograph | Press Release | | |
| Pilot | Marketing Plan | | |
| Pitch | Business Plan | | |
| Play | Takeover Plan | | |
| Poems | Acquisition Plan | | |
| Proposal | Ideas | | |
| Scene | Lab Books | | |
| Screenplay | Sketches | | |
| Script | Drawings | | |
| Series | Schematics | | |
| Short | Flow Diagrams | | |
| Sketch | Charts | | |
| Specification | Formulas | | |
| Story | Tables | | |
| Synopsis | Processes | | |
| Teleplay | Designs | | |

TABLE 1-continued

Examples of Typical Categories for Time Stamp Embodiments

| Entertainment | Corporate | Inventions | Literary Works |
|---|---|---|---|
| Trailer | Specifications | | |
| Translation | Lists | | |
| Treatment | Maps | | |
| Other | Others | | |

Work-Product That is Not Eligible/Incomplete-Work-in-Process: Several categories of material are generally not eligible for federal copyright protection. These include works that have not been fixed in a tangible form of expression (for example, choreographic works that have not been noted or recorded, or improvisational speeches or performances that have not been written or recorded).

Although federal copyright protection is not extended to these items, the example embodiments provide a method of time stamping them. Sequential time stamping provides a means to record events, such as a date-of-origination protection, periodic "work-in-process" time stamping to the time stamping of the finished work product prior to submission to the patent office, attorney, etc.

Forms of Time Stamping Material

The example embodiments, in addition to notarization of documents, may include the time stamping of various materials and media. Time stamping may be used on a variety of basic audio, visual and text items covering a variety of media such as: Text Material (alphanumeric characters in any language) including static text: anything that has been printed using a computer or microprocessor-controlled device, Dynamic Text, i.e. text that is being created on a computer or microprocessor-controlled device at the time a request for a time stamp identifier is Issued, Visual Material, Static Images, i.e. still images of: Documents, Photographs, Illustrations, Graphics, Slides, Copies, Special effects, etc, dynamic images including moving images of video programs, video clips, video tape, motion pictures/film, advertisements, asset documentation, collectable documentation, special effects, etc, and audio material such as musical scores, songs, sound effect, speeches, etc.

The time stamp process and control system may include a series of steps contained within software modules, such as a "register" or enrolling process module, a "LOGIN" process module, a "payment" process module, etc.

After completing registering at the web site, a new user or an existing customer, may begin the process of entering specific information about the target item, object or other subject he/she wants to time stamp.

After all information and descriptive fields are satisfied by the user, the time stamp process may generate the appropriate identifier(s), and transmit the print sequence over the Internet or in-house suitable for labels and mailing. This event may be recorded into the time stamp database for future reference.

As shown in FIG. 25, the time stamp system may provides the capability and capacity of the user/client to print within their location a final encoded or encrypted machine-readable identifier in real-time.

After the user has logged into the time stamp web site and filled out the required information about what is to be time stamped and prior to the system allowing the printing process of the identifier(s) to begin, the time stamp system may check for printer software compatibility.

FIG. 25 illustrates a process of determining the compatibility of the user's system to print a time stamp. A similar process may be used to determine the compatibility of the user's microprocessor devices or computer(s) to the time stamp computers, network, browser(s), web site, software and firmware to accommodate the time stamp identifier being printed on the user's target object.

After it is determined that the user's system software and the time stamp systems are compatible and communicating, i.e., protocols, etc., as shown in FIG. 26, the user then has the option to conduct a test on a plain piece of paper using a test symbol 2601 with a clear zone ("n" by "m") 2602. (Clear Zone(s) is an area where no other printing or graphics that might interfere with the reading process is allowed) surrounding the machine-readable symbol to be printed. Human readable information 2603 indicating that the symbol is a "Test Pattern" may be shown in order to prevent any confusion between a genuinely provided time stamp and the test pattern.

FIGS. 27A & 27B illustrate operations of the process according to example embodiments. As shown in 2701, a known user may log into the web site. In 2702, a first-time user may register to log into the web site. In 2703, the user may enter their identification and password. In 2704, the system may provide a data entry screen. In 2705, the user may begin a confidential data entry process. In 2706, the user may select a data entity, industry and category. In 2707, the user may select an identifier format. In 2708, the user may specify a target item for time stamping. In 2709, the user may submit its submission of the target item and data to the time stamp system. In 2710, the system may do a system check of the data. If all pre-time stamp data fields are entered, then in 2711, the system response description page may be displayed. If the time stamp data fields are not all entered, then the user is directed back to 2705. After 2711, in 2712, the user may enter specific information regarding the target item. In 2713, the system may check to determine if all specific data fields are complete. If they are complete, in 2715 then the system may request assignment of a machine-readable symbol identifier. If the system determines that the specific data fields are not all complete, then in 2714 the system may direct the user back to 2712. In 2716, the system may begin symbol formatting operations. In 2717, the system may access time data. In 2718, the system may compile data from all fields. In 2719, the system may create a machine readable symbol per design rules. In 2720, the system may engage in in-house printing. In 2721, labels and forms may be completed and in 2721*a*, the labels and forms may be shipped to the user 2729.

In 2723, the printer command and symbol data may be transmitted to the user and in 2724, the user may print unique identifiers. In 2725, it may be determined whether all identifier symbols are printed. At this point, the user may request customer service assistance. In 2726, it may be determined if the job is complete 2728. The user may decide to repeat a new data entry process, whereby the user may move back to 2705. The user may also decide to logoff in 2727. Additionally, in 2722, the system updates its files by compiling all data, adding it to the user's file, subtracting a fee for services, finalizing accounting and transferring key data to a marketing department.

FIG. 28 illustrates a conventional flow diagram of one of the most common formats that most users on the internet are familiar with and example embodiments would likely use the same format. In 2801, a first-time user may register with a web site. In 2802, a user may log into a web site if they are not a first-time user. In 2803, if the user is a first-time user, the web site may create a new user file. In 2804, if the user is not a first-time user, when they log in, the web site may retrieve the user's existing file. In 2805, if the user is a first-time user or a repeat user, then the web site may request the user's identification and password and continue.

FIG. 29 shows an Internet Time Stamp Corporate Custom Annual Sales Process.

It is anticipated that the time stamp process may, in addition to individuals, be of interest to corporations, associations, etc. who may want to establish an annual contract for their employees/members.

FIG. 29 illustrates the process as applied to an annual contract where orders thoughout the year are subtracted from the remaining funds.

When the funds are low, i.e., 25% of the contract amount a reminder is sent for an additional purchase and refill of future identifier capability.

As seen in 2901, a user from a corporation may login. In 2902, a user with proper authority may create a purchase order and specify a quantity, divisions and employees allow to access to a time stamp system. In 2903, an employee with proper authority may request for a time stamp. In 2904, the user with proper authority may also create an identifier which is formatted exclusively for the corporation. In 2905, when the user requests a time stamp, the system may check an account balance to determine whether it may proceed. In 2906, it may be determined whether the client using the system has a positive balance. If the client does not have a positive balance, then the client may be redirected to reorder. However, if there is a positive balance, then the system may authorize and account for each identifier which is dispensed from the system in 2907. In 2908, the corporation's user may provide identifier information and in 2909, the format identifier process may begin. In 2910, a final symbol print command may be initiated. In 2911, final identifiers may be delivered via a network or otherwise to the corporation and in 2912, the client's balance may be adjusted accordingly.

FIG. 30 shows an automated electronic process allowing a client to reorder future time stamp identifiers using, for example, a credit/debit card, a purchase order or some other form of payment in exchange for reloading new and additional identifiers. In 3001, a corporation or commercial account may login into the system. The user of the system for the corporation may make a request for a time stamp in 3002. The system in 3003 may then check the balance of the account. If client has a positive balance, then the user is directed as in 2907, above. However, if the client does not have a positive balance, then in 3004, the user may be directed to reorder. 3005 indicates how the user may go about a manual reorder process. For instance, the user may request that the client be contacted via telephone, fax, mail or e-mail to initiate a reorder process. 3006 refers to an automatic reorder process. According to an automatic reorder process, the client may be automatically charged via a credit or debit card. If the card is accepted, then the client may be sent an encrypted secure key and the system is reloaded with a new quantity of time stamp identifiers. However, if the card is declined a preset number of times (i.e. 2), the client may be informed of the declined card.

FIG. 31 shows a flowchart indicating internet time stamp level of service which is provided. After the user/client logs-on to the web site and logs-in to the time stamp area, they have the choice of either the time stamping function 3101A or the notary function 3102.

This process may also conform to the various government (federal, state, city, etc.) domestic and international regulations except that such process would be executed online through a State-Authorized Notary Public and/or the National Notary Association.

The process of a higher level of documentation may be handled through a human operator who verifies the information and/or viewing the scanning of the documents, identification, etc.

As seen in 3101, a user may login to the system. If the user is requesting time stamp service only, then the system may charge an appropriate fee and proceed with the time stamp process previously discussed. However, the user may also select an electronic notary service in 3102. If that is the case, then the system may charge an appropriate fee in 3103 and display a purpose of the code as well as 10 guiding principals. The user may ask or it may be determined what country the user lives in 3105. In 3106, the user may provide a response to what country they live in. In 3107, the country data file may be selected based on the country chosen. In 3108, the system may request the state that the user lives in and the user may provide a response in 3109. In 3110, the system may then refer to state rules based on the state selected by the user in 3109. In 3111, the customer may fill out information fields. In 3112, the system may determine whether the customer's requirements conflict with state requirements based on the state rules of 3110. In 3113, if it is determined that the customer's requirements conflict with the state's requirements then an alert may be displayed and the user is redirected to correct any issues in 3111. However, if the system does not find any problems, in 3114, the system may proceed with the electronic notary process.

FIG. 32 illustrates the selection of various types of media and material categories for time stamping. Examples suitable for time stamping include static and dynamic images, sounds, text, etc.

FIG. 33 may illustrate how third party websites may provide services in conjunction with the time stamp system. As an example, the time stamp system may allow third party websites to use the system and provide services to users. In addition to providing service directly to users, the time stamp service may also allow third party websites to provide a service by connecting with the time stamp system.

As shown in FIG. 33, a time stamp server may provide a web based service and website 3301. Third party servers may provide third party websites 3302. Users may either connect directly to the time stamp website 3301 or third party websites 3302 which then transmit data 3303 through a network such as the internet 3305 to a time stamp enterprise 3304. The time stamp enterprise may then transmit data back to the user 3306 via a network such as the internet 3305.

Time Stamp Process for Visual and Visually Scanned Material

Another advantage of the example embodiments includes the addition of visual material in the form of digital images that, for a number of reasons, require a time stamp(s).

The example embodiments are applicable to most digitized items and items that have been or are in the process of being digitized such as, but not limited to video cameras, film cameras, etc. whose software creates a time stamp (for example a process of cutting and pasting or document or image creation/editing software).

These images are grouped as examples, within the following categories: static images such as archival images, clip art, computer-generated graphics and artwork, illustrations, line drawings, objects, photographs, stock photographs, slides i.e., 35 mm, etc., transparencies, dynamic images generated from the following devices camcorders, satellite feeds, computers, television, film, YouTube.

Time Stamp of Static Images

It is notable that there are two ways to send a static image over the Internet: a) indirectly and b) directly.

The time stamping of static images as shown in FIG. 34A for images and for text may be generated from the user's 3401 digital scanner 3402, such as a Canon' Pixma MP 500 flatbed scanner that will take a digital picture of the target item, (using the illustration of a desert cactus 3403, for example, and/or documents 3404) and after the digitizing process is complete the scanned data may be sent to the user's computer (not shown) which in turn sends the image-data to the Internet 3405, 3406.

The image-data may be received from the Internet-linked time stamp system 3406 and the image(s) 3407 & 3408 may be processed in the Time Stamp Identifier System 3409. After the time stamp identifier(s) 3410, 3411 is applied to the target item(s) in 3412 and 3413, the data may be sent back in 3414, 3415, 3416 and 3417 to the user 3401 via the internet 3405.

Time Stamp of Dynamic Images.

It is anticipated that numerous applications involving dynamic images will require time stamping. Time stamping dynamic images requires more equipment, software and data storage than time stamping systems providing identifiers for plain static images.

There are two forms of dynamic images: a) the moving images present on recorded medium such as a videotape/VCR (Videocassette Recorder), film, or a DVD (Digital Video Disk) and b) those that are generated in real-time such as those that are transmitted live, i.e., digital cameras in war zones, news events, disasters, streaming media, burst transmissions, time-delayed collaboration, (recording music), etc.

FIG. 35 shows dynamic time stamping of dynamic images and the time stamp identification process may be considered similar to capturing something in a fast-moving river that flows past you.

First, the time may be set for time stamp identifiers to be used. The time segments may be varied as the application requires. FIG. 35A illustrates the time segments set for ⅒th of a second. In other words, every ⅒th of a second the dynamic image flowing through the system is "grabbed" and frozen. Thus, the dynamic picture becomes a still picture and this happens 10 times a second. FIG. 35B illustrates the time segments of a frame grabber set for one second.

FIG. 35C illustrates the dynamic series of picture/images 3501, 3502, 3503 and 3504 of a shuttle launch vehicle on its way to outer space.

FIG. 35D illustrates time set for ⅒th of a second and the first four images captured for processing.

FIG. 35E illustrates the same four images shown in FIG. 35C with time stamps 3505, 3506, 3507 and 3508 applied to them. This process may be fast and occur in near real-time.

FIG. 36 shows a dynamic image security time stamp process. FIG. 36 illustrates one approach to applying time stamps to incoming digital dynamic images. Once marked with an identifier, the image may be recorded thereafter.

Dynamic images are a continuous digital data flow or what is referred to as "streaming media" 3601. The time stamp system intermittently captures specific images from this data flow 3602, 3603 by sending them into a "holding" or "staging area" 3608 within the system's software. The various types of data formats, such as, but not limited to GIF, JPEG, etc. are compatible with the example embodiments.

Simultaneously, the matrix symbol identifier software program system module 3604 may be initiated where the time stamp system affixes one part of the matrix identifier—the data frame 3605 to the target image.

Once the data frame is affixed to the image, the system may begin a pixel analysis in a specific location in relation to the data frame (this process is described in the next section). This pixel analysis of the target image is conducted by the pixel analysis system module 3606 and the resulting data may be held in a buffer until needed. The pixel analysis process makes it more difficult for someone to "Cut and Paste" one identifier onto another picture.

As soon as this process is complete, the time stamp data module 3607 (described herein) may access the time from a reliable source and all data held in the staging area 3608 may be integrated into the matrix symbol 3609 in a binary format that may be simply encoded or for security reasons, encrypted.

An optional human readable string of characters (not shown) that is a key to a specific database file may be associated with and alongside the matrix identifier 3610 in the event that a symbol reader is not readily available.

Now that the image 3611 has been electronically identified with the time stamp identifier two options are available: a) hardcopies 3612 and 3613 and b) where it remains in an electronic form 3614 for future data reference, storage or transmission.

FIG. 37 shows a pixel analysis system and area and the specific arrangement of pixels in a photograph may be unique as a fingerprint. The pixel analysis process makes it more difficult for someone to "Cut and Paste" one identifier onto another picture.

This may be achieved when the software selects a specific area to be analyzed. This could be located anywhere on the front side of the target image and the bottom left hand or right hand areas of an image seem to be the most unobtrusive and unused.

Once the matrix symbol identifier software program system module is initiated, it may affix one part of the matrix identifier—the data frame 3701 to the target image. The following FIGS. 37A-37E are increasing enlargements of a specific area 3702 that may be used for pixel analysis.

Once the data frame is affixed to the image, the system may begin a pixel-by-pixel analysis within a specific predefined location (in relation to the data frame and this process is described in the next section). This pixel analysis of the target image is conducted by the pixel analysis system which analyzes the value of each pixel within the defined pixel analysis area 3702. This area may be either visible or invisible. An invisible pixel analysis area may provide a higher level of security.

In 3703 an area has been enlarged to illustrate the individual pixels and a white series of pixels 3704 is contrasted with values of different adjacent pixels 3705 & 3706.

Figure 38A:
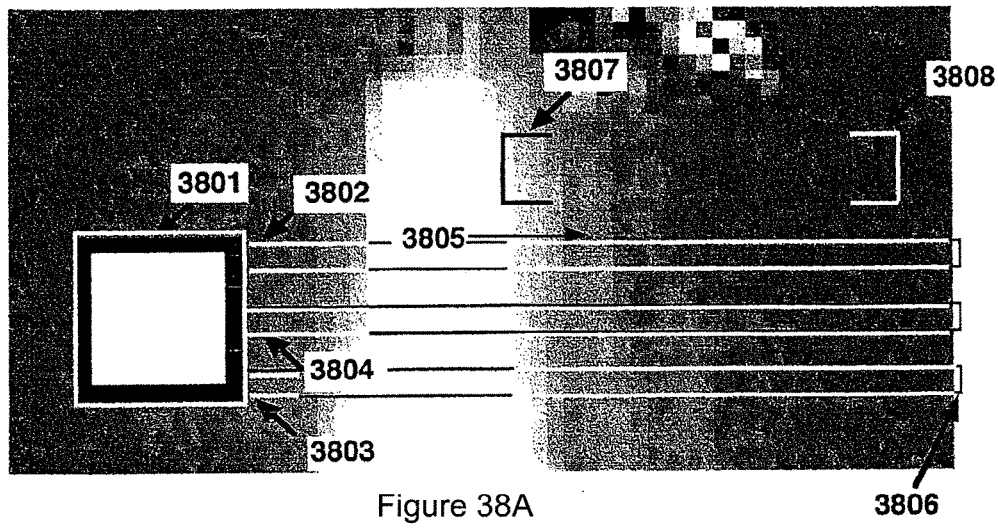
FIGS. 38A-38G show various configurations for pixel analysis data according to example embodiments.

Various configurations for pixel analysis data are shown in FIG. 38A. The matrix data frame 3801 may have multiple functions. The matrix data frame may contain the binary data and may be the base reference point for the Pixel Analysis Area (PAA), such as any predetermined two-dimensional target area 3807 beginning analysis area and 3808 ending analysis area. One or more PAAs may be located with reference to the digital matrix outer frame as the following figures illustrate.

3801 illustrates the enlarged portion of the target image and the digital matrix symbol's data frame. It also illustrates multiple PAAs.

3802 illustrates the PAA beginning and level with the top of the digital matrix symbol's data frame and in the direction of the right side 3805.

3803 illustrates the PAA beginning and level with the bottom of the digital matrix symbol's data frame and in the direction of the right side. The pixel analysis would stop (all zeros/000) when the PAA exceeds the image 3806.

3804 illustrates the PAA beginning in the middle of the digital matrix symbol's data frame and in the direction of the right side.

Figure 38B:
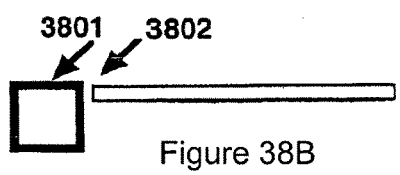
Figure 38E:
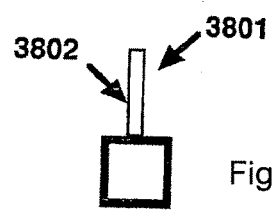
Figure 38C:
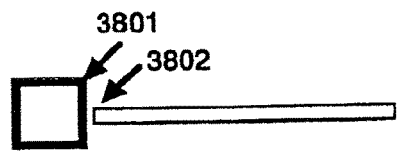

FIG. 38B illustrates the PAA level with the top of the digital matrix symbol's data frame and in the direction of the right side FIG. 38C illustrates the PAA beginning in the middle of the digital matrix symbol's data frame and in the direction of the right side.

Figure 38F:
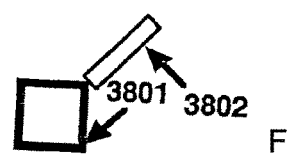
Figure 38D:
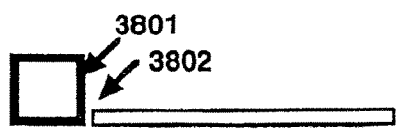

FIG. 38D illustrates the PAA beginning and level with the bottom of the digital matrix symbol's data frame and in the direction of the right side.

FIG. 38E illustrates the PAA beginning vertically to the digital matrix symbol's data frame and in the direction of the topside.

FIG. 38F illustrates the PAA beginning in a 45-degree topside direction to the digital matrix symbol's data frame.

Figure 38G:
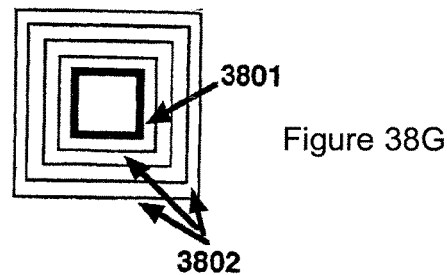

FIG. 38G illustrates the PAA beginning as concentric tracks or "rings" around the outer edges of the digital matrix symbol's data frame.

FIG. 39A illustrates a picture instantly "grabbed" from the many images streaming into the system with a data frame affixed 3901 and the pixel analysis area which may be predetermined in the middle of the data frame 3902.

FIG. 39B illustrates all of the data 3903 integrated into the data frame 3901 and the pixel analysis area which may be predetermined in the middle of the data frame 3902.

FIG. 39C illustrates the finished image that has been identified with a matrix machine-readable symbol while FIG. 39D is a reduced version of FIG. 39C and FIG. 39E is the finished identified image.

Document Applications

As shown in FIG. 40, although a document may be an image if it is scanned in some manner, it is anticipated that most of the documents 4001 processed by the time stamp process and system will be in editable text 4002 form and may include, for example, but not limited to ASCII text, HTML, numeric, Rich Text, Microsoft's WORD, or any other text generation software running under Linux, UNIX, etc.

Classified and High Value Images, Information and Documents

It is anticipated that a vast majority of documents that require time stamping are of a private nature. Such documents may either be documents that an individual deems personal or corporate property. For most applications, the addition of a time stamp identifier is sufficient. However, for more sensitive material, such as classified documents, i.e., Confidential, Secret, etc. a higher level of security may be required.

The data within the time stamp identifier may be, for example, a "one-time pad" encryption scheme or RSA public key encryption scheme.

As shown in FIG. 41, once a document has been marked with a time stamp, 4101, it may be virtually impossible to alter the pixels thereafter as they are unique to this image. In the event that a time stamp has been cut from one document and pasted onto another document, close examination and/or magnification 4104 around the time stamp identifier 4102, the pixels will be misaligned 4103 and this will indicate tampering. The invisible pixel analysis area (and its direction or configuration) will also be misaligned as to color, intensity, value, description, and magnification (size of pixels in the doctored image versus the pasted pixels), etc.

Multiple Pages/Images, etc.

If the user so selects, he may have the option to time stamp each and every page, image, etc. with the same time stamp or a sequential time stamp where some of the main information may be transferred to each subsequent timestamp.

Document Authentication

Documents too are often the subject of alteration. For a time stamp system to be dependable, the contents of a document must also be unalterable. In other words, what was initially registered with this system may not be altered, modified, etc. without it becoming obvious and if the altered document was processed for another time stamp or to be "Reissued" a new totally different and unique time stamp would be created. No two-time stamps may ever be generated as a duplication of another.

Using the techniques described herein it should be virtually impossible to insert, alter, etc. any time stamp secured document.

Method of Authentication: As shown in FIG. 42, authentication may be achieved through the unique shape or "ragged" edge on the opposite side of a document that has been "Left" justified (or "Right justified"). This ragged edge can be compared to a common house key's jagged surface that is unique and will only open a specific lock.

There may be two ways to use the ragged edge. One way includes using the ending space between the margin and the last letter as illustrated in FIG. 42 and the other way includes incorporating the same ragged edge as indicated in FIG. 42 plus selecting one or more of the ending characters from each sentence and encoding it/them into the machine readable symbol.

FIG. 42 illustrates a "Left" justified document 4201 that has printing on it 4202 and an irregular edge 4205. Visually, this edge 4205 most likely may include a white margin surrounding the text. This white margin may be assigned the binary zero ("0") and would generate a field of zeros 4206.

Using the positioning of the text 4201 on the page relative to the paper's edge(s) 4203, 4204 and/or the edge of the typed character's margin as a baseline it may be possible to measure the differing spaces generated by this irregular or ragged shape.

In the computer's software, the text may be defined by a "Return" key command and in a "Justified" configuration, the number of characters are either the same or in close approximation. In a Left/Right configuration, the number of characters between one sentence and another will vary widely.

As shown in FIG. 43, using Lincoln's Gettysburg Address 4301 in a justified configuration, as an example, we have taken the ending letters 4302, characters or punctuation and spaces of each sentence in order and made a data string including the following data string 4303: hd. r tatt, tee. . This is illustrated in FIG. 43 as a darkened ending letter 4304, 4305, 4306 and 4307.

Also a unique sequence may be created using the beginning letter of each sentence including the intra-paragraph spaces 4309.

It is recognized according to the example embodiments that, any predetermined pattern i.e., first letters of each sentence, ending letters, number of characters per document, paragraph, sentence, etc. or the amount of punctuation and/or spaces of every other sentence, parts of the top, sides and bottom letters, etc., every 10th letter, all odd/even words, etc. alternating sides/left/right/top bottom, etc. may be used to specifically identify the uniqueness of a page of and within any document in effect to lock in the uniquely typed or illustrated pattern and information of the original data, i.e. a "fingerprint" of the information.

FIG. 44 illustrates a document 4401 having text 4402 and a time stamp 4403 which may have other forms of data embedded within. Included as part of this data contained within the time stamp identifier 4403, are other forms of unique information that can be used for identification/authentication, such as, but not limited to: Title, Security level, Number of Pages, the page number of the specific page for the time stamp, number of characters, words, sentences, paragraphs, images, etc. (per document and/or per specific page), Each page may have a unique irregular edge, specific starting and/or ending characters, date, time, AM/PM, etc. Note: the above data may also be encrypted using a number of commercially available or custom made encryption techniques including SHA and SHA-1 Secure Hash Algorithm(s).

Secure Hash Algorithm

The code, estimated at $2^{80}$ combinations, is called SHA-1, SHA standing for "secure hash algorithm." It was developed and is endorsed by the US National Security Agency, and is at the core of most Internet security applications. SHA-1 uses mathematical algorithms to turn information, such as a long document or a single short password, into a string of 0s and 1s having a fixed length of 160 bits (a bit is one digit; either a 0 or a 1). The algorithm achieves this by mixing information coming from the document with random bits and then boiling down this mixture to the string of prescribed length. This string, called the digital digest, is like a digital fingerprint of the document and may be used to authenticate documents, passwords and digital signatures.

DxHASH—Discretix HASH Cryptographic Engines

Discretix cryptographic engines are widely deployed in leading system-on-chip solutions. Discretix provides high-quality, ready-to-use cryptographic engines, to support variety of applications. Included in Discretix's family of cryptographic engines are symmetric ciphers, asymmetric ciphers, as well as hash and random number generators.

DxHASH-General Description

Example: The DxHASH cryptographic engines fully support the combinations of the MD5 algorithm and Secure Hash Algorithm (SHA), including SHA-1, SHA-256 and SHA-512. The HASH engines generate a digest for data streams and objects. The HASH engine has two main interfaces for data and configuration. Data is provided through a valid 32-bit input signal and a valid bytes signal. The configuration interface allows the CPU to configure the desired mode, load and offload contexts and read the digest computed by the core. The DxHASH engines are highly configurable to address a wide range of applications.

Time Stamp Systems Integration: Other Devices

The time stamp system example embodiments described herein, are not solely limited to Internet applications and may be used either in tandem with the Internet or other form of network communication or as a self-contained system independent of the Internet. Some examples of various systems may include Infra-communications: Internet communications only, Inter-communication's platforms: Internet to physical distribution (parcel delivery systems) and/or postal systems, LAN, (Local Area Network), WAN, (Wide Area Network), etc, Software Programs and Applications, i.e., Collaboration, Archival, Sortation, etc. In addition, the time stamp embodiments may operate with a variety of software programs, such as, but not limited to: Microsoft Word, Microsoft Excel, Microsoft PowerPoint, WordPerfect, Microsoft Access, Microsoft FoxPro, PageMaker, Illustrator, Freehand, Quark Express, Corel Draw, CAD, Dassault Systems: Catia, Delmia, Simula, Enovia, etc. and many more. Furthermore, time stamp embodiments may operate with software downloading (via disk, Internet or telephone communications) to specific types of devices, such as, but not limited to: Copiers, Shredders, Digital Camera(s), Television Cameras and television sets, Scientific Equipment: seismographs, recorders, etc. Cell Phone/Telephone, FAX (Facsimile), Printer and Photo Printer, Digital picture display, Kitchen with digital information appliances, Magnetic Resonance Imaging (MRI), Medical Equipment: X-ray systems, patient monitors, High-speed cameras, Data Collection Systems, ATMs (Automated Teller Machines for Banks, etc., Lottery Dispensing Machines, Ticket Dispensing Machines, Cash Registers, time clocks, etc. Laser-Engravers, Automated Printing Systems: Ink-jet, etc. Motion Picture Film Generation and/or Development Systems, Video Generation and/or Duplication Systems, Optical Scanning Systems, Software Generation systems, Internet Search Engines, Photographic and/or graphic Storage Systems, Satellite Imagery, Video Phone systems Computer systems, Communications: cell phone, videophones, etc. Scientific instruments, etc.

FIG. 45 shows example operations related to a copier. The application of a time stamp symbol to every individual sheet and of every page of a document that is being copied via a specially modified copy machine, such as, but not limited to: xerographic process, electrostatic processes, etc. may provide document and unit control and/or security systems to be implemented allowing the tracking, tracing, sorting, classifying or controlling every document thereafter. The copier is modified to read and/or add/print/apply a digital time stamp or an attendant system is pre-loaded with time stamps or they may be downloaded via a network on an as-needed basis, reading the time stamp prior to the beginning of any copying process. This copier would interface with a document management and control system.

The digital copier may be linked to a microprocessor-based system that would record specific details, i.e., classification, name or identification (badge, biometrics, etc.) of the individual who copied it, etc. and would be applied to every document that was copied. A camera system would verify each time stamp identifier for accuracy prior to the paper's ejection from the copy machine.

This automated document control system would be applicable in a number of areas such as, embassies, the Pentagon, military facilities, corporate facilities, legal discovery and Bates stamping systems, public copy services i.e., FED EX/Kinko's®, etc.

In FIG. 45 the copier is turned "ON" 4501 and the copier operator 4502 may enter their form of identification, which may be in the form of one or more security/authentication steps such as biometrics or a PIN (Personal Identification Number), a badge number or a password. The system may check for the validity of the operator's identification 4503 and when valid allow a file to be created in the database.

In 4504, a target document may be placed on a scanning plate and the document may be scanned. In 4505, if there is a machine readable symbol present, then an existing database file may be accessed in 4507. In 4505, if there is not a machine readable symbol present, then a new database file may be created in 4506. In 4508, the copier may send its identification information to its database file. In 4509, quantities, orientation and paper size may be set. In 4510, data may be sent to the database and a ready light may be illuminated. In 4511, the copier system may be activated and in 4512, the copier's camera may check for another machine readable symbol. If there is not another machine readable symbol, then the copier may scan the document in 4515. However, if there is another machine readable symbol, then the symbol may be read in 4513 and the symbol position may be determined in 4514 and the copier may scan the document in 4515. The copier may determine the document's characters, sentence and paragraph pattern in 4516 and collect all symbol data and time stamp data in 4517. In 4518, the database software may create a unique machine readable symbol. In 4519, the time stamp may be applied to the image and copies may then be produced by the copier.

The example embodiments may be applicable to a shredder. As mentioned above, with the application of a time stamp identifier to every individual sheet and of every page of a document that is copied within an enterprise on a specially modified copy machine such as, but not limited to xerographic process, electrostatic processes, etc. would enable new forms of document control systems to be implemented as each time stamp identifier carries specific information pertaining to a specific document. This data may enter a database at each stage of an operation involving the movement of documents i.e., those entering or leaving a facility or department, the security classification, individuals involved, etc.

Conversely, when a document is scheduled for destruction a specifically modified shredder fitted with an enclosed camera system to scan/read the time stamp symbol previously affixed to each document, may communicate this information to a database and receiving electronic digital authorization from preset criteria prior to initiating the shredding process. This too, would be linked to a microprocessor system that would record specific details, i.e., classification, individual who shredded it, etc. of every document that was shredded. A camera system with the appropriate software would verify each time stamp identifier for accuracy/readability prior to the paper's ejection from the machine.

The shredder is modified to read and/or add/print/apply a digital time stamp or an attendant system is pre-loaded with time stamps or the time stamps may be downloaded via a network on an as-needed basis. Time stamps may then be read prior to the beginning of any shredding process. The shredder would interface with a document management and control system.

In 4601, a shredder may be turned on. In 4602, an employee may provide biometric information, a password and a personal identification number (PIN). In 4603, if the password is determined to be valid, then the shredder's camera may check for a machine readable symbol in 4604. However, if the password is not valid, the password may be re-requested in 4602. In 4605, the shredder may scan and read a machine readable symbol. In 4606, if there is a machine readable symbol, then the system may check to see if there is database authorization to destroy. The symbol may be read in 4609 and if there is database authorization to destroy in 4610 then in 4611, the shredding system may be activated. The database may then be updated in 4612. In 4607, if there is not authorization to destroy, then the shredder system may be turned off in 4608 and a warning may be activated.

As shown in FIG. 47, oftentimes, a series of pictures taken at a disaster, an act of war as in 47A, i.e., the destruction of the Twin Towers in New York City, on September 11, a specific battle, or even a family gathering as in 47B may need to be identified. The example embodiments provide an independent and automatic time stamp identifier 4705 of every picture in a camera or in a video camera application every frame is identified in 47C and 47D using wireless communications 4704 i.e., the Internet, emanating from the camera's 4703 antenna. There are three examples of how time stamping features may be applicable to devices such as, but not limited to digital cameras.

First, the digital camera may have internal hardware and software which enables the camera 4701 to electronically and wirelessly 4703 and 4704 access the nearest telephone communications network and through the telecommunications network, to the Internet and the Internet would, in turn, link into the time stamp system where the Time Stamp Identifier Process is initiated. The time stamp process may determine the time/date and send such back to the camera in effect reversing the communications process, i.e., Internet to the wireless communications network and back into the camera where the time stamp identifier is added to each frame, thereafter as long as the communications links are uninterrupted.

Second, the camera 4701 and 4702 may generate or access 4703 either the Internet or from the signal 4704 to or from a broadcast, such as the signal that the Naval Observatory emits, or in the event of a news videographer/photographer, as shown in FIGS. 48 and 49 the time/date data may be broadcast to the camera 4801 from the station itself 4802. FIGS. 48 and 49 the time date/data may be broadcast via a communication network from or to the camera 4802, 4803. The station may relay 4802 the request to the time stamp provider 4907 which accesses the correct time from a reliable time standard source 4908 and 4909 The process may be reversed and communicated wirelessly 4912 to the camera that takes this returning data and creates the time stamp identifier symbol internally, without a constant flow of information generated from the Internet, and applies the time stamp identifier to each image (4913 & 4914/enlarged view). In FIG. 49, the camera 4901 is shown displaying 4902 a normal unstamped picture of the target subject and displays the same camera 4901 with a time stamp identifier 4913 appended to the image data and may appear in the identifier's enlarged view 4914. The camera's antenna 4903 transmits data 4904 to the broadcasting station 4905 which accesses 4906 the machine readable identifier generating unit 4907 which communicates 4908 with the trusted time generating source 4909 in-turn sending the current time/date data 4910 back into the machine readable identifier generating unit 4907 that integrates the time/date data into the machine readable identifier generating unit creating the machine readable identifier which is transmitted via a communication link 4911 back to the broadcasting station 4905 and communicates via a communication network 4912 the completed identifier/message to the camera 4901.

Furthermore, the camera may retrieve GPS directional information such as north, south, east, and west which indicates which direction the camera was facing when the photograph was taken, and may be used to derive temperature data of the air or water (in the case that the photograph was taken underwater).

Third, the camera may not be able to readily access the telecommunications network, the Internet and/or the time stamp system because the camera may be in an inaccessible location, such as: airborne, i.e., helmet mounted (FIG. 50A), on mountain top, underwater (FIG. 50B), in a remote location, i.e., oil exploration, down inside mine shafts, tunnels, archeological digs, etc. or even out in space as a robotic satellite or manned vehicle or space station.

Thus, the example embodiments may be applicable to remote security cameras (FIG. 50C), that would use a generated timestamp as an independent third-party source that would continuously add timestamps to incoming images from the following examples: security cameras in casinos or other gaming areas, prisons, parking areas, bank ATMs, police stations, military outposts, etc.

Pre-Loaded Time Stamps

It is possible for the time stamp process to be a self-contained system onboard the camera and which produces a time stamp matrix symbol, for each frame or image exposed. The camera may also be pre-loaded with a range of time stamp identifiers and may access the internet to generate a starting time sequence that begins when the camera is activated and the pre-loaded time stamps are then used in sequence with the time/date being added as they are used/accessed. In this manner, the camera may not have to be in direct contact with the Internet, broadcast, etc. other then at the initial starting point.

Underwater Camera(s)

The example embodiments may apply a time stamp sequence in order to record various events, such as, underwater rescue, exploration, documentary, military operations, etc. However, water does not allow the penetration of radio waves or other forms of communication except sonar. It may be possible to use either Pre-loaded time stamps or sonar communication time stamps. Before being submerged and while still at the surface, an underwater camera may be pre-loaded and/or synchronized with time stamp identifiers ready for use.

Audio Time Stamps

Time stamps may also be integrated with various audio tones for generating and/or updating purposes as shown in FIG. 51. These may be configured to represent the same binary tones as used in the telephone system or they may be assigned any musical note(s).

There are numerous applications for the example embodiments. The following are non-limiting examples: Archival Management Systems, Asset Management, Bates Numbering of documents, Cash Dispensing Management, Cell Phone Systems, Collateral Material Management, Collaboration Management, Computer Operating Systems, Computerized Marking/Etching/Engraving Systems, Communications Management, Configuration Management, Contract Management, Copier Machine Systems, Data Archival Management, Data Storage Management, Digital Media Management & Editing, Distribution Management, Document Management, Employee Management, Fax Machines, "Freshness" Management, Graphic Management, Human Resources Management, Identification Management, Identity Management, Image Management, Internet related embodiments such as Audio Management, e-mail Management, File Management, Graphic Image Management, Fulfillment Management, Text Management, Legal embodiments such as Work product tracking, License Management, Logistic Management, Lottery Management, Mail related embodiments such as Merging, sorting, Manufacturing management, Accounting Management, Configuration Management, Customer Management, Engineering Management, Inventory Management, Just-in-time (JIT), Maintenance Management, Product Recall Management, Raw Material, Repair Management, Sales Management, Safety Management, Scheduling systems, Time Management, Tool Configuration Management, Vendor management, Visitor Management, Map Management, Medical related embodiments such as Dosage Management Hospital Management, Instrument Management, Insurance Management, Medical Claims Management, Medical Imaging Management, Patient Records Management, Pharmaceuticals Management, Prosthetics Management, X-rays Management, Productivity Management, Purchasing Management, Quality Control/Quality Assurance Management, Remuneration Processing Control and Management, Research & Development Management, Repair Management Systems, Satellite Communications, Scheduling, Security Management, Service Management Systems Statistical Process Control (SPC), Telephone, Television/Computerized Television, Text Management, Time clock/time & Attendance, Unit control, Video Management, voting related embodiments such as Voter tabulation, Ballot casting, Ballot processing, etc., Web Site (Internet), Wireless and Workforce Management.

GPS (Global Positioning System

It is recognized that many field applications require the location of a camera that may be taking specific pictures. GPS data may also be incorporated into the time stamp identifier for verification that the images have not been tampered with.

Corporate Time Stamp Decisions

Oftentimes, the economic conditions, and the background of international events are lost or at least difficult to readily locate which may provide the background information for specific corporate decisions, resolutions, etc. along with the reason for such decisions. By time stamping such decisions along with the various factors underlying the decision(s), the subsequent management or shareholders will have a better understanding as to the sequence of events.

Historical and/or corporate decisions made by a company may be automatically mated with physical events so that the context and other events that may be present can be related as reasons for or background for corporate decisions. This may be helpful in the legal process, for example, but not limited to: Stock and Futures markets, Price of commodities, Price of steel, raw materials, Government actions—Hostilities, Economy and economic indicators, import/export, New laws, rules, regulations, etc., Acts of God, Unemployment figures, Cost of real estate (per sq. foot, etc.).

Stenographic Systems/Manual

Documents produced by a court stenographer, for example, may be time stamped so that all documents may be manually or automatically identified using the Internet and as explained herein earlier by the automated stenographic software.

Automated Stenographer Systems

Automated stenographer systems are systems designed to convert the spoken word into text and where it is automatically captured, recorded and converted into printable text using either alpha/numeric or graphic characters, such as, but not limited to the Chinese alphabet. The automated stenographic software may manually or automatically activate time stamped documents.

Digital "Chops"

As shown in FIG. 52, a Chinese seal or "Chop" is a seal or stamp containing Chinese characters typically used in East Asia to prove identity on documents, contracts, art, or similar items where authorship is considered important.

Chinese "Chops" are hand-made carvings that Chinese artists use to sign their works of art/work product. There are official chops for government approval, there are chops for names, "free" chops that are not associated with any specific topic and "Studio" chops that carry the name of the person's private studio or business.

Chinese seals are typically made of stone, sometimes of wood, and are typically used with red ink or cinnabar paste. The word 13A ("yin") specifically refers to the imprint created by the seal. The colloquial name "chop", when referring to these kinds of seals, was adapted from the Malay word cap during the colonization of the Straits Settlements, and is still used to refer to rubber stamps.

Digital Chops

As shown in FIG. 53, the example embodiments link the ancient use of "chops" 5301 with the digital application of Time Stamp identifiers 5303 & 5305 where the application of a chop to a document, for example, is also associated to a specific individual, time, date and subject matter as described herein earlier. The ancient practice of using a "chop" along with a digital time stamp identifier may be grouped within a larger geometric shape 5302 for ease of location, association, grouping and order.

Time Stamp Systems: Data Services

The time stamp example embodiments described herein, are not solely limited to Internet applications and devices and may be used in the following examples: Data storage, Data retrieval, Chronological sorting.

Data Storage

As an example, the time stamp identifier may be used to organize all documents or blocks of data by chronological order.

Data Retrieval

As an example, the time stamp identifier may be used to retrieve documents or blocks of data by specific time, date, etc. or chronological order.

Chronological Sorting

As an example, the rapid scanning of objects that have been digitally time stamped allows for sortation by chronological order.

Time Stamp Systems: Control Services Clip Art Rental

The Internet offers creative people, such as artists, web site designers, etc. control over their work-product such as: artwork, illustrations, photographs, etc. for sale or for limited period usage. Example embodiments may identify the illegal or extended use of a work-product as herein described that is used, offered or displayed on the Internet. The example embodiments provide protection in addition to copyright for the creator.

Time Stamp Systems: Limited Usage Applications

Time stamp identifiers may be assigned, allocated, reallocated, deleted, canceled but not edited. According to the example embodiments, it is not possible to change the data within a time stamp identifier. Time stamp identifiers may be used only once and then new ones may be created with a new time and/or date encoded or encrypted within the machine-readable identifier.

Time stamp identifiers may be distributed in blocks, purchased on an annual contract or purchased individually for one time use. Time stamp identifiers may be distributed over any electronic communication system as well as through manual distribution systems such as the post office.

Time stamp identifiers may be designed so as they are "time sensitive" i.e., they expire after a specific time, date, transaction or event.

Time Stamp Systems: Component Identification Systems

Many components and products are time sensitive. Some become outdated, others stale (foodstuffs, pharmaceuticals, etc.) and pharmaceuticals, also become less effective as they age.

Time stamp identifiers may solve this problem automatically. Unlike batch or lot identification systems that are fixed or static in time and date, the use of a time stamp identifier, along with other data, can make the identification of packaging, products, perishables, objects manufactured in different locations/time zones, an automatic process.

Medical Applications

As shown in FIG. 54, time stamp identifiers 5401 may be very helpful when used in various medical applications ranging from the time stamp identification of medical charts, i.e., EKG, 5402 & 5403 surgical Instruments and supplies, "stale-date" identification, dispensing and dosage for pharmaceutical control systems (8), identification of medical records 5405 (file folders 5404, documents, correspondence, Insurance, etc.) Patient Management and Accounting, scheduling, physician collaboration, x-ray identification 5410 and verification, test tube 5407 and lab sample identification and even down to the level of pills 5408 for dosage control, etc. Electronic Medical Records 5406 & 5409 and the prevention of medical record theft, switched identities, etc.

Medical applications that use film such as x-rays or MRI devices that use computer and monitors to display their images may automatically identify the negatives as well as the positive film prints using time stamp identifiers. The example embodiments may be applicable, but not limited to cataloging, image management, image coordination for collaboration purposes, automated sorting, collation, etc.

Further example embodiments may be related to collaboration accuracy which may be supported by the use of time stamp verification. For instance, 5411 illustrates a photograph of a physician viewing a patient's first x-ray 5412 and a patient's second x-ray 5413. Each of the first and second x-rays has associated data which is shown respectively as 5414 and 5419. Furthermore, this data may be stored within a time stamp. Patient's first x-ray 5412 is shown having a time stamp 5415 in the bottom left corner and may be referred to as 1234ABC 5416. Additionally, patient's second x-ray 5413 is shown having a time stamp 5418 in the bottom left corner and may be referred to as 987XYZ 5417.

FIG. 55AA illustrates an X-ray 5502 with the time stamp identifier in "film negative" form 5501 or in "film positive" form 5503. Time stamp identifier 5504 illustrates additional information as shown in FIG. 55B. The same information may be coordinated with subsequent reports, medical records, 5505 etc.

Magnetic Resonance Imaging (MRI) may be primarily used in medical imaging to visualize the structure and function of the body. MRI provides detailed images of the body in any plane. MRI has much greater soft tissue contrast than computed tomography (CT).

FIG. 56A illustrates a MRI image without time stamp identifier identification. FIG. 56B shows a time stamp identifier 5602 applied to (or is part of) the MRI image 5601 denoting the date and time as well as other patient information.

Security Applications

There are many problems that may occur during the casting of ballots. As an example, the ballots may be illegally duplicated, altered or changed in some manner contrary to the vote that the voter has originally cast. A paper trail must be created for auditing purposes.

Time Stamp Identifiers for Voter Registration and Ballot Tabulation/Verification.

As shown in FIG. 57, voter ballots 5701 and 5704 may be time stamped 5702 & 5703 with a secure time stamp identifier to provide additional and independent verification for paper audit trail and vote tabulation purposes. A sample ballot is shown having time stamps thereon. For instance, the ballot may have ballot/mfg information time stamp 5705 which may include information related to a consecutive number, a ballot form number or a client number, a scatter pattern area 5706 and a voting information time stamp 5707 which may include information related to a date of ballot, polling location and voter booth/machine.

Ballot Identification: Time Stamp Identifiers

The identification of each ballot cast with a time stamp identifier that has been independently generated by a third-party system may prevent the alteration of the physical ballot. This may be possible by comparing the original time the ballot was cast and electrically scanned and verification may be electronically initiated.

Corporate Time Stamp Identifiers

As shown in FIG. 58, corporations 5802 may purchase blocks of potential time stamps identifiers 5801 for usage throughout their company 5803, their divisions, branch offices and other worldwide facilities. FIG. 58A illustrates example use of a time stamp, FIG. 58B illustrates a technology company, FIG. 58C illustrates an entertainment company, FIG. 58D illustrates a federal government agency while FIG. 58E illustrates a manufacturing company.

Instant Identifier

The example embodiments may also be preprogrammed to accommodate future events. As an example, the example embodiments may be used for security at a casino. Once the example system is installed, should a suspect be observed cheating at gambling, an authorized security employee upon selecting the proper monitor may simply push some computer keys and instantly a time stamp identifier may be generated and appended onto the image(s) on the monitor by using a security room as shown in FIG. 59.

This independent third-party "notarization" would be of value in a court prosecution of the individual(s) caught cheating the casino.

There are many other security related applications for the example embodiments such as, but not limited to control rooms, i.e., nuclear facilities, Space Shuttle launches, power generation facilities, etc.

Clock Variations

Numerous variations of the type(s) of clocks that can be visually and/or audibly displayed on a user's monitor(s) to represent various forms of time that is used for time stamp identifiers as shown in FIG. 60.

For example, FIG. 60 illustrates dials, a corporate logo, sports logos, a world time chart, a complex watch, multiple dials within the dials, a digital/numeric clock, a standard clock, an alphanumeric clock and a binary clock. Other variations (not shown) are: sand dials, sundials, water clocks, 24 hour clocks and multiple clocks displaying different time zones, etc.

Security Time Stamp Embodiment(s)

One of the major problems when sending e-mails may include inadvertently sending important or perhaps classified information to the wrong person, either by human error or by a mis-direction of the e-mail by the Internet system itself. This may result in great financial hardships, for example, when a corporate takeover, buyout or financing is in the works, communications must be kept secret from prying eyes. To somewhat reduce the actions of the "unintended/unauthorized" recipient, many firms, particularly those in the legal profession, add a "Legal Notice" to the bottom of every e-mail that is sent from them or in behalf of their firm. Although a Legal Notice does give some minimal warning to those recipients that they "should not act upon the information" contained within the e-mail, it may not stop someone from acting upon the errant e-mail letter's information for their own personal gain. The information contained in the e-mail is open for all to see, copy, retransmit, etc.

FIG. 61 illustrates one such typical "Legal Notice" placed within an e-mail correspondence as a warning to unauthorized recipients.

It is a goal to hide the confidential and/or classified information from prying eyes but yet allow sending of e-mail communications to the intended recipient.

Security Time Stamps

The following discusses example embodiments of "Security Time Stamps" or depending upon the various electronic devices the user employs, such as "Touch Code" if a microprocessor that uses a touch screen, Tap Code if it is an iPhone or Click Code (if it is a PC/Personal Computer).

The above discussed time stamps, previously described herein, are time stamps that are unidirectional because they are generated and applied to an object or item for purposes of time determination. They move from the time stamp service to the user i.e. in one direction.

Security Time Stamps may be bi-directional, tri-directional or even multi-directional and are unlike the time stamps previously mentioned, because they are time stamps that have a network/Internet link to other software-driven functions and data located on other subsequent Internet screens.

Security Time Stamps may be overtly (can be copied or photographed if a hardcopy is made) or covertly placed (where no copy or image of the time stamp symbol can be made on an office copier I.e., xerography or camera image) for security reasons. The example embodiments discuss covert placement of security time stamps.

When an e-mail is received, should a user want to access these covert screen(s), they may just "touch" or pass a cursor over the time stamp, which activates the time stamp, and with a simple "click" of the computer "mouse" or other cursor activated means (such as a finger on an iPhone or PDA, or a stylus, etc.) a hidden window may appear that requires a password that has previously been issued or communicated to the intended recipient of the e-mail to be generated, which may then be verified and accepted before any of the covert screen(s) are allowed to appear. The system may allow for any number of subsequent security screens to be accessed.

As previously described, time stamps may be purchased by a user. The user 6201 may purchase unique time stamps 6203 for the identification of an item, object or transaction via a network such as, but not limited to the Internet 6202. This is visually shown in FIG. 62.

Security Time Stamps

Time stamps as well as security time stamps are time stamps, and in addition to providing basic notary functions as previously described herein, may be designed to protect information as well as other forms of classified information with an emphasis on e-mails and other forms of electronic transmission over networks, such as the Internet, Military Data Networks, ARPANET, Commercial Networks, etc.

It is notable that time stamps are compatible with Electronic Data Interchange (EDI). EDI refers to the structured transmission of data between organizations by electronic means. EDI is used to transfer electronic documents from one computer system to another, i.e. from one trading partner to another trading partner. EDI is more than mere E-mail; for instance, organizations might replace bills of lading and even checks with appropriate EDI messages. EDI also refers specifically to a family of standards, including the X12 series. However, EDI also exhibits its pre-Internet roots, and the standards tend to focus on ASCII (American Standard Code for Information Interchange)-formatted single messages rather than the whole sequence of conditions and exchanges that make up an inter-organization business process. The various example embodiments of time stamps are compatible with EDI data transmissions.

Time stamps may be grouped into the following functional categories: Unifunctional, Tri-functional, Quad-functional and Multi-functional.

Uni-Functional Time Stamps

FIG. 63A illustrates a user requesting and receiving a uni-functional time stamp 6301, i.e. for notary purposes. For all security time stamps, a special feature may be included where a related message erases itself after either a set quantity of viewing periods (1, 2, 3 etc.) or may be locked preventing future exposure.

Tri-Functional Security Time Stamps

FIG. 63B illustrates a user requesting and receiving a tri-functional time stamp 6302. The time stamp may manage the covert pages and provide a return notification to the sender that covert pages have been read.

Tri-functional time stamps may include the sender, the recipient and a notification back to the sender that the recipient of the e-mail has received it, activated the time stamp and has looked at the confidential information contained in the covert e-mail.

Quad-Functional Security Time Stamps

FIG. 63C illustrates a user requesting and receiving a quad-functional time stamp 6303 and the time stamp may manage covert pages and provides a return notification to the sender that covert pages have been read. Multiple notifications are also issued to other authorized parties.

Multi-Functional Security TIME Stamps

FIG. 63D illustrates a user requesting and receiving a multi-functional time stamp 6304 and the time stamp manages the covert pages and provides a return notification to multiple recipient(s) as well as the sender. The notification indicates that the covert pages have been properly accessed with the proper password(s) or public key, etc., and read.

Multiple notifications may also be sent to other authorized parties, database(s) and GPS (Global Positioning System), providing location as well as the electronic device's identification.

Elements of an E-Mail

Elements of the Correspondence, i.e., e-mail

FIG. 64 illustrates an example e-mail 6401 (it may be any form of written communication, such as a hardcopy letter, a document, a fax, a text message, etc.) that appears on an electronic screen such as a computer, a laptop, a cell phone, a PDA, etc. The text of the message 6402 may be followed by the closing salutation.

In one area, i.e., under the Complimentary Closing and Signature Block, a Security Time Stamp 6403 may be affixed at the time that the computer-printed, letter, Text Message, etc. is generated. The "Legal Notice" may be shown at the end of the e-mail 6404.

There are various options for receiving the time stamp, for example: a sender may be an employee and the company they work for may have a "draw-down" account based upon an annual contract and a specified quantity. This is an automatic process where the employee sender may simply click on an icon, for example, and the time stamp may be automatically generated and placed at the end of the e-Mail's text and electronically deducted from the total.

As another option, a single time stamp may be purchased for one time use. Both of these example embodiments are described herein.

Contents of an e-mail with the Security Time Stamp

FIG. 65 illustrates an e-mail 6503 (it may be any form of written communication, such as a hardcopy letter, a document, a fax, a text message, etc.) that appears on an electronic screen such as a computer, a laptop, a cell phone, a PDA, etc. The text of the message 6502 may be followed by the closing.

In one area, i.e., under the Complimentary Closing and Signature Block 6504, a Security Time Stamp 6501 may have the capacity to contain all or portions 6506 of the following information: Time, Date, Telephone Number, Picture, Signature (for authorization or comparison purposes), A Key to another database file, RSA Public Key encryption key to a Covert file, Biometric Identifiers, Validation software, etc, Key to a financial account, and Encryption/Decryption Key(s).

When a recipient receives the e-mail the e-mail may be related to a mundane topic such as meeting for lunch, a golf game, etc. However, the Security timestamp 6501 (which is described in detail later in this section) may be an indicator that a covert message is attached on one or more hidden screens. (Note: this may also be an icon located inside the Header of the e-mail).

When the recipient of the e-mail "clicks" 6505 on the Security Time Stamp it may immediately open a password verification screen 6506 requesting the recipient to provide specific information before displaying the covert screens containing confidential or classified information 6507 such as: a process, a purchase number order, other software, transaction information, encryption/decryption keys, private communication, etc.

The telephone number for a private callback and a double click, for example, may automatically access a callback telephone directly from the e-mail.

The password screen and/or the confidential information screen(s) may contain a plurality of buttons 6508 that provide other functions 6509 once the password has been properly verified as being valid.

Data Structure

FIG. 66A illustrates a comparison between a regular notary time stamp 6601 appearing on a computer screen for example, and the Security Time Stamps 6602.

FIG. 66B is a side view of the regular time stamp symbol 6601 illustrating a concept (note that the actual time stamp would appear in this manner) and the time stamp, has no connection to data other than the data that it contains within itself, while in FIG. 66D the side view of the Security Time Stamp symbol 6602 appearing on a computer screen 6603 for example, has a plurality of other links or screens that provide additional information or confidential/classified information 6604, 6605, 6606, 6607 that becomes available when the password request window 6608 has had the proper password entered, verified and accepted. Then the subsequent screens 6604, 6605, 6606, 6607 become visible.

As shown in FIG. 66C, a blue line 6609 under the security time stamps symbol may indicate that this is an active link. Other forms of icons may be used to indicate that the time stamp is a security time stamp, i.e., a "lock", "word(s)", etc.

The Security Time Stamps could also be displayed/printed in a different color other than black and white, i.e., a red/white Security Time Stamp.

Selective Decoding

FIG. 67 illustrates a security time stamp for selective display of specific data. FIG. 67A illustrates example embodiments where outside of the time stamp symbol 6701 itself on one or more sides, there may be a plurality of "buttons" 6702 that link to specific functions 6703 allowing the user to select a "menu" of specific functions at the click of the target buttons. FIG. 67B illustrates an enlarged graphic of a button where when the cursor 6704 passes over the button, and a flag 6705 or some other notification may become visible.

FIG. 68 shows a sequence of accessing the covert screens from the security time stamp. According to FIG. 68, the amount of variable tries may be predetermined before stopping the process. Further, this could be set to erase, lock, scramble, re-encrypt or prohibit the information contained in the message from being visible or read FIG. 68 shows a cursor 6802 passing over a time stamp symbol 6801. The cursor 6802 may be used to click 6803 on the symbol 6801. This causes a request for entry of a PIN number in 6804. The user may then enter the PIN in 6805. In 6806, the system may verify the PIN with a pre-enrolled PIN number. In 6807, it may be determined whether the entered PIN number matches the pre-enrolled PIN number. If the entered number does not match the pre-enrolled PIN number 6808, then in 6809 the user may be allowed to reenter the PIN number a pre-determined number of times, for example, 4 attempts and if the PIN does match with the pre-enrolled PIN 6807 the access is granted 6810 and they are allowed access 6811 to the covert information or data. However, if the entered PIN number matches the pre-enrolled PIN number, then the user may be allowed access to covert screens, files, documents, bank accounts, special processes, transactions, communications, notary information, legal information, etc.

FIG. 69A illustrates a normal e-mail correspondence 6901 that anyone in the office may see (the "public message") with the body of the text 6902 containing the message and the Security Time Stamp (in black) 6903. The recipient of the e-mail may place their cursor 6904 on top of the Security Time Stamp, and the blue line 6905 may indicate that it is a link to another screen(s). The user may "click" their mouse, or other form of user computer interface device, such as a finger on a touch screen. This action may activate the blue rectangular box or "window" (or other similar design) 6906, FIG. 69B illustrates where the recipient may enter a prearranged or pre-registered password or a "Public Key" data sequence such as RSA Public Key scheme. This password may be validated and if the password agrees with the prearranged or pre-registered password the covert screen containing the covert message may then be displayed as shown in FIG. 69C. The level of security classification may also be indicated 6907.

FIG. 70 depicts an example view of a plastic card 7001 used for access to the covert screens. The card's magnetic stripe 7009 located on the backside 7008 of the plastic card may provide key data when it is "swiped" through a magnetic swipe reader (not shown). On the front side of the card 7001 other biological information may be included such as, but not limited to, a photograph 7002, corporate identification 7006, employee's name 7003, identification number 7005, vital statistics (hair/eye color, height, etc.) 7007 and a high data density timestamp 7004 that may be read by an electro-optical reader (not shown).

The Pre-Registration Process

As an example, it may be possible to pre-register or enroll a target individual and their associated biological identification characteristics 7101. As shown in FIG. 71, this may include storing vital statistics including a level of access to various security levels 7102, using a fingerprint 7103 and some form of fingerprint—reader device 7104 whereby such information is printed onto a plastic identification card as a high data density machine-readable time stamp 7106. All of this data may reside on a storage within the portable plastic card as well as in a data file 7105.

When the intended recipient receives an e-mail, for example 7107, he may notice the Security Time Stamp at the bottom of the message 7109 with its blue link line indicator, for example, and clicking on the security time stamp may result in displaying a "window" 7110.

(Note: Up to this point, if the e-mail was misdirected for any reason anyone may read the contents of the e-mail).

The intended recipient may enter a password(s) via a keyboard in the window 7108 & 7110, the system checks the data file for validation 7111 using a network communication system, such as the Internet, (not shown) and if the password is validated, the covert screen may appear with its covert message 7114.

If the password(s) is not validated, the covert screens may not appear to the viewer. The system may be set to allow any number of password attempts and to allow a desired level of security If the user has access to an identification card 7112 it may be scanned into a card/badge reader. If the user has access to a plastic card reader 7113, either a magnetic swipe reader or an electro-optical card/badge reader, the access to the covert screen(s) 7114 procedure would be the same.

How a Voice/Text Message Maybe Used to Provide a One-Time, Instant Password for Access to a Covert E-Mail Verbal instruction as well as Text Messaging may be used, for example, as a means to notify the recipient of a new password that would open a new set of covert e-mail screens. As illustrated in FIG. 72, Party A 7201 may send Text Message (or voice message) communications 7203 via a cell phone 7202 to Party B 7207 a Text Message 7204 with a password (this would not mean anything to anyone that intercepted it). Party B 7207 may receive the cell phone communication 7205 & 7206, read the Text message, access their e-Mail account and open the e-mail from Party A 7209 which may read, for example, "Great golf game we need to do this again sometime." To anyone reading the e-mail would appear to be just a friendly message about an event they shared over the weekend!

Party B may click on the Security Time stamp and then enters the Text Message Password 7208 in the open window 7210 & 7211, which when validated opens one or more covert screens 7212. If the password is not validated then the covert screens containing the sensitive message would not be displayed. The system may also be set up so that after a preset number (such as two) of failed password attempts, the covert screens would either be locked or erased.

Top Secret Time Stamps

Various levels of security, i.e., Top Secret Eyes Only etc. might also use another time stamp example embodiment where the time stamp may become the entire letter or message. Thus, someone who is not initiated into the encoding or encryption scheme may not read the classified material. Such a message may be sent openly without fear of someone compromising the message's security The reading of the message may be done using an "intelligent/smart" reading device capable of reading the time stamp symbol, accessing the proper decryption key(s) decrypting the message and revealing the message's readable contents.

Figure 73A:
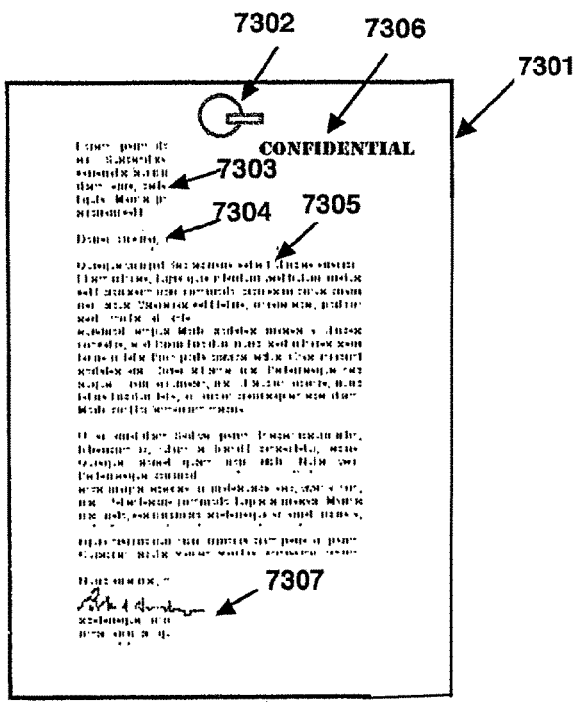
FIGS. 73A-73B illustrate usage of one-time pad security time stamps according to example embodiments; C1

FIG. 73A illustrates a normal hard copy 7301 correspondence, i.e., a human-readable letter (representing any form of correspondence, such as, but not limited to: hardcopies, electronic copies, facsimile (FAX), TEXT Message) with a company logo 7302, the address/salutation block 7303, the greeting 7304, the body of the letter 7305, the level of security 7306 and the closing/signature block 7307. This letter may be open to anyone that has either authorized or unauthorized access to it.

Figure 73B:
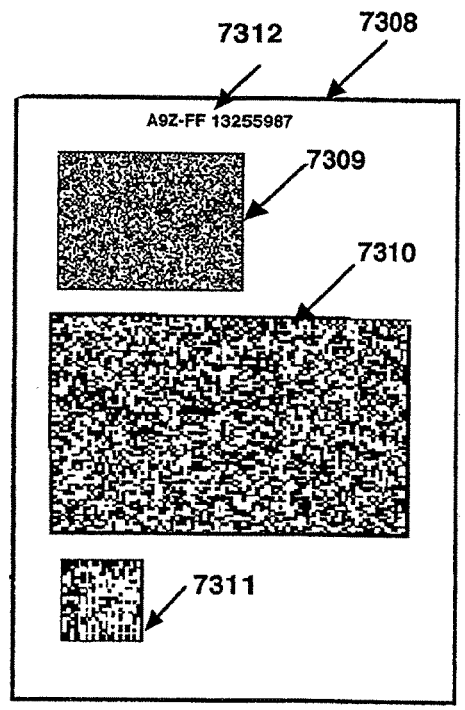

FIG. 73B illustrates the same letter as 7301, but in a human non-readable, but machine readable format 7308. FIG. 73B illustrates a security time stamp 7309, 7310 and 7311 that includes ALL of the information of the letter in FIG. 73A. The data within the Security Time Stamp 7309, 7310 & 7311 may be encoded or encrypted and may be unreadable by a human that may have access to it unless able to decode or decrypt its contents. A code may be used to identify the letter 7312. Although the e-mail (facsimile, letter, photograph, etc.) may still be copied, i.e., on an office copier or a photograph taken, the information content would be unreadable unless there is access to the decryption key(s). To decode the information, it would be scanned by an application-dependent electro-optical scanner using the appropriate machine-readable software.

Symbol Comparison Chart

FIG. 73C is Table 2, which provides a comparison between example embodiments including regular time stamps, notary time stamps, security time stamps and selective time stamps.

Virtual Systems and Cloud Computing Systems

All of these example timestamp embodiments may function in the analog or digital domains including virtual microprocessor-based machines and devices incorporating virtual software and systems as well as "cloud" computing configurations. If the electronic device is digital in its basic components and includes software, etc., it may be compatible with the various time stamp example embodiments described herein.

Computing and Information Technology: Virtual Machine/Virtualization

One of the advantages of the time stamp example embodiments is that official time generated by the U.S. Naval Observatory may be used for the generation of notary purposes/applications as well as a virtual system for the generation of time stamps. Another example embodiment includes a virtual machine. A virtual machine was originally defined, by Popek and Goldberg as "an efficient, isolated duplicate of a real machine." Current use includes virtual machines that have no direct correspondence to any real hardware. Virtual machines may be separated into two major categories, based on their use and degree of correspondence to any real machine: (1) A system virtual machine may provide a complete system platform, which supports the execution of a complete operating system (OS). In contrast, (2) a process virtual machine is designed to run a single program, which means that it supports a single process. An essential characteristic of a virtual machine is that the software running inside is limited to the resources and abstractions provided by the virtual machine—it can not break out of its virtual world Sports Time Stamp Application According to further example embodiments, a time stamp may be used to verify the accuracy of sports clocks measuring a runner, a swimmer, a horse, etc. lapsed race time. Example embodiments may include parallel use of a sport clock(s) linked in tandem with a time stamp generation system to check on the accuracy of the sports clock. This would prevent any chance of anyone tampering with the time clock or clocks measuring the sports event.

FIG. 74 shows how time stamps may be used to validate a sports clock. In 7401, an event start activation may occur in a sports clock. In 7402, this event may be sent via a network to a time stamp system. The time stamp system is started in 7403 may request an official time in 7404. A total elapsed time may be transmitted by the when an event stop 7406 occurs in the time stamp system. This event stop may be transmitted via a network from the time stamp system to the sports clock. In 7405, the elapsed time calculated by the time stamp system may be compared with the elapsed time calculated by the sports clock. In 7407, the time stamp system may generate a time stamp and transmit the time stamp to the sports clock. In 7408, if the elapsed times agree, then the elapsed time calculated by the sports clock may be validated in 7409. If the elapsed times do not agree, then an inquiry may occur.

Credit/Debit Card Application(s)

According to example embodiments, a virtual number may be generated and used for financial transactions.

Figure 75A:
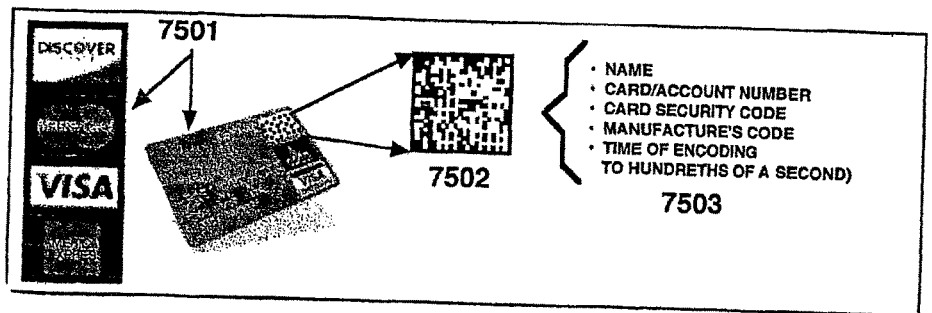
FIGS. 75A-75C provide diagrams of a time stamp virtual number generation system to provide secure credit/debit transactions according to example embodiments.

As shown in FIG. 75A, to make the encoding process more secure when using a time stamp application for security on credit cards 7501, for example, the USNO time generated data, making up the time stamps, may be used as a "seed" to finish an equation for either a time stamp symbol placed onto the card or for use in the transaction authentication process number. This may be generated/selected, i.e., the seconds, tenths, hundredths or thousandths of a second used in the formulation of the specific data cells of the time stamp symbol 7503. This would make it almost impossible for a human to anticipate or counterfeit specifically what the valid arrangement or location or sequence of the specific data cells within a matrix machine-readable symbol 7502 might appear and most likely a counterfeiter's attempt will result in an error (99.99+%) which can be instantly detectable when scanned.

Therefore, the chance of detection and the inability to produce unique and valid time stamp symbols would be almost zero and any sort of mass quantities would be out of the question.

Physical Card Security

One of the methods counterfeiters use to cheat the credit card companies includes the removal of or the addition of a counterfeit holographic seal to an altered duplicate that is placed over the last set of embossed numbers.

Figure 75B:
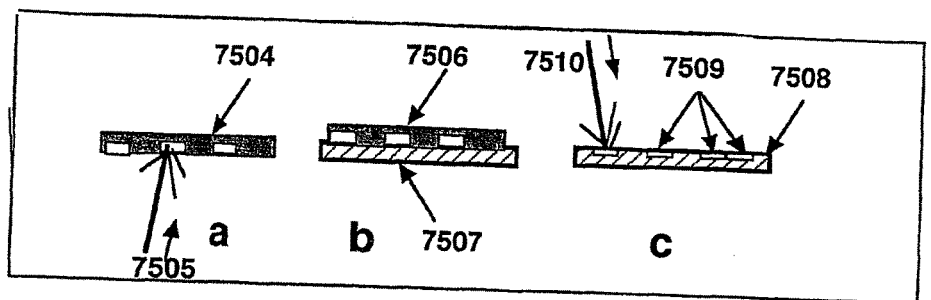

As shown in FIG. 75B, if the matrix symbol is laser engraved 7505 or marked onto the underside of a holographic security label 7504, the process would now become even more secure and therefore, it would be virtually impossible to alter the data or alter the card as any removal would destroy the matrix symbol and would therefore be rendered useless. FIG. 75B illustrates a cross-section of a credit/debit card 7507 having a finished laser-engraved label 7506 mounted onto the surface of the plastic card. This approach or process may also be applied as an official seal or identification to documents.

If the time stamp symbol is laser engraved 7510, directly, onto the plastic of the credit/debit card itself 7508 the image 7509 would be in effect be permanently "branded" into the plastic card's surface and no authentic alteration may be possible.

Figure 75C:
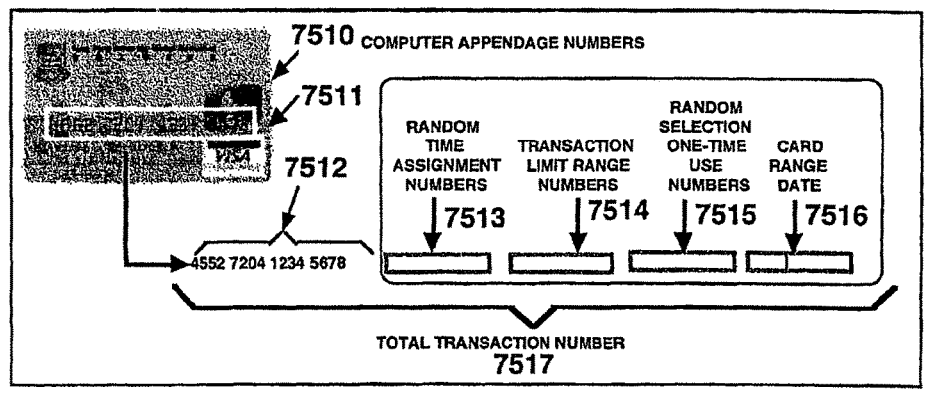

FIG. 75C shows a flow diagram illustrating how the time stamp number independent time generation source assigns one-time usage transaction numbers. A physical item such as a credit card 7510 may have an identifying number 7511 & 7512 i.e., a card number that has been assigned to a specific individual. In this example, the numbers on the credit/debit card may be embossed and reside in our physical/analog world and are used for payment of the purchase of goods or services.

The time stamp number generation system may resides in a computer 7513 and may be operated by software and extends the card number 7512 to any application desirable length that the security personnel deems to be necessary.

As shown in FIG. 75C, the first appended group of virtual numbers 7513 may be obtained by the generation of the seconds in hundredths or thousandths along with the time and date, which we will refer to as the "time stream" and randomly selected. The next group of numbers 7514 are the "Transaction Limit Range of Numbers", followed by the "Randomly Selected One-time Usage Numbers" 7515 with the last group of numbers 7516 being the card's "Validation or Expiration Dates and/or the Security Number" printed on the back side of the card. These are described in further detail in the following paragraph.

Random Time Stamp Generated Numbers

The first appended group of virtual numbers 7513 may be obtained by the generation of the seconds in hundredths or thousandths along with the time and date, which we will refer to as the "time stream" and randomly selected. This number is 3 for the hour, 2 for the minutes, 2 for the seconds, 2 for the minutes and 2 or 3 for the fractions of a second. These numbers may be generated so fast that a human cannot, nor does not, have the time to pre-select a number should they be inclined to try to counterfeit or penetrate the system.

Note: The Time Generated Number may be used as is or may be used with another variable number that would perform some mathematical function(s) such as multiplication of a number that would change daily, a number that divides the total, etc.

Transaction Limit Range of Numbers

The transaction limit range of numbers 7514 is a quantity of estimated transactions a customer may charge in a given year. For example, if it was determined that the card holders used the card 82 times in a year (a little over 1.5 times per week) then the limit might be set at 100 transactions per year. This results in a list of numbers from 1 to 100. (Note: Any given quantity of 100 numbers can be used, i.e., 1,000 or 1,100). From this list the random number generator may select a number to be used in the transaction process.

Randomly Selected One-time Usage Numbers

Once the software command is initiated to randomly select a number from the Transaction Limit Range of Numbers, that number 7515 may be inserted into the total transaction number sequence. This number may then be subtracted from the Transaction Limit Range of Numbers list and recorded as "used" in a customer transaction log. This specific number 7515 may be used only once for this customer in any given year.

Validation or Expiration Dates and/or the Security Number

The card range date 7516 may include the numbers that the credit/debit card company already uses. The start/expiration date, including approximately 8 numbers may be printed or embossed on the front side of the card while the security number, usually a three digit number, may be printed on the back side of the card.

As an example, these numbers including approximately 8 numbers, ("valid from February 9 through April 13") and the three security numbers, i.e., 321, as a single number, i.e., 02090413321) in the virtual data string sequence may be used.

The Total Transaction Number

Therefore, the Total Transaction Card Number 7517 to be used, both physical and virtual, may include the physical card's 8 numbers, The 6 to 9 Random Time Generated Numbers, The 5 Transaction Limit Range Numbers, the 6 Random one-time use Numbers, and 11 Validation/Expiration numbers for a total transaction string of 30 to 39 numbers generated from a number of sources and methods that are random (plus any additional numbers needed).

Process of Credit/Debit Card Virtual Random/Time Generated Number

FIG. 76 illustrates a basic process of creating a unique number where the Random Generator System(s) 7601, a microprocessor-based device, may randomly select a number or numbers 7602 from a continuous stream of time—generated numbers 7603 that originate from either the time stamp provider or the Naval Observatory 7604. These numbers may include hours, minutes, seconds and fractions of a second and are the seed numbers that we will use as we integrate/append 7605 them into one large, unique Transaction Number and/or time stamp (7606 & 7607). This random selection may be outside of any human influence.

FIG. 77 illustrates a transaction process of generating a credit/debit card virtual one-time time number between the retailer, as an example, the cardholder, the Card Processing Center and the time Stamp Service Provider. In 7701, a transaction payment may be initiated at a retail establishment. In 7702, a credit card or debit card may be provided by a purchaser. In 7703, the credit card or debit card may be scanned. In 7704, data related to the credit card or debit card may be transmitted via a network such as the internet to a card processing center. In 7705, the credit card or debit card may be authorized. In 7706, a customer account may be accessed. In 7707, a random number system may be accessed. After this, in 7708, a time stamp number generation system may be accessed. In 7709, a random number selection may be made from a pre-numbered list. In 7710, the random number may be appended to the account number. In 7711, the authorization may be completed using the random number appended to the account number and in 7712, this number may be logged so that it may never be used again. In 7713, completion of the authorization may be transmitted using a network such as the internet back to the retail establishment. In 7714, the credit card or debit card may be accepted and in 7715, the transaction payment is completed.

Document Integrity: Passports, Birth Certificates, Etc.

The time stamp example embodiments may be used to generate unique identification for financial instruments and forms of identification such as: Passports, Documents, i.e. Birth Certificates, Driver's Licenses, Military Identification, etc.

The core identification and/or biometrics may be integrated and incorporated into a machine-readable symbol and the time stamp numbers may be generated by the Naval Observatory in the hundredths or thousandths of a second and are used to provide an independent third-party automated system to add additional security along the same lines as the Credit/Debit Cards systems described herein above.

Internal Security Software Systems

The system for producing various embodiments of time stamps will require data security system(s) to prevent unauthorized changes from internal employees or external "hackers" due to alteration, substitution, virus introduction, etc. This security of data may be achieved a number of ways using a variety of hardware, software and virtualization systems. Examples include: redundant systems, parallel systems, redundant topologies, lockstep (computing), data redundancy, Dual Modular Redundancy, Triple Modular Redundancy, Information filtering system(s), switchover system(s), EDAC (Error detection and correction systems), Parity schemes, Checksum schemes, Cyclic redundancy checks (CRC), Hamming distance based checks, Horizontal and vertical redundancy check, An error-correcting code (ECC) or forward error correction (FEC) code, Convolutional codes, Block codes, Error-correcting memory, RAID systems, etc.

Recommender Systems

It is anticipated that the use of time stamps may also enable the use of recommender systems which are active information filtering systems that attempt to present to the user various information items (movies, music, books, news, web pages, etc.) the user may be interested in. These systems may add information items to the information flowing towards the user, as opposed to removing information items from the information flow towards the user.

Recommender systems typically use collaborative filtering approaches or a combination of the collaborative filtering and content-based filtering approaches, although content-based recommender systems do exist.

Synchronous/Synchronous Systems

Up to this point time stamps may be described as a synchronous asynchronous system where only one element of the system is synchronized. The time stamp system may synchronize and be dependent on its data and system to integrate the USNO time signal(s) and the end product may become asynchronous (independent) when it is relayed, sold or applied by the target end User.

Further example embodiments exist which will be referred to as synchronous/synchronous system(s), for example, for situations that require the time stamping of multiple simultaneous events or views.

This may be achieved either optically or through various sensors/detectors all measuring and/or viewing the activities of the same event, such as: manufacturing processes, scientific explorations, security situations, sports events, gaming, aerospace vehicle testing, car crash testing, etc.

These multiple simultaneous views may use a plurality of optical devices, such as, but not limited to: cameras (digital or non-digital, standard or high-speed, video cameras, audio capture systems, chemical and optical sensors/detectors, etc.

Example embodiments may coordinate multiple events, either at the same locally or located in different parts of the nation or even internationally across different time zones using the same Original time generated from the USNO and adjusted accordingly with time stamps that are individual as well as coordinated/linked.

The time stamp system may also be calibrated to adjust for signal delays between time stamp systems such as those located in different areas such as: countries, time zones, geographical locations, i.e., underwater, versus land, or land versus space or earth versus Moon, etc. or even different types of optical devices, readers, sensors or detectors.

Data Transfer

The time stamp system comprising may be either "vertically" downloaded to various digital devices and systems or uploaded to various higher-level computer systems such as mainframes.

The data may also be transferred "horizontally" such as from one device to another, i.e., a symbol reader to a hand held terminal.

The time stamp system may integrate or interface with most digital computer applications networks, communications, etc.

Compatibility to Various Types of Software Programs

The various example embodiments described herein are compatible with various commercial software programs, such as, but not limited to: Microsoft Office Suite, Corel WordPerfect Office Suite, Sun Microsystem's StarOffice and OpenOffice, Google Docs, etc. as well as various versions of Linux-based similar programs.

The various example embodiments, described herein, are also compatible with various Commercial software programs, such as, but not limited to: "Cloud Computing" where the term "cloud" refers to large Asynchronous Transfer Mode (ATM) networks.

Other Techniques

There are other techniques for signal or data processing such as "dithering", Digital Rights Management, (DRM), etc. that may have applications to the generation, transference, communications, application, etc. of time stamps to the target application.

Three-Dimensional Structure

If the time stamp system were illustrated as a three-dimensional structure it may appear as shown in FIG. 78.

The time stamp generation system 7801 unit 7802 may receive its time sequenced information from the USNO 7813 via a communication network link 7811 and via the Internet 7812 utilizing communication links such as T1 or other high or low speed data communication links. The customer base may include individuals 7814, commercial and non-profit enterprises 7815 and government(s) (domestic and/or foreign which includes the military).

Items 7803-7809 are examples of the categories that the digital system(s) may be capable of serving, such as: text 7803 including optional encrypted text 7810, graphics 7804, images/photographs/slides 7805, motion pictures 7806, audio including music 7807, video including teleconferencing 7808, and two and three-dimensional (stereo/holographic) projections 7809.

Example embodiments may also be related to a tax stamp or a fee-for-product/service, or the tax stamp may be incorporated into data, i.e. an agency or amount. 7901 illustrates the generation of a time stamp according to the system previously described that creates an official time and date of issuance along with money required/requested 7902 into a time stamp 7903. The tax stamp may be affixed to an email 7904 and sent via the internet 7905 and the message is delivered to the recipient electronically 7906 or other form of communications network electronically. If a hard copy is required, the digital data may be converted into an analog item 7907 and delivered by conventional postal services 7908 as a hardcopy 7909. It is possible that either the hard copy could be created by a user and physically mailed or it could be created through a special arrangement with the U.S. Postal Service whereby the U.S. Post Office engages in printing, envelope stuffing and delivery of the hard copy on behalf of the user.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined by the claims and their equivalents.

What is claimed is:

1. An automated notarization system to generate, for a user, a machine-readable notary symbol to execute an electronic notarization for a target object, the system comprising:
    an enrollment system, comprising:
        a biometric data analysis system including a data input interface to obtain, for an electronically processed notarization event to execute the electronic notarization, biometric data of the user to identify the user according to information of the user using any one or combination of:
            a retina scanner to determine unique eye patterns,
            a DNA analyzer to determine unique blood patterns,
            a hand geometry analyzer to determine unique hand patterns,
            a fingerprint scanner to determine unique fingerprint patterns,
            a signature analyzer to determine unique signature patterns,
            a facial recognizer to capture unique facial characteristics,
            a voice analyzer to determine unique vocal patterns, and
        an electro-optical photographic system including
            a static image photographic system, and
            a dynamic video image photographic system, to record physical images of the user,
        a data acceptance interface to receive identification information Indicating a type of the targe object, and
        a notarization authorization information generator including at least one processor configured to obtain global positioning system (GPS) coordinates corresponding to a location of the biometric data analysis system and the data acceptance interface, including obtaining name of country and state, to associate, respectively, the obtained GPS coordinates with the user providing the biometric data to the biometric data analysis system, and with the target object, for the notarization event;
    a time stamp retriever to connect to an official time provider via a network and to retrieve an official current time corresponding to the notarization event;
    a machine-readable notary symbol generator to generate the machine-readable notary symbol by encoding an identifier representing a container of notary information including:
        the official current time corresponding to the notarization event,
        the received identification information indicating the type of the target object,
        the respective GPS coordinates associated with the user and the target object, and
        identification information of a file associated with the machine-readable notary symbol and authentication information to access the file, to store in the file the container of notary information and the biometric data of the user;
    a marking system to mark the target object with machine-readable notary symbol;
    a data storage to store the file associated with the machine-readable notary symbol; and
    a user interface to process retrieval of the file associated with the machine-readable notary symbol according to the authentication information to access the file,
    wherein the machine-readable notary symbol is any one or a combination of a two-dimensional data structure, a three-dimensional data structure represented two-dimensionally, a matrix code, or a bar code.

2. The system of claim 1, wherein the matrix code is printed by the marking system onto the target object.

3. The system of claim 1, wherein the matrix code is etched by the marking system onto the target object.

4. The system of claim 1, wherein the matrix code is engraved by the marking system onto the target object.

5. The system of claim 1, wherein the machine-readable notary symbol is affixed by the marking system to the target object.

6. The system of claim 1, wherein the machine-readable notary symbol is displayed by the marking system on a display.

7. The system of claim 1, wherein machine-readable notary symbol is embedded into the target object and invisible.

8. The system of claim 7, wherein the machine-readable notary symbol is a watermark.

9. The system of claim 1, wherein the machine-readable notary symbol is coupled with a Radio Frequency Identifier (RFID).

10. The system of claim 1, wherein the machine-readable notary symbol is retrievable for use only one time.

11. The notarization system according to claim 1, wherein the target object is a document and the system further comprises:
    a document processing system including,
        a document pattern identifier to determine an identity pattern of the document by determining a unique quantity of alphanumeric characters, type font, graphic, character distribution pattern, number of spaces, sentences, paragraphs, and
        a document authenticator to compare the identity pattern for at least one page of the document with a master document identity pattern to authenticate the document in response to the comparison, to accept receipt of the identification information of the document by the data acceptance interface.

12. The system of claim 1, wherein the target object is an email and the machine-readable notary symbol protects information to be retrieved and displayed by entering a password related to the machine-readable notary symbol.

13. The system of claim 1, wherein the machine-readable notary symbol includes a data structure which is any one of bi-directional, tri-directional and/or multi-directional.

14. The system of claim 1, wherein the target object is marked and notarized according to localized regulations retrieved from a server.

15. The system of claim 1, wherein the target object is a credit card and the machine-readable notary symbol includes credit card information including a name, a card account number, a card security code, a manufacturer code, and a total transaction number based on the card account number, random time assignment numbers, transaction limit range numbers, random selection one-time use numbers and a card range date.

16. An automated notarization device to generate, for a user, a machine-readable notary symbol to execute an electronic notarization for a target object, the device comprising:
at least one memory to store at least one program,
at least one hardware processor configured, including configured by the at least one program, to,
obtain, for an electronically processed notarization event to execute the electronic notarization, biometric data of the user to identify the user according to information of the user using any one or combination of:
a retina scanner to determine unique eye patterns,
a DNA analyzer to determine unique blood patterns,
a hand geometry analyzer to determine unique hand patterns,
a fingerprint scanner to determine unique fingerprint patterns,
a signature analyzer to determine unique signature patterns,
a facial recognizer to capture unique facial characteristics,
a voice analyzer to determine unique vocal patterns, and
an electro-optical photographic system including
a static image photographic system, and
a dynamic video image photographic system, to record physical images of the user,
receive identification information indicating a type of the target object, and
obtain global positioning system (GPS) coordinates corresponding to a location of the device, including obtaining name of country and state, to associate, respectively, the obtained GPS coordinates with the user providing the biometric data to the device, and with the target object, for the notarization event;
connect to an official time provider via a network and to retrieve an official current time corresponding to the notarization event;
generate the machine-readable notary symbol by encoding an identifier representing a container of notary information including:
the official current time corresponding to the notarization event,
the received identification information indicating the type of the target object,
the respective GPS coordinates associated with the user and the target object, and
identification information of a file associated with the machine-readable notary symbol and authentication information to access the file, to store in the file the container of notary information and the biometric data of the user;
mark the target object with machine-readable notary symbol;
store the file associated with the machine-readable notary symbol; and
provide a user interface to process retrieval of the file associated with the machine-readable notary symbol according to the authentication information to access the file,
wherein the machine-readable notary symbol is any one or a combination of a two-dimensional data structure, a three-dimensional data structure represented two-dimensionally, a matrix code, or a bar code.

* * * * *